United States Patent [19]

Makkuni et al.

[11] Patent Number: 5,010,500

[45] Date of Patent: Apr. 23, 1991

[54] GESTURE-MODIFIED DIAGRAM FOR RETRIEVAL OF IMAGE RESEMBLING DIAGRAM, WITH PARTS SELECTABLE FOR FURTHER INTERACTIVE RETRIEVAL

[75] Inventors: Ranjit Makkuni, San Francisco; Frank Zdybel, Jr.; Robert A. Stults, both of Palo Alto, all of Calif.

[73] Assignee: Xerox Corporation, Stamford, Conn.

[21] Appl. No.: 303,351

[22] Filed: Jan. 26, 1989

[51] Int. Cl.$^5$ .............................................. G06F 3/14
[52] U.S. Cl. ................................... 364/521; 340/706; 382/13; 382/56
[58] Field of Search ............................ 382/13, 59, 56; 364/518, 521; 340/709, 706; 178/19

[56] References Cited

U.S. PATENT DOCUMENTS

| | | | |
|---|---|---|---|
| 3,487,371 | 12/1969 | Frank | 382/13 |
| 3,909,785 | 9/1975 | Howells | 382/13 |
| 4,200,861 | 4/1980 | Hubach et al. | 340/146.3 Q |
| 4,414,685 | 11/1983 | Sternberg | 382/49 |
| 4,516,156 | 5/1985 | Fabris et al. | 358/85 |
| 4,521,870 | 6/1985 | Babbel et al. | 364/900 |
| 4,542,526 | 9/1985 | Satoh et al. | 382/13 |
| 4,562,304 | 12/1985 | Ward et al. | 382/13 X |
| 4,607,386 | 8/1986 | Morita et al. | 382/13 |
| 4,624,013 | 11/1986 | Urushibata | 382/9 |
| 4,644,585 | 2/1987 | Crimmins et al. | 382/48 |
| 4,645,459 | 2/1987 | Graf et al. | 434/43 |
| 4,727,588 | 2/1988 | Fox et al. | 382/13 |
| 4,736,437 | 4/1988 | Sacks et al. | 382/34 |
| 4,742,558 | 5/1988 | Ishibashi et al. | 382/56 |
| 4,754,493 | 6/1988 | Coates | 382/48 |
| 4,776,020 | 10/1988 | Kosaka et al. | 382/10 X |
| 4,809,214 | 2/1989 | Shimakura | 364/900 |
| 4,829,583 | 5/1989 | Monroe et al. | 382/13 |
| 4,833,625 | 5/1989 | Fisher et al. | 364/518 |
| 4,860,372 | 8/1989 | Kuzunuki et al. | 382/13 |
| 4,873,513 | 10/1989 | Soults et al. | 340/723 |
| 4,879,665 | 11/1989 | Akatsuka | 364/518 |

FOREIGN PATENT DOCUMENTS

| | | |
|---|---|---|
| 237324 | 9/1987 | European Pat. Off. . |
| 0275124 | 7/1988 | European Pat. Off. . |
| 0283267 | 9/1988 | European Pat. Off. . |
| 300167A | 1/1989 | European Pat. Off. . |
| 302498 | 2/1989 | European Pat. Off. . |
| 316144 | 5/1989 | European Pat. Off. . |

OTHER PUBLICATIONS

APS Text Search and Retrieval Classroom Manual, Planning Research Corp., Chemical Abstract Services, 1986, pp. 1–16, 1–17.

"NestorWriter", Nestor, Inc., Providence, R.I., 1986.

Makkuni, R., "Representing the Process of Composing Chinese Temples", *Design Computing*, vol. 1, No. 3, 1986, pp. 216–235.

Makkuni, R., "A Gestural Representation of the Process of Composing Chinese Temples", *IEEE Computer Graphics & Applications*, vol. 7, No. 12, Dec. 1987, pp. 45–61.

(List continued on next page.)

*Primary Examiner*—David L. Clark
*Attorney, Agent, or Firm*—James T. Beran

[57] ABSTRACT

Recorded video segments are retrieved and displayed through a user interface that employs gestures. The user provides gestures by moving a mouse, and the resulting signals indicate a diagram. Data identifying the diagram is used to access a data structure to obtain data indicating which of a set of interactive line drawings includes features most closely resembling the diagram. The interactive line drawing with features closest to the diagram can then be displayed. When the user selects a part of the line drawing, a menu is displayed that includes a description of the video segments that relate to that part. To assist the user in providing gestural input, a preliminary diagram is displayed, reducing the amount of information the user must provide. The user can change parts of the diagram to obtain a modified diagram resembling features that appear in a desired line drawing. The diagrams and interactive line drawings can be displayed on a workstation display screen, while the video segments can be displayed on a video monitor screen by a video disk player under control of the workstation CPU.

24 Claims, 9 Drawing Sheets

Williams, M. D., "What Makes RABBIT Run?", *International Journal of Man-Machine Studies*, vol. 21 (1984), pp. 333-352.

Wilson, K. S., Palenque: An Interactive Multimedia Optical Disc Prototype for Children Bank Street College of Education Center for Children and Technology, Working Paper No. 2, Mar. 1987.

Fisher, S. S., McGreevy, M., Humphries, J., and Robinett, W., "Virtual Environment Display System", presented at ACM Workshop on Interactive 3D Graphics, Chapel Hill, North Carolina, Oct. 1986.

Sutherland, I. E., "Sketchpad, A Man-Machine Graphical Communication System", *AFIPS Spring Joint Computer Conference*, vol. 23, 1963, pp. 329-346.

Brand, S., *The Media Lab*, Viking, New York, 1987, pp. 13-14, 35-50, 137-141.

Bolt, R. A., *The Human Interface*, Lifetime Learning Publications, Belmont, California, 1984.

Herot, C. F., "Spatial Management of Data", *ACM Transactions on Database Systems*, vol. 5, No. 4, Dec. 1980, pp. 493-514.

Spence, R., and Aperley, M., "Data Base Navigation: An Office Environment for the Professional", *Behavior and Information Technology*, vol. 1, No. 1, 1982, pp. 43-54.

Goldberg, A., *Smalltalk-80, The Interactive Programming Environment*, Addison-Wesley, Reading, Mass., 1984, pp. 1-49.

Wilson, K. S., "Palenque: An Interactive Multimedia Digital Video Interactive Prototype for Children", ACM, CHI '88 Conference Proceedings, 1988, pp. 275-279.

"Rumor Central", PC Week, Dec. 19, 1988, p. 132.

Lewis, P. H., "The Executive Computer", The New York Times, Nov. 20, 1988, p. 11.

GESTURE-MODIFIED DIAGRAM FOR RETRIEVAL OF IMAGE RESEMBLING DIAGRAM, WITH PARTS SELECTABLE FOR FURTHER INTERACTIVE RETRIEVAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques by which a user can control the retrieval of visual information. More specifically, the invention relates to a user interface that permits a user to select recorded visual information, such as video stills or sequences, for playback.

Tsunekawa et al., EP-A No. 237,324, describes a computer-controlled document data filing system, shown and described in relation to FIG 1. Data retrieval is performed on previously compressed images in response to keyboard signals from an operator, as shown and described in FIGS. 2A and 2B. A controlled displays questions asking for retrieval data specifying requested document data; the retrieval data may be code data such as a keyword for specifying a figure content of a desired document. A data retrieval unit then searches for document data satisfying the condition of the input retrieval data; if the requested document data is detected, the controller reads out the compression image data and reproduces an image of the retrieved document data for the operator.

Makkuni, R., "Representing the Process of Composing Chinese Temples," *Design Computing*, Vol. 1, No. 3, 1986, pp. 216-235 and Makkuni, R., "A Gestural Representation of the Process of Composing Chinese Temples," *IEEE Computer Graphics & Applications*, Vol. 7, No. 12, Dec. 1987, pp. 45-61, (hereinafter "the Chinese Temple articles") describe a computing based desing environment that employs a gestural language in its user interface. As shown and described in relation to FIGS. 4-8 of the IEEE article, the user provides gestures by making strokes with an input device such as a mouse. Each stroke is recorded as a series of points, sampled against direction. A compression algorithm receives the stroke as a path of points, producing a small collection of knot-points that, along with a spline function, can approximate the original stroke. This collection of knot-points is then decomposed into its parts by the directionality of movement in the creation of the stroke, inferring direction from the relation of each knot point to the previous and following knot points. The set of direction-parts is compared with predefined gesture types, and if a matching gesture type is found, its corresponding desing properties are applied to an image of a design. The application of the design properties may vary with a parameter of the gesture, such as its height.

Williams, M. D., "What Makes RABBIT Run?" *International Journal of Man-Machine Studies*, Vol. 21 (1984), pp. 333-352, describes RABBIT, a system that is based on retrieval by reformulation and that provides a user interface to aid users in formulating a query. Page 333 describes how the user interactively refines partial descriptions of a target item by criticizing successive example instances that satisfy the current partial description. Page 335 describes how a user initiates a query, in response to which RABBIT presents an instance that satisfies the description. The user can then refine the query using a pointing device such as a mouse to point at various properties of the instance presented and critiquing them. Page 336 states that RABBIT limits the critique functions presented in a pop-up menu to those acceptable to an attribute the user has indicated. Page 342 describes a map analysis function that generates a high resolution map of the piece of the world that contains the matching instances, displaying the coastline of this piece of the world along with the matching instances, and page 343 describes an extension in which a user could specify a region from an analysis map to reformulate the query. Pages 345-347 describe retrieval by reformulation in more detail.

Various graphical user interfaces for workstations provide a series of interactive images, with a selection by a user in one image leading to the next image. Examples of this include ViewPoint, available from Xerox Corporation, and the Macintosh user interface, available from Apple Computer Inc. Each of these user interfaces also enables the user to edit a graphical image, and the resulting edited image can, for example, be printed.

Systems have also been proposed that include an input device on which a user can draw a character that is then recognized. The Nestor Writer product from Nestor Incorporated is an example of software that recognizes a handwritten character and displays an image of the character as recognized.

Wilson, K.S., *Palenque: An Interactive Multimedia Optical Disc Prototype for Children*, Bank Street College of Education Center for Children and Technology, Working Paper No. 2, Mar. 1987, describes Palenque, a system that provides a user interface through which a user can control the presentation of views of an archeological site. As described at pages 4-5, the user manipulates a joy stick to obtain the views; a site map is also presented showing the user's current location, and the user can select a location of interest on the map and then jump directly to that location. Page 5 also describes a museum database that includes "rooms" that can be entered by making a selection from a graphic of a museum facade; within a room a user can make menu and icon selections to access information, which may be stored as video still frames, motion video, audio descriptions and music, sound effects, computer sounds, text, or computer graphics. Pages 7-8 discuss interface issues, including the use of the joystick, with the joystick button used to activate the cursor and deactivate virtual travel, or vice versa, and to make selections with the cursor.

Fisher, S. S., McGreevy, M., Humphries, J., and Robinett, W., "Virtual Environment Display System," presented at ACM Workshop on Interactive 3D Graphics, Chapel Hill, North Carolina, Oct. 1986, describes a head-mounted display system controlled by operator position, voice, and gesture. Pages 4-6 describe gesture input techniques, including gloves that transmit data about arm, hand, and finger shape and position to a computer, applications of which are to provide a three-dimensional cursor in the displayed environment and to effect indicated gestures in the synthesized or remote environment. The operator can pick-up and manipulate virtual objects in the virtual environment. Multiple windows of information and simulated control panels are positioned, sized, and activated by manipulating the virtual objects in 3-space, as shown in FIG. 12. Page 9 states that the system has the capability to display reconfigurable, virtual control panels that respond to glove-like tactile input devices worn by the operator.

Sutherland, I. E., "Sketchpad, A Man-Machine Graphical Communication System," *AFIPS Spring Joint Computer Conference*, Vol. 23, 1963, pp. 329-346, describes a system that makes it possible for a man and a computer to converse through line drawings. Pages 329-331 describe an example of how inputs from a light pen can obtain a desired drawing by changing a displayed drawing. Pages 333-334 describe the use of the light pen.

Babbel et al., U.S. Pat. No. 4,521,870, describe an audio/video system with touch responsive function display screen. As shown and described in relation to FIGS. 1, 2, and 10, a finger's position is used to find a closest choice and performs the corresponding editing action.

Fabris et al., U.S. Pat. No. 4,516,156, describe a teleconferencing technique in which the control device includes a display with a touch sensitive screen for controlling the video sources and video matrix switch in response to touches. Menu movement is shown and described in relation to FIG. 8. Various menus are shown and described in relation to FIGS. 9A-9I.

Brand, S., *The Media Lab*, Viking, New York, 1987, pp. 13-14, 35-50, 137-141, and plates 5, 6, 9, 10 and 13, describes various techniques developed at MIT's Media Lab. Pages 13-14 and 141-142 and plate 5 describe Movie Manual, and electronic book of transmission repair that is accessed by moving a finger over a screen. Pages 36-37 and plate 6 describe NewsPeek, a selective electronic newspaper in which a user can change the image displayed by moving a finger across the screen. Pages 40-41 describe interactive television. Pages 49, 138, and 141 and plate 5 describe Aspen Movie Map, in which the user can interactively obtain views of a town from a videodisk. Page 138-139 and plates 9 and 10 describe Spatial Data Management System (SDMS), in which the user could browse neighborhoods of data, and Put That There, in which the user pointed and issued voice commands to communicate with a computer. Plate 13 describes a glove and a suit to make a computer sensitive to gesture.

Bolt, R. A., *The Human Interface*, Lifetime Learning Publications, Belmont, Calif. 1984, describes Dataland, in which pictorial and textual data are arranged in three screens, one for an overview of the whole space, one for a detailed view of some potion of the space, and one touch-screen for control. Page 12 describes how the user navigates about Dataland using a joystick. Page 13 describes touch travel by touching a desired spot on the touch-screen. Pages 19-20 describe random access to video images through the touch-screen. Pages 21-25 describe the CCA system in which a user can also zoom through ports between information spaces.

Herot, C. F., "Spatial Management of Data," *ACM Transactions on Database Systems*, Vol. 5, No. 4, Dec. 1980, pp. 493-514, describes the CCA system, also called SDMS, in greater detail. Pages 502-503 describe motion control with a joystick. Page 506 describes the use of videodisk data, with an icon being associated with a sequence of videodisk images, so that the user can zoom in on a particular icon to see the associated frame or sequence.

Spence, R., and Aperley, M., "Data Base Navigation: An Office Environment for the Professional," *Behavior and Information Technology*, Vol. 1, No. 1, 1982, pp. 43-54, describe the use of pointing, gesturing, and touching in handling information. Page 46 describes the use of pointing to select an artifact.

SUMMARY OF THE INVENTION

The present invention provides techniques for interactively accessing information based on gestural input indicating a set of features that appear in an interactive item. The gestural input can be provided by indicating a modification of a preliminary set of features that produces a desired set of features resembling the information to be accessed. The invention further provides techniques that can access video records.

One aspect of the invention is based on the recognition of several related problems in accessing interactive items of information with a data processing system. The user may have some general impressions of the appearance of an interactive item to be accessed, but may have only limited knowledge of its specific contents. In this situation, the user may be incapable of articulating a description that could be used to access the desired item. Even if the user provides graphical data indicating general visual impressions, the system receiving that data may be incapable of perfoming the difficult computational task of comparing the graphical data with a body of information to access the particular items that are related to or include features resembling the graphical data. Furthermore, if the system retrieves a number of items that relate to the graphical data, the user is again faced with the problem of finding the desired item from among those retrieved.

This aspect of the invention is based on the discovery that these problems can be solved by receiving gestural input from a user indicating a set of visual features and by responding with an interactive item that includes features resembling the indicated set of features. This technique can be implemented in a manner that simplifies the necessary computation and facilitates retrieval of the interactive item.

According to one implementation of the technique described above, a data structure is provided that, when accessed with an identifier of a set of visual features, provides data indicating an interactive item. A processor can receive data based on the gestures and provide a feature set identifier based on this data. The processor can use the identifier to access the data structure to obtain data indicating the interactive item. The processor can then present the interactive item, enabling the user to request a further operation.

A closely related aspect of the invention is based on the recognition that the above-described problem can be of particular importance to the interactive retrieval of information from a large database, particularly a video database or a multimedia database that includes video items, computer graphic items, text items, audio items, and so forth. It would not be practical to require the user to provide a distinct gesture for each item in the database. Therefore, a single item to which a number of distinct items are related can serve as an interactive item for accessing the related items. Buth the user may nonetheless have difficulty identifying the interactive item that leads to a desired item in the database.

This problem can be solved by applying the technique described above to the retrieval of items from the database. Items can be chosen to serve as interactive images based on the ease with which those items can be identified based on gestural input. Other items in the database can then be classified according to their relationships to the interactive items. Each interactive item can include a number of parts, each being related to a set of video segments or other items in the database so that the items in the database can also be classified according to their relationships to the parts of each interactive item. Each part of the interactive item can include a selectable unit that the user can select with an input device such as a mouse in order to access the corresponding set of related items from the database.

When the user selects one of the parts of the interactive item, the processor can present another selectable unit such as a menu that includes a description of one or more of the corresponding set of items. The user can then make a selection in the menu to request access to an item. In response, the processor can control a video player or other equipment to access the requested item. The requested item could then be presented on a display. In this manner, the user is able to select freely among the items relating to the interactive item, and can request their presentation in any desired order.

Another aspect of the invention is based on the recognition of problems in providing input indicating a set of visual features upon which retrieval of visual items is based. It is difficult and time-consuming for a user to provide a complete description of a set of visual features, because this requires providing a large amount of information. Furthermore, due to the complexity of such a description, the user may make mistakes, making it necessary to iteratively provide several descriptions until a correct description of the desired set of visual features is obtained.

This aspect is based on the recognition that these problems can be greatly reduced by providing a preliminary set of visual features that includes a large amount of the information the user would otherwise provide. The user can then indicate changes in the preliminary features that will produce a modified set of features, and the system can then retrieve visual items that include features similar to the modified features.

This technique for receiving a description of a set of features can be implemented by presenting a preliminary diagram to the user, for example. The user can then indicate a change in the preliminary diagram to produce a desired diagram, such as by a gesture that indicates the change. The diagram can be changed accordingly and an identifier of the modified diagram can be obtained. This identifier can then be used as described above to access an interactive item that includes features resembling the diagram and that provides access to a set of related items in a database. Furthermore, the modified diagram can be displayed, allowing the user to further modify it until a desired diagram is obtained.

The following description, the drawings and the claims further set forth these and other objects, features and advantages of the invention.

DETAILED DESCRIPTION

A. Conceptual Framework

Figure 1:
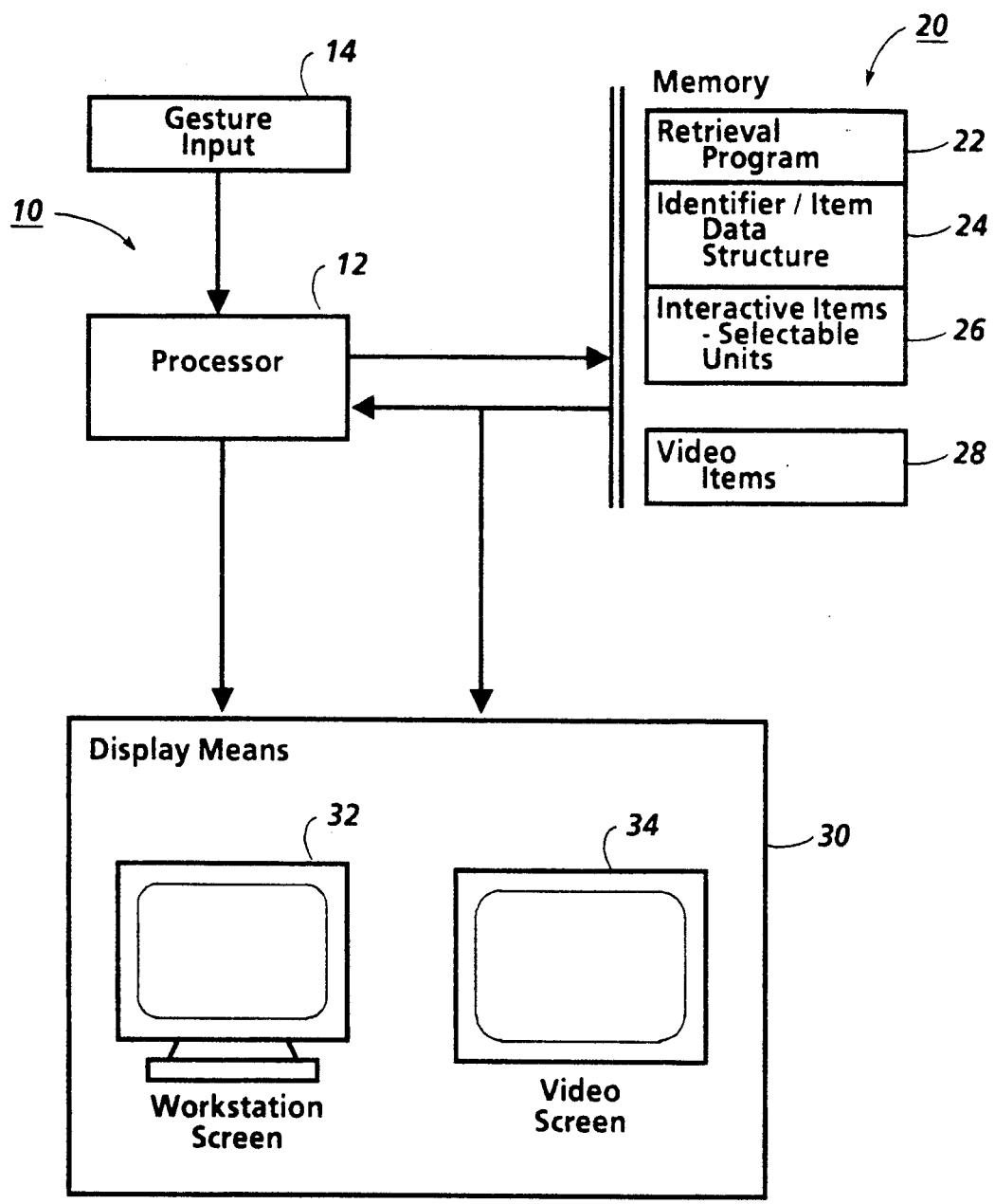
FIG. 1 is a block diagram showing components of a system according to the invention.

The following conceptual framework is helpful in understanding the broad scope of the invention, and the terms defined below have the meanings indicated throughout this application, including the claims.

A "display system" is a system that provided information in visual form, such as on the screen of a cathode ray tube. A wide variety of display systems are available including, for example, various graphical user interfaces and video systems. Despite their diversity, display systems tend to have certain common characteristics. One fundamental common characteristic is that a display system produces human perceptions. In this application, the term "display feature" refers to any human perception produced by a display system.

A "selectable unit" is a display feature that is perceived as a bounded display area that can be selected. For example, in the Smalltalk-80 environment, described in Goldberg, A., *Smalltalk-80, The Interactive Programming Environment*, Addison-Wesley, Reading, Mass., 1984, pp. 1-49, a menu item is a selectable unit, and a menu may include one or more menu items. The term "select," when used in relation to a selectable unit, means a user input operation that includes a signal that uniquely identifies the selectable unit and requests that is be selected. The user can, for example, use a pointing device such as a mouse to select a selectable unit by indicating its position and clicking a button on the pointing device. In general, a selectable unit may take any appearance, and is not limited to a visually distinguishable feature or set of features that appears to be a coherent unity.

A common characteristic of display systems is a correspondence between information within the system and display features presented by the system. Information in a display system is "presented" when the display system provides a visual presentation based on it. A body of information stored in memory can include a plurality of "isual items," each of which can be independently accessed for presentation by a display system. An "interactive item" is a visual item whose presentation includes one or more selectable units. A "video item" is a visual item stored in a form permitting access by video equipment.

A "visual feature" is a visually perceptible feature. A set of visual features can be represented in various ways. A visual item within a display system can include data, such as a bitmap or an identifier, representing the set of visual features; or a visual item could include information that, when presented, includes the set of visual features. A presentation on the system's display can therefore also represent the set of visual features.

A "data structure" is any combination of interrelated data. A "data unit" is a data structure that is accessible as a unit by the data processing system. For example, an interactive item could be a data unit.

A "processor" is any component that can process information.

A "gesture" is an expressive movement.

Data or a signal is "based on" a gesture when the data or signal includes information about the gesture's path of motion. For example, if information about only one point in the path is included, the data or signal is not based on the gesture; but if information about two or more points in the path and the time sequence of those points is included, the data or signal is based on the gesture. A simple example of data based on a gesture is data indicating the beginning and ending points of the gesture. Complete data based on a 2-dimensional gesture would be a vector of (x, y, t) 3-tuples obtained by sampling the path of the gesture at a sufficiently high frequency to capture all expressive content provided by the gesturer. Data or a signal based on a gesture is also referred to herein as "gestural input."

B. General Features

Figure 2:
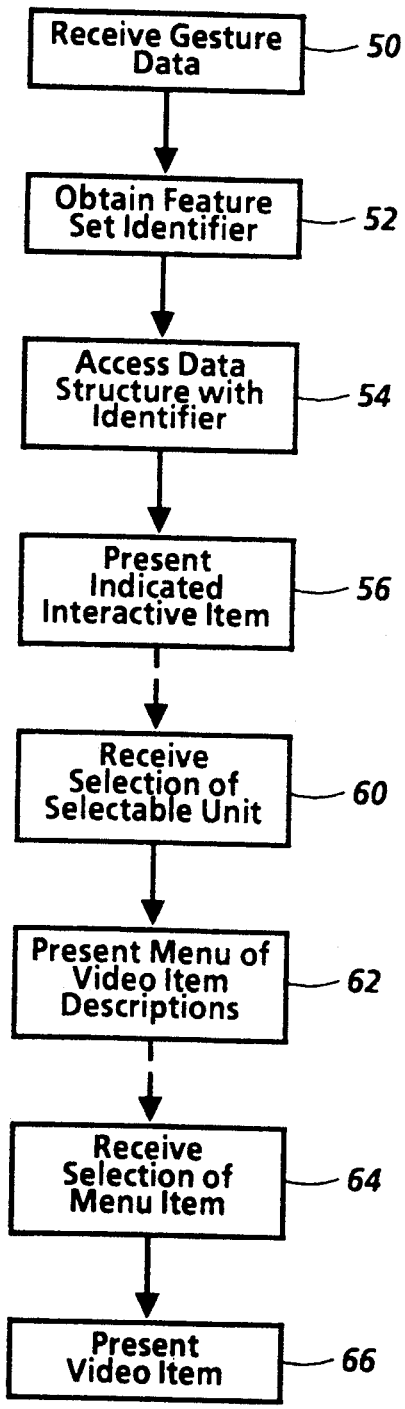
FIG. 2 is a flow chart showing general steps followed by the processor of FIG. 1 in accessing a visual item.
Figure 3:
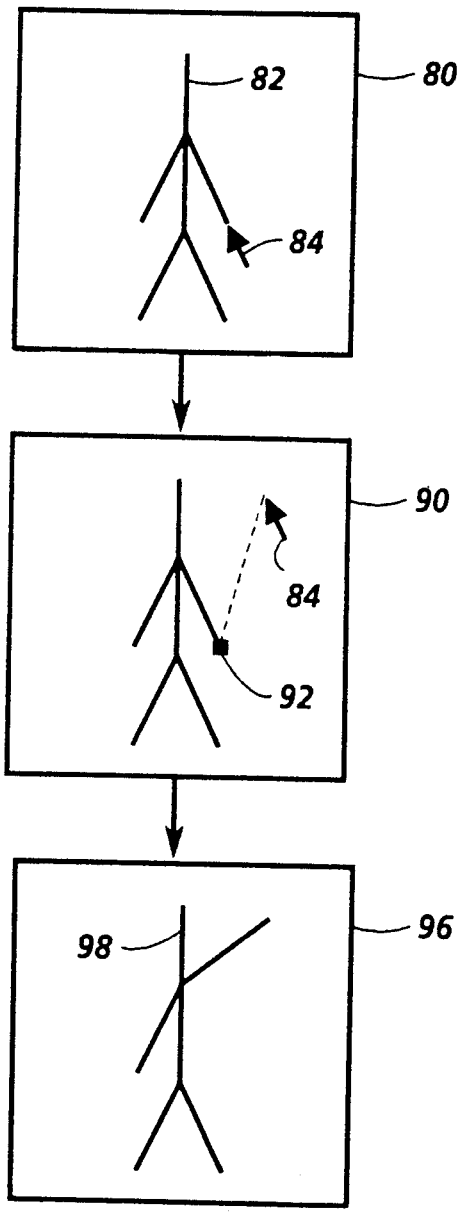
FIG. 3 is a schematic diagram showing stages in performing gestures to change a preliminary diagram according to the invention.
Figure 4:
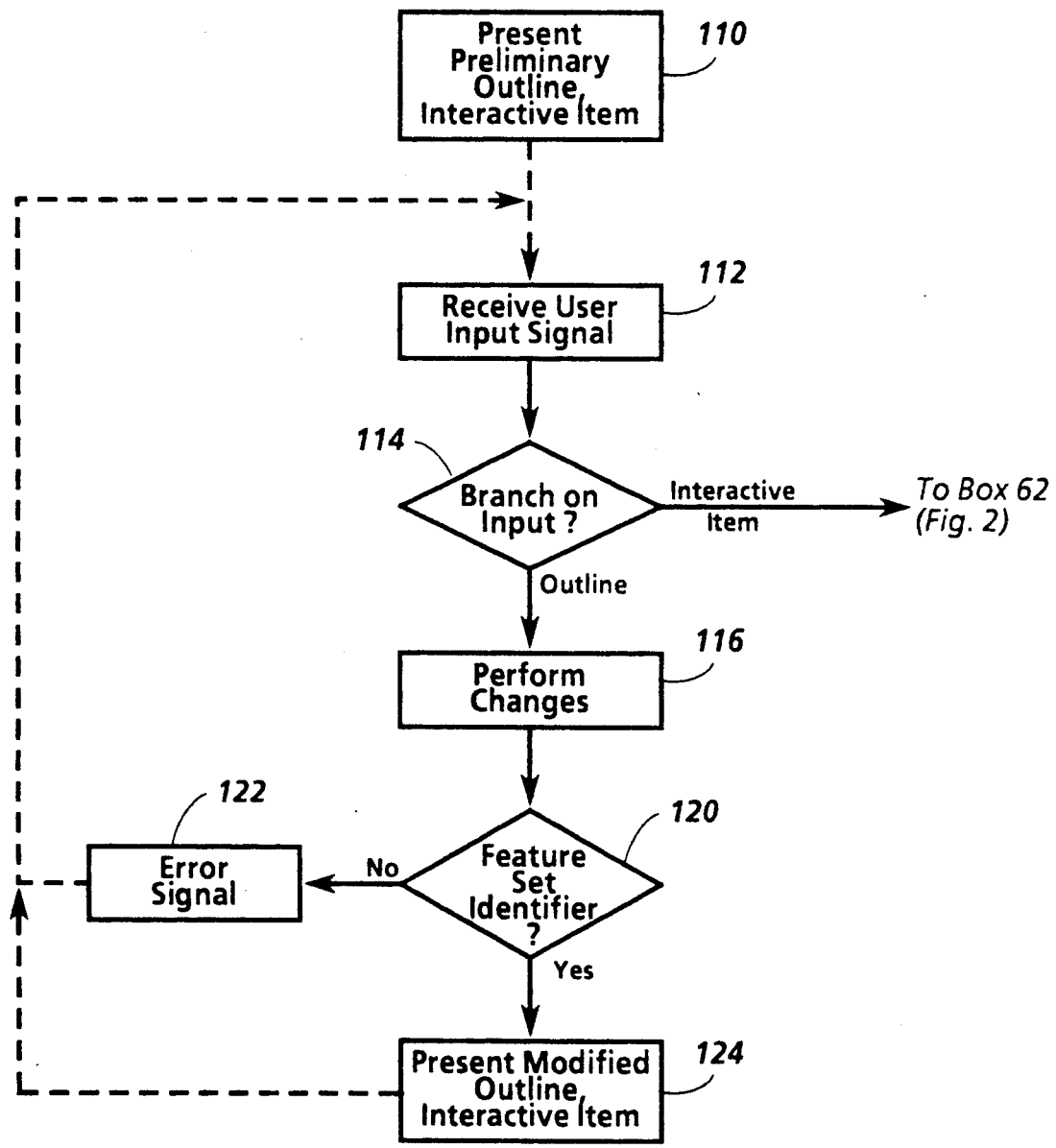
FIG. 4 is a flow chart showing general steps followed in providing a gestural user interface like that illustrated in FIG. 3.

A number of general features of the invention can be understood from FIGS. 1-4. FIG. 1 shows a system according to the invention, and FIG. 2 shows general steps by its processor in accessing a stored visual item. FIG. 3 shows stages in changing a preliminary diagram to be used in accessing a stored visual item, and FIG. 4 shows general steps followed in providing an interface like that illustrated in FIG. 3.

System 10 in FIG. 1 includes processor 12, which can include one or more central processing units (CPUs) and can have any appropriate architecture. Processor 12 receives data from gesture input 14, a user input device such as a mouse that provides data based on gestures of a user.

During its operations, processor 12 accesses memory 20, which can include various memory media, including ROM, RAM, floppy disk, hard disk, CD-ROM, video disk, video tape, DVI compressed video, and so forth. Some of the data contained in memory 20 might be accessible through memory accesses by processor 12, while other data might be accessible through I/O operations. Furthermore, some data might be in a form that is not suitable for processing by processor 12. Nonetheless, processor 12 can control access to all data in memory 20.

FIG. 1 shows an example of how memory 20 can store various types of information. Retrieval program 22, for example, can be a program executed by a CPU in processor 12 that controls the components of system 10 to perform the steps described below in relation to FIG. 2. During the executionn of program 22, the CPU can access identifier/item data structure 24 with an identifier of a set of visual features, obtaining data indicating one of interactive items 26 that includes features resembling the identified set. The presentation of each of interactive items 26 includes one or more selectable units for requesting access to related items in a database, such as video items 28. Selection of each selectable unit could, for example, result in presentation of a menu each of whose items is a description of a corresponding video item; selection of a menu item could then result in presentation of the corresponding video item by display means 30. Video items 28 may be stored on a medium accessible through an input/output (I/O) device such as a video player, so that they are accessible through I/O operations rather than through ordinary memory accesses.

Display means 30 can present interactive items 26 and video items 28. Although both could be presented on a single screen, FIG. 1 shows an implementation of display means 30 that includes two screens. Workstation screen 32 presents interactive items 26, and the signals from gesture input 14 relate to the presentation on workstation screen 32. Video screen 34 presents video items 28.

FIG. 2 shows steps a CPU in processor 12 could follow in executing retrieval program 22. These steps begin when processor 12 receives data from gesture input 14 based on a gesture by the user indicating a set of features, in box 50. The CPU uses the gesture data to obtain an identifier of the indicated set of features, in box 52. Then, the CPU accesses data structure 24 with the identifier to obtain data indicating the corresponding interactive item, in box 54. In box 56, the indicated interactive item is presented on workstation screen 32S after which the CPU waits, as indicated by the dashed arrow, until it receives a further signal from the user.

When the CPU receives a signal from the user selecting a selectable unit in the interactive item being presented, in box 60, the CPU responds by presenting a menu of video item descriptions, in box 62. Again, the CPU waits, as indicated by the dashed arrow, until it receives a signal from the user selecting one of the menu items, in box 64. Then, the corresponding video item is presented on video screeen 34, in box 66. In this manner, gestures from the user that indicate a set of features can lead to video presentations relating to those features.

FIG. 3 shows an example of how gestures can efficiently indicate a set of visual features. Prior to receiving the gestures, the CPU executing retrieval program 22 could, as shown in box 80, present preliminary diagram 82, which indicates a set of visual features, in this case a stick figure of a human body. Using gesture input 14, the user could move pointer 74 until it points to a part of diagram 82 to be edited. As shown in box 90, the user could then select a part of the preliminary diagram, in this case point 92 at the end of an arm. With that selection, the user could make a gesture indicating a change in the position of point 92, by moving pointer 84 to the new position. In response, as shown in box 96, system 10 could present modified diagram 98 and could also retrieve an interactive item that includes features resembling those of modified diagram 98.

FIG. 4 shows steps the CPU could perform while receiving gestural input as in FIG. 3. In box 110, the CPU presents the preliminary diagram, and can at the same time present an interactive item that corresponds to the preliminary diagram in case the user desires presentation of a video item relating to the set of features of the preliminary diagram. The CPU then waits for a signal from the user, as indicated by the dashed arrow. When a user input signal is received, in box 112, the CPU branches in box 114 based on the nature of the input signal received. If the input signal select a selectable unit in the interactive item, the CPU responds by presenting the corresponding menu, as in box 62 in FIG. 2. If the input signal indicates changes in the preliminary diagram, the CPU performs the indicated changes, in box 116. Then, in box 120, it determines whether the resulting modified diagram is a set of features for which an identifier can be assigned. If not, the step in box 122 can provide an appropriate error signal such as a flash of the screen before returning to receive further input. But if a feature set identifier can be assigned to the modified diagram, the step in box 124 accesses data structure 24 to obtain data indicating the corresponding interactive item and presents the modified diagram as well as its corresponding interactive item.

We turn now to consider how the features described above in relation to FIGS. 1-4 may be implemented.

C. An Implementation

The invention could be implemented in a wide variety of ways. The invention has currently been implemented using a commercially available workstation and video disk player. The workstation is programmed using a Smalltalk-80 system. Smalltalk-80 is a trademark of ParcPlace Systems, Inc.

1. The System

Figure 5:
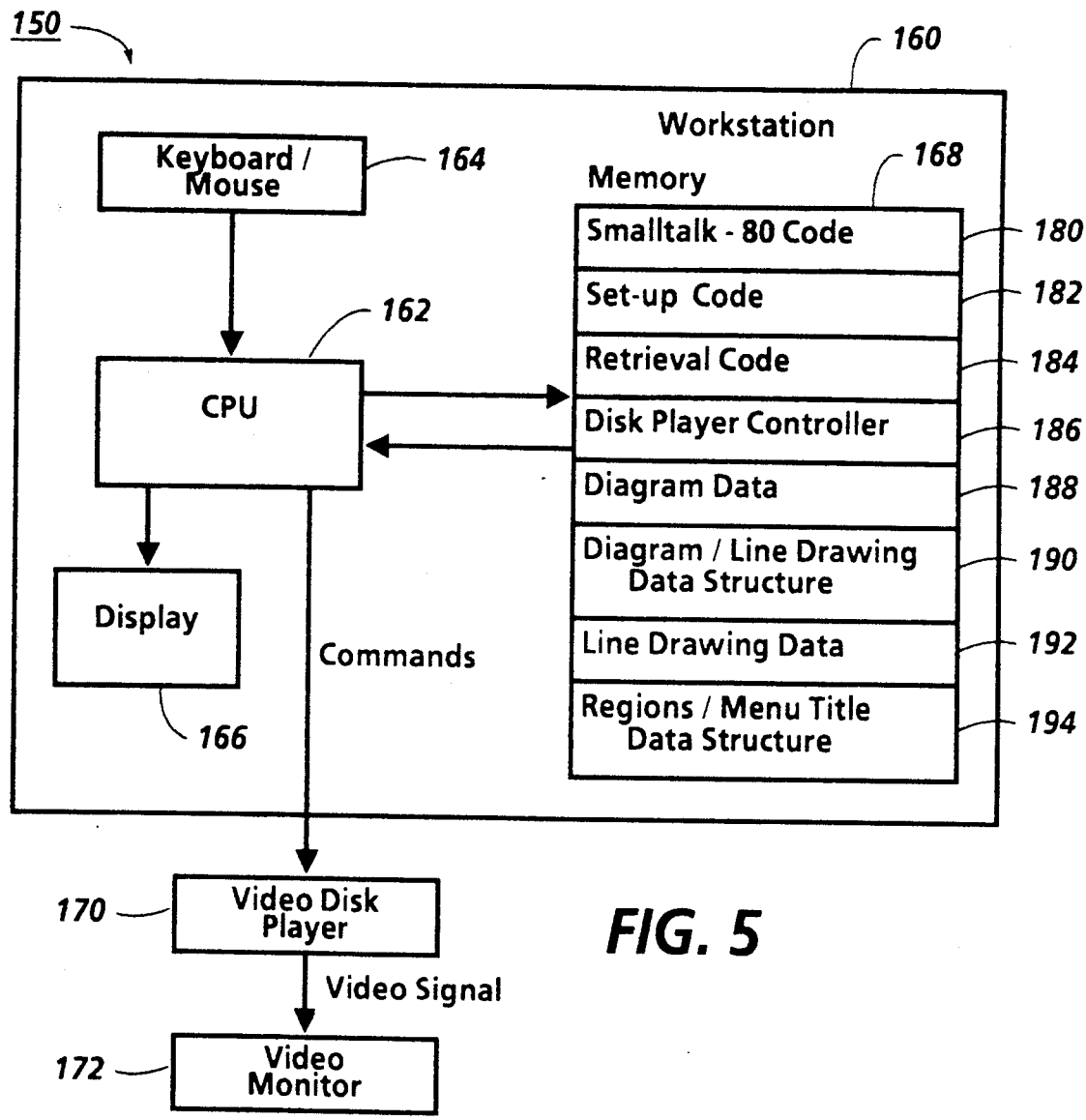
FIG. 5 is a block diagram of components of a system according to the invention.

FIG. 5 is a block diagram showing components of a system that can be used to implement the invention.

system 150 in FIG. 5 includes workstation 160, which can, for example, be a Mac II or Sun 3/160 workstation. Workstation 160 includes CPU 162, which receives user input signals from keyboard/mouse 164 and presents visual information on display 166. During its operations, CPU 162 also accesses memory 168.

system 150 also includes video disk player 170, which can, for example, be a Sony LDP 2000 aser disk player. Workstation 160 provides commands to disk player 170 through its RS-232 interface, and disk player 170 in turn provides a video signal to video monitor 172, which presents information based on the video signal.

The above-described components of system 150 in FIG. 5 correspond to those of system 10 in FIG. 1 as follows: CPU 162 and video disk player 170 correspond to processor 12; keyboard/mouse 164 corresponds to gesture input 14; memory 168 and the disk (not shown) in video disk player 170 correspond to memory 20; the video disk corresponds to video items 28; and display 166 corresponds to workstation screen 32; and video monitor 172 corresponds to video screen 34.

CPU 162 accesses a number of different items of code in memory 168. Smalltalk-80 code 180 is an underlying Smalltalk-80 product such as that commercially available from ParcPalce Systems, Inc. Set-up code 182 and retrieval code 184 include Smalltalk-80 classes and methods that are used respectively to set up and use system 150 for retrieval of video items through video disk player 170. Disk player controller 186 is code that prvides commands to video disk player 170.

CPU 162 also accesses a number od data structures in memory 168, some of which are actually imbedded in set-up code 182 or retrieval code 184 but are shown as separate data structures in FIG. 5 for illustrative purposes. Diagram data 188 is used to recognize which of the previously defined diagrams is closest to that resulting from changes made by the user and to obtain an identifier of the closest previously defined diagram. Diagram/line drawing data structure 190 is a data structure that CPU 162 can access to obtain data indicating which of a number of line drawings corresponds to one of the previously defined diagrams, and line drawing data 192 includes the data for each of these line drawings. Regions/menu title data structure 194 is a data structure that, when accessed with a region of one of the line drawings, provides the data necessary to provide the menu for that region, and, when the user selects an item on the menu, to provide data indicating the corresponding video item to be accessed by video disk player 170.

With this background we turn now to set-up code 182 and retrieval code 184. Appendix A is code defining Smalltalk-80 classes that can be used in performing both these functions on a Macintosh personal computer workstation, so that Appendix A includes both set-up code 182 and retrieval code 184.

2. Setting up the System

Figure 6:
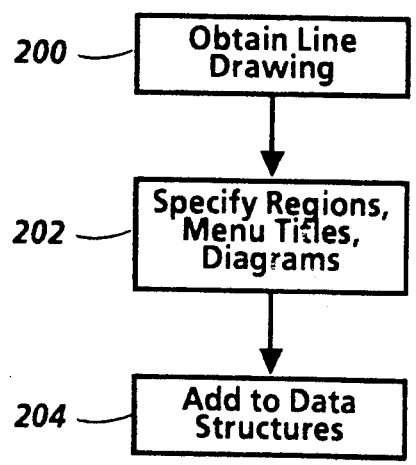
FIG. 6 is a flow chart showing general steps in setting up the system of FIG. 5 for retrieval.

FIG. 6 shows general steps that could be taken by a user in setting up system 150 in FIG. 5 to perform video item retrieval.

System 150 provides retrieval from a body of previously recorded video items. The interactive items that provide the user interface for retrieval can be images that relate to the recorded video items. For example, they could be video stills selected from the recorded video items. Or, if the recorded video items relate to a number of images, those images can be the interactive items. In the implementation of FIG. 5, the images are line drawings to which the video items relate. In any case, the images for the interactive items are converted into an appropriate form for interactive display, such as into the appropriate bitmap form for presentation on display 166.

The step in box 200 obtains one of the line drawings that will be used as an interactive item. This can be done by scanning it into the workstation with a Microtek MS-300A Image Scanner or other standard scanning peripheral. The scanned line drawing can then be read by the Mac II application SuperPaint and converted into a Smalltalk-80 object of type Bitmap by a method macPaintFrom: of the class Tools in Smalltalk-80, commercially available from ParcPlace Systems, Inc. Each line drawing obtained in box 200 can be included in line drawing data 192.

When a line drawing or other image has been obtained in box 200, the user can set up the other data necessary to use it as an interactive item. In box 202, the user specifies the regions of the line drawing that will be selectable units, through the user interface provided by the class MenuDefinitionEditor in Appendix A. The user also specifies the video items corresponding to each region and provides retrieval data and a title for each video item, through the user interfaces provided by the classes FileTransfer, VideoDiskConsole, MenuDefinitionEditor, and DeitySceneTitlesDictionary in Appendix A. The class FileTransfer, which provides methods to look up a list of video items and retrieve items by key words, could be replaced by a commercially available database management system such as SQL available from Oracle Corporation. The video items for a given menu can be specified in a database file of class VideoSegment, which will include a hierarchical list of entries, each with a title, keywords if any, and a descriptor of a video segment; the video segment descriptors obtained from VideoDiskConsole, for example, include a disk ID, a beginning frame ID, and an ending frame ID. These database files could be built interactively through a specialized editor or through a conventional editor.

The user also specifies a diagram for the line drawing through the user interface provided by the class PostureDiagramAuthoringEditor in Appendix A; the diagram could also be specified from previously created diagrams through the class DictionaryOfPostureDiagramForms. Although the diagrams are specified through a manual authoring user interface, they could alternatively be specified gramaticaly and generated computationally.

Having specified the regions, titles, and diagrams, the user can then add then to the appropriate data structures, diagram/line drawing data structure 190 and region/menu title data structure 194, in box 204. In the implementation of Appendix B, diagram/line drawing data structure 190 is an object of class DictionaryOfSkeletonTopologies, which can be edited through the conventional Smalltalk-80 user interface; region/menu title data structure 194 is an object of class DeitySceneTitlesDictionary, a manually constructed cache for forms and menu items that is similar to DictionaryOfSkeletonTopologies.

Having set up system 150 for video item retrieval, a user can then use the system to retrieve video items in accordance with the invention.

3. Using the System

Figure 7:
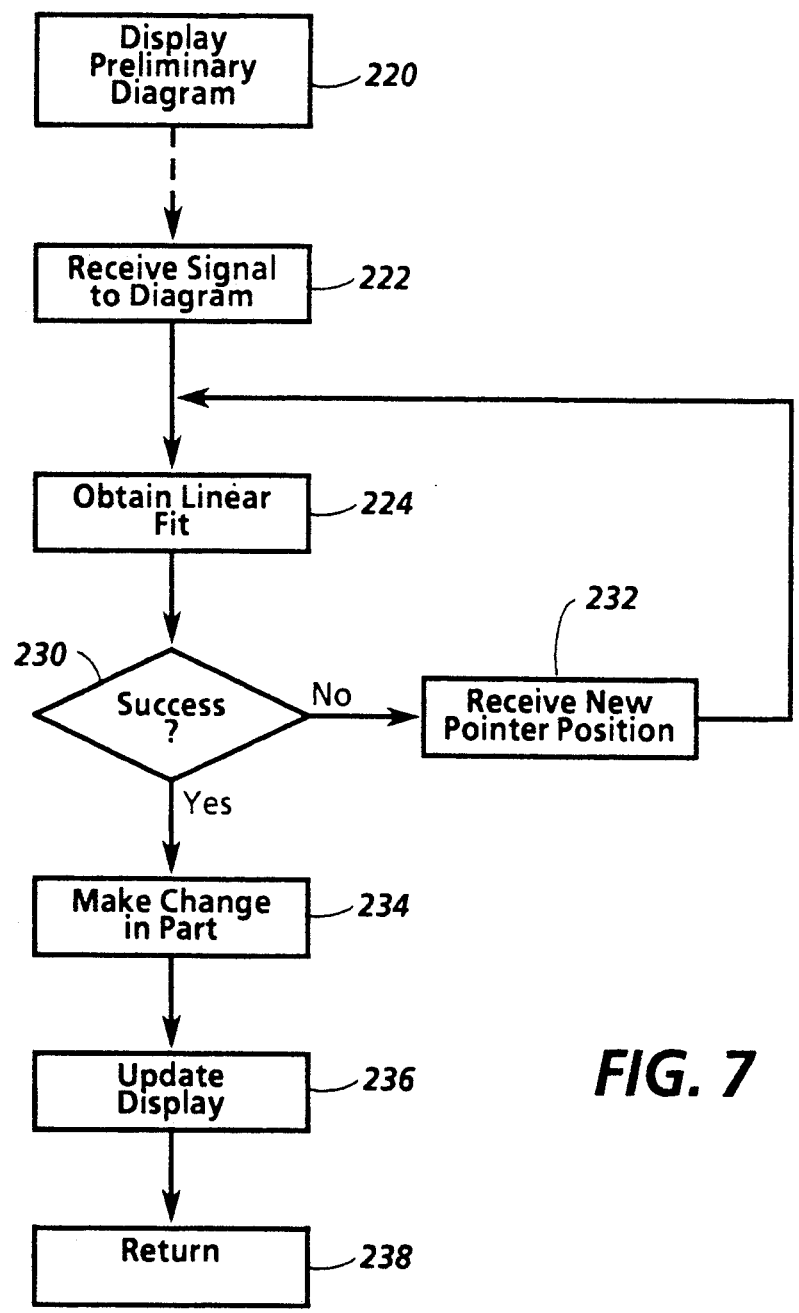
FIG. 7 is a flow chart showing steps performed while the user is modifying a diagram to indicate a desired set of features in the system of FIG. 5.
Figure 7A:
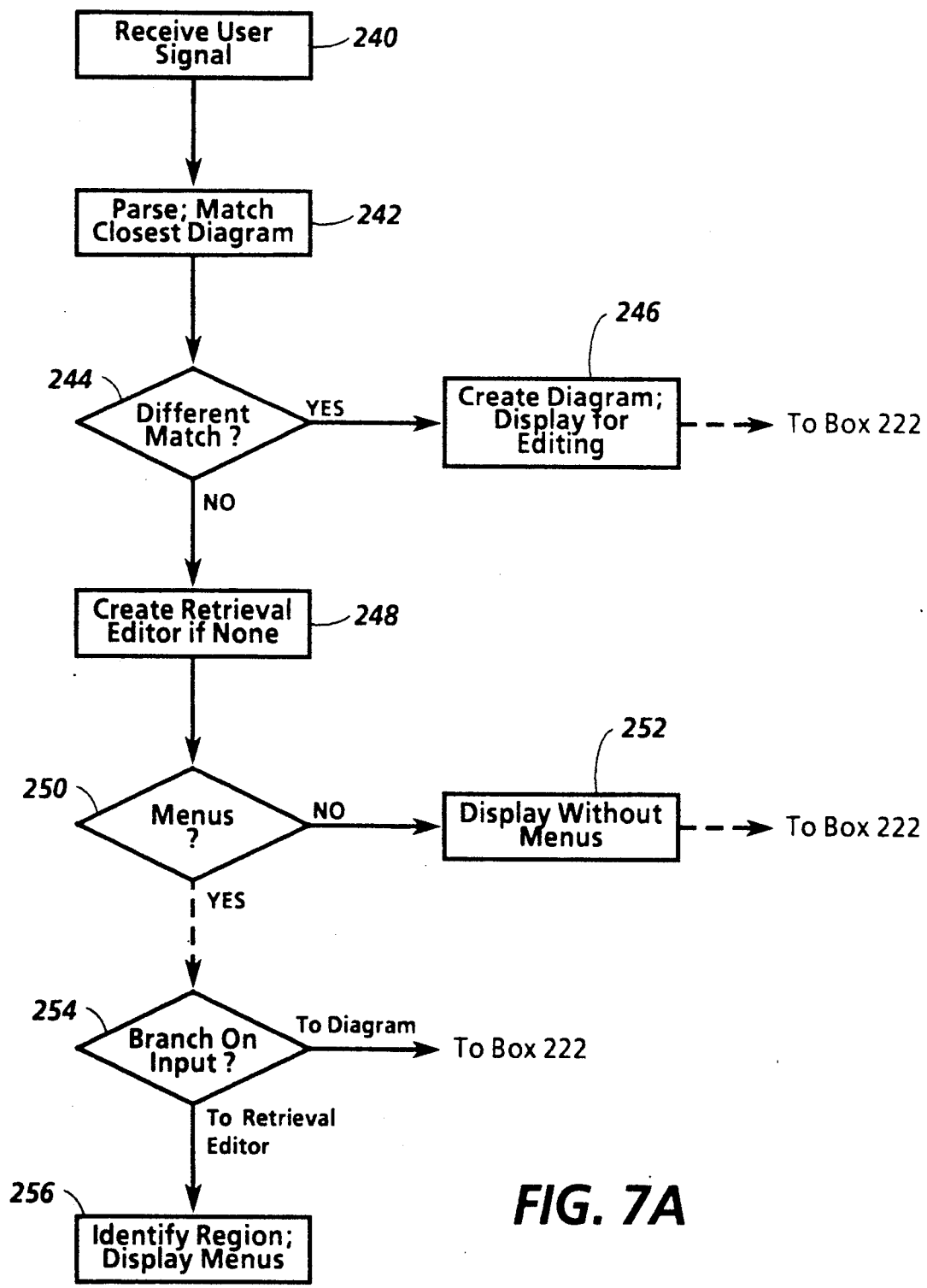
FIG. 7A is a flow chart showing steps performed during retrieval of items from a database with the system of FIG. 5.
Figure 8:
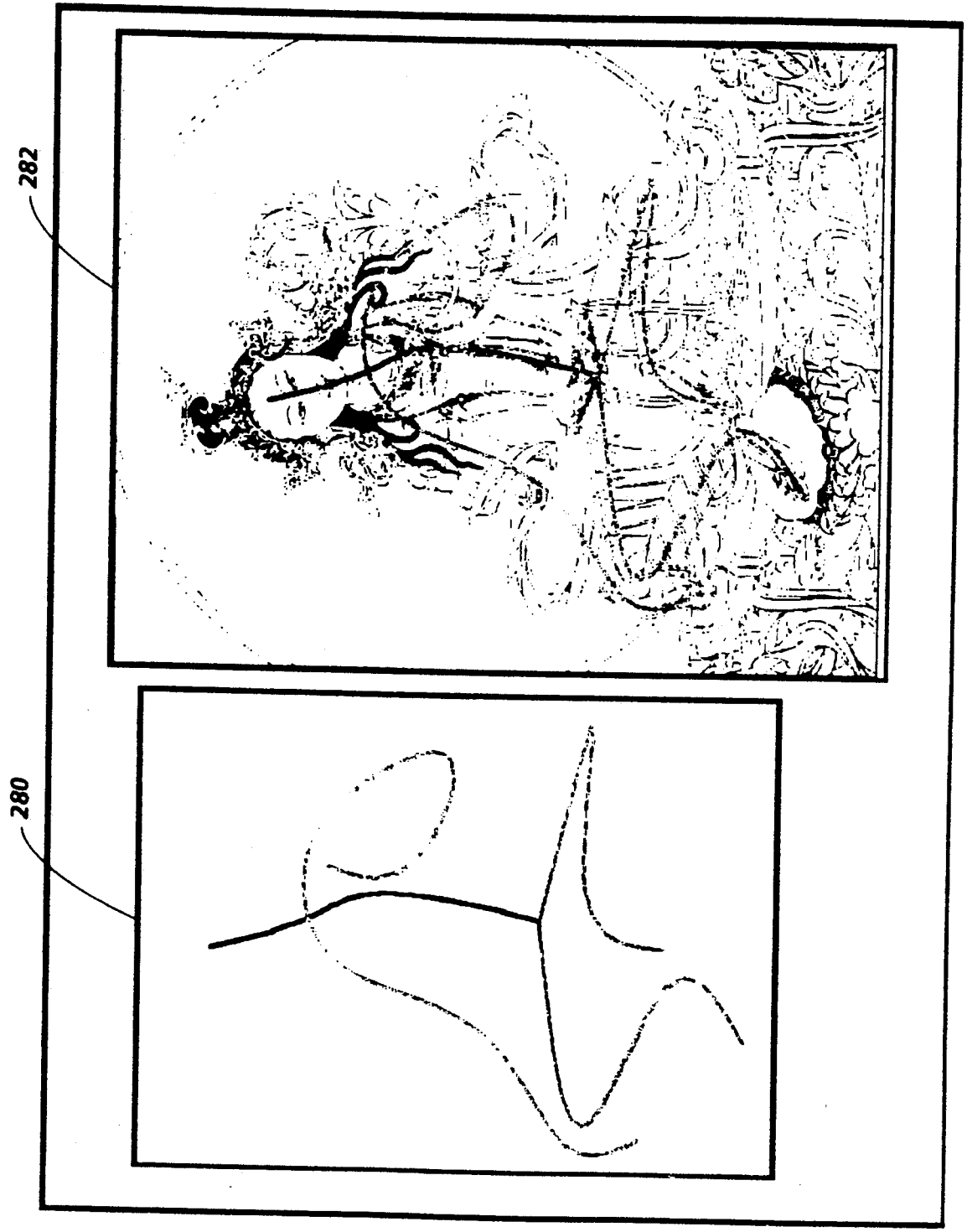
FIG. 8 is a screen image showing a diagram and an interactive line drawing retrieved based on the diagram.
Figure 9:
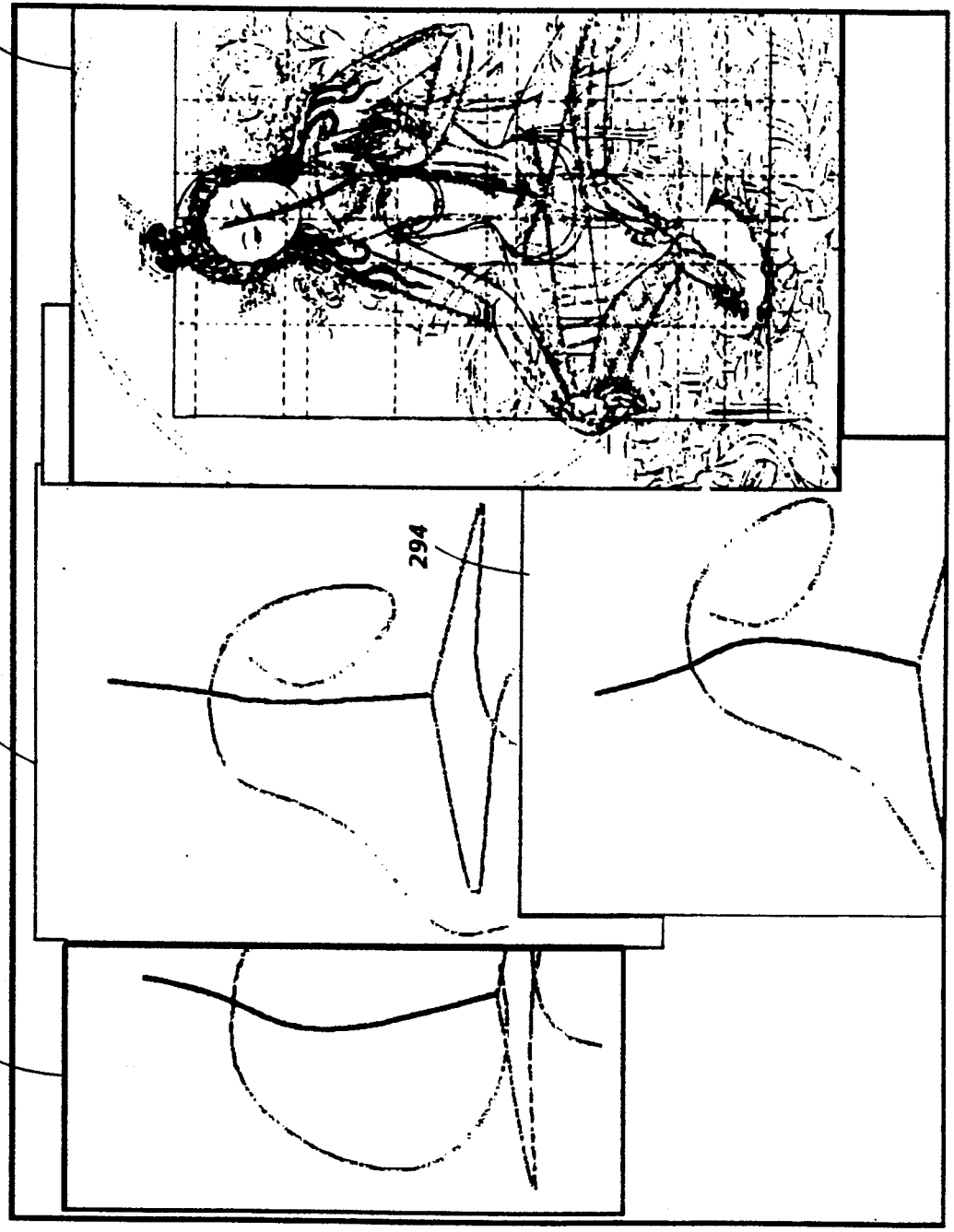
FIG. 9 is a screen image showing a sequence of diagrams and an interactive line drawing retrieved based on the last in the sequence.
Figure 10:
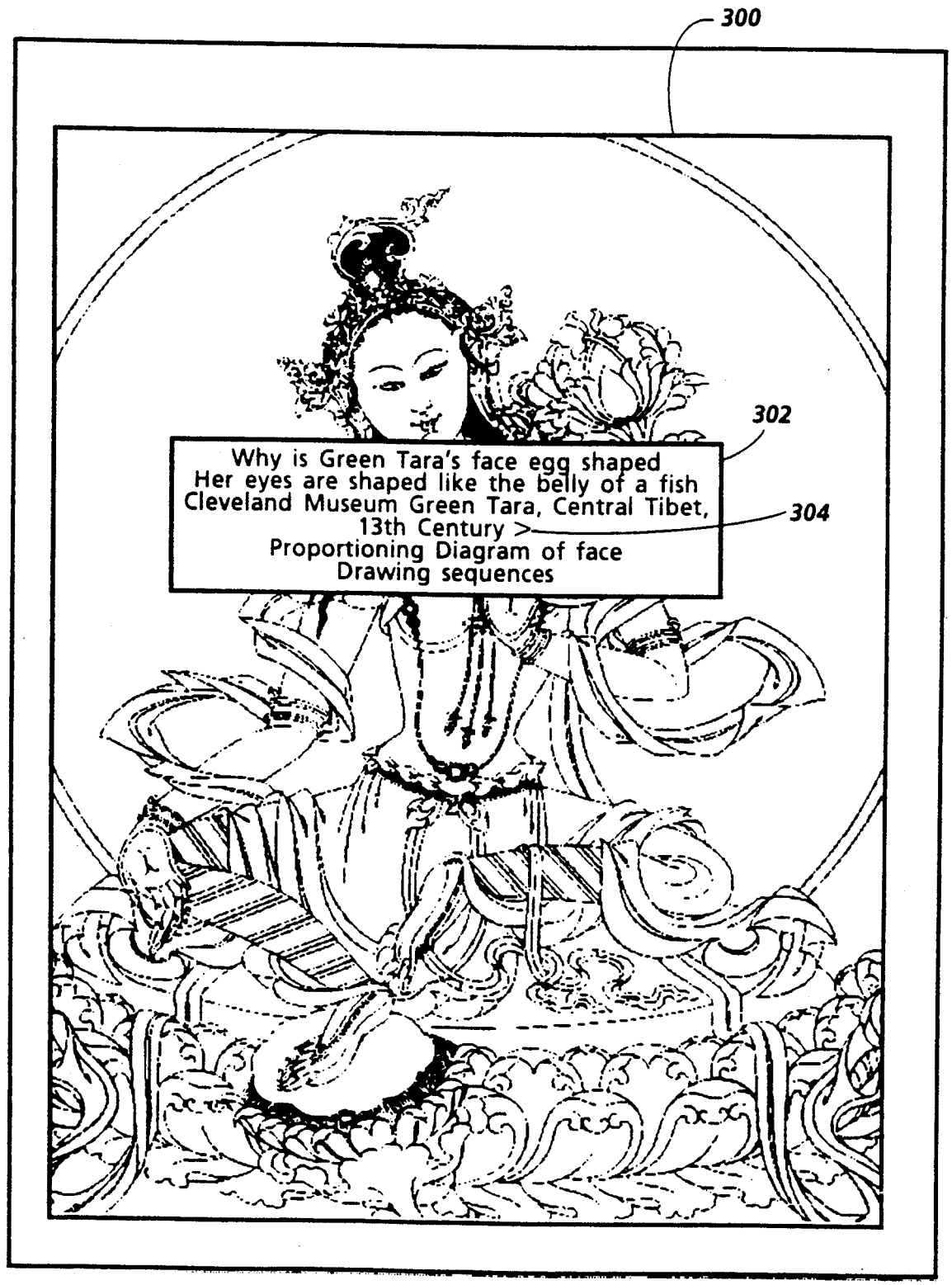
FIG. 10 is a screen image showing an interactive line drawing and a menu for requesting presentation of items from a database.

FIGS. 7-10 illustrate how system 150, set up in the manner described above, can be used for retrieval. FIG. 7 shows steps in editing a diagram, while FIG. 7A shows steps in retrieval. FIG. 8 shows a diagram and the corresponding interactive line drawing, retrieved based on the diagram; FIG. 9 shows a sequence of diagrams and the corresponding interactive line drawing of the last diagram in the sequence; and FIG. 10 shows an interactive line drawing with one of its menus presented.

FIG. 7 shows how the class DeityDatabaseEditor, a subclass of class AbstractThangkaEditor in Appendix A, provides an interactive line drawing for video item retrieval. In response to a signal requesting display of a preliminary diagram for editing, the method createAFreshOnNormalizedPostureDiagram displays a diagram, in box 220. In doing so, it sends messages to instances of several other classes, including PostureDiagram, as well as to itself. When the preliminary diagram is displayed, the system waits for a signal from the user, as indicated by the dashed line leaving box 220.

In box 222, the system receives a signal indicating a selection in the window that includes the preliminary diagram, the signal being provided when the user down clicks a button on the system's mouse while the pointer controlled by the mouse is in the preliminary diagram's window. The method redButtonActivity of class DeityDatabaseEditor responds to this signal, performing most of the remaining steps shown in FIG. 7.

Based on the location of the pointer controlled by the mouste at the time the signal was provided and on the current position indicated by the pointer, the system attempts to find a linear fit with a part of the preliminary diagram, in box 224. This step is handled by the method obtainLinearFitDataBasedOnTheSelectedPoint of the class DeityDatabaseEditor, which sends several messages to an instance of the class DiagramInformation.

The step in box 230 determines whether a linear fit was successfully obtained in box 224: If not, the system receives the next position indicated by the mouse pointer, in box 232, and returns to the step in box 224 to obtain a linear fit; when a linear fit is obtained with part of the preliminary diagram, the step in box 234 obtains gestural input based on where the user up clicks the button and uses that input to make a change in the part that fit, through the method determineNewPoints.

Then, the step in box 236 updates the display to show the changed part, which is handled by the method updateDisplay. Then, the step in box 238 returns.

At this point, the preliminary diagram has been changed to a modified diagram and retrieval can be initiated. FIG. 7A shows steps followed in retrieving an interactive item and in using the interactive item to retrieve a video item.

If the user makes an appropriate signal in box 240, such as by typing the character "r" on the keyboard, the method recognizeDiagram recognizes the modified diagram and begins the steps of FIG. 7A. The step in box 242 parses the modified diagram and then determines which of the diagrams corresponding to interactive line drawings is closest to the modified diagram. This step is handled by the method parseDiagram and by the method matchTopology of the class DictionaryOfSkeletonTopologies. The method parseDiagram returns an instance of class SkeletonTopology identifying the set of visual features of the modified diagram in a manner closely resembling the technique described in the Chinese Temple articles; in other words, each part of the modified diagram is sampled as if it had been provided as a gesture, and the data obtained by sampling it is processed to obtain a set of parameters defining the part. The method matchTopology returns an identifier of the interactive line drawing with the most closely matching diagram, and this identifier therefore serves as data indicating the corresponding interactive line drawing.

The branch in box 244 depends on whether the identifier obtained in box 242 is the same as the previously obtained identifier. If the identifier is different, the step in box 246 creates the diagram corresponding to the new identifier and displays it for editing, then waits for further signals which may return to the step in box 222 in FIG. 7. If the identifier is the same as the previous identifier, the step in box 248 attempts to create an editor for retrieving video items if there is not an existing retrieval editor for the same identifier; this editor will be an instance of class ScenesTitlesOnDeityEditor, created by the method createEditor of class DeitySceneTitlesDictionary. If, however, a retrieval editor cannot be created because the corresponding line drawing has no menus, as determined in box 250, the method createFordDeity of class DeityOutlineFormEditor simply creates a line drawing for display without menus, in box 252, and the system returns to wait for further signals which may take it back to the step in box 222 in FIG. 7. If, however, a retrieval editor is successfully created, the system waits for another signal from the user, as indicated by the dashed line leaving box 250.

When the next signal is received after box 250, the system branches based on whether the signal is directed to the diagram or to the retrieval editor, in box 254. If to the diagram, the step in box 222 in FIG. 7 is performed again. If a selection to the retrieval editor, the step in box 256 responds by identifying the region of the interactive line drawing that is selected and then displaying the titles for that region in a menu so that the user can select a video item to be presented. The methods controlActivity, zoneHasCursorPoint, and startUpMenu:, all methods of the class ScenesTitlesOnDeityEditor, handle this step. In the implementation of Appendix A, each region is a rectangle, and a selection at a point that falls within more than one region is interpreted as a selection of the smallest region surrounding that point. When the user selects a menu item, class VideoDisk- Player responds by controlling the video player to present the requested video item.

FIGS. 8-10 illustrate retrieval with the implementation of Appendix A. FIG. 8 shows diagram 280 and the corresponding interactive line drawing 282 retrieved based on diagram 280. FIG. 9 shows a sequence of diagrams, beginning with diagram 290, which may be the preliminary diagram. Diagram 290 is changed to produce intermediate modified diagram 292, which is further modified to produce modified diagram 294, used to retrieve interactive line drawing 296. Interactive line drawings 282 and 296 have the corresponding diagrams superimposed on them, providing helpful feedback to the user in case the interactive line drawing retrieved is not the one desired. FIG. 10 shows interactive line drawing 300 with menu 302, one of its menus that relates to its face, presented in response to selection of a selectable unit that is a face region of interactive line drawing 300. Menu 302 has five menu items, the third of which has an arrow indicating a submenu that is presented if the user selects that item and drags the pointer to the right.

D. Miscellaneous

The implementation described above is just one of many ways in which the invention could be implemented. For example, the video items, line drawings, and diagrams in this implementation relate to artistic depictions of human-like deities, but the invention could be applied to other types of visual information. As noted above, however, some of the techniques according to the invention make use of the fact that the items in the database, in this case video items, relate to the deity line drawings, which in turn have features resembling the diagrams. Similar relationships occur between other types of information, and these techniques could also be used for such other information. For example, a system according to the invention might employ diagrams of parts or assembly structures as the preliminary and modified diagrams and CAD drawings that show the part or structure more completely as the interactive items.

The code in Appendix A is written for a Mac II personal computer workstation, but the invention has also been implemented with similar code on a Sun 3/160 workstation, and similar code might be written for any other suitable workstation. Furthermore, the invention might be implemented in a system in which memory and processor functions are distributed among workstations and servers of a network. The processor function need not be performed by a single CPU, but might be performed by multiple processors on a workstation.

Rather than two displays, it would be within the scope of the invention to include a single display both for presenting the interactive items and for presenting the retrieved visual items; or more than two displays could be used. The interactive items, rather than being used to retrieve video items, might be used to retrieve further interactive images, diagrams, or other visual items, or any combination of types of visual items. The interactive items might also be used to request any other operations. Further, the preliminary and modified diagrams might be used to retrieve video items for display in parallel with display of the interactive items.

As described above, the implementation of Appendix A updates a diagram while the user is making the gesture indicating a change in the diagram, to provide feedback to the user on how the diagram would appear ere the user to end the gesture at any given point. It 'ould be within the scope of the invention, however, to change the diagram only at the conclusion of a gesture by the user.

In the implementation of Appendix A, the data and signals based on a gesture indicate the beginning point and ending point of a gesture as provided by moving a mouse. A wide variety of other gestural input would be within the scope of the invention. For example, rather than a mouse, the gestural input might be provided through a joystick or any other sensor of motion by a user's hand, head, eye or any other body part. Rather than a button click indicating the start and end of a gesture, the start and end could be indicated by a particular movement or a change in rate or direction of motion such as going from and to a state of rest. Furthermore, the gestural input might include more complete information about the path of a gesture, such as periodic samples of position at a sufficient frequency to indicate additional expressive content of the gesture. Or analog information about the path might be provided continuously. Also, it would be within the scope of some aspects of the invention to take the gesture itself as indicating the set of features for retrieval of an interactive item, rather than to take the gesture as indicating a modification of a diagram; this might be implemented with the techniques described in the Chinese Temple articles, and it might also be possible to apply unification or other recognition techniques to gestural input over a space of stick figures or other simple diagrams.

In the implementation of Appendix A, a single diagram is provided as the preliminary diagram. ILt would be within the scope of the invention, however, to permit the user to select from a number of preliminary diagramms, each providing a respective set of features that could be changed to a desired set of features.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

MouseMenuController subclass: #MenuDefinitionEditor
    instanceVariableNames: 'deityName canvas selectedRectangle currentSelection lanscapeMenu haloMenu faceMenu throneMenu jewelryMenu leftGestureMenu rightGestureMenu nimbusMenu landscapeMenu metaDiscussionMenu clothingMenu offeringsMenu '
    classVariableNames: 'YellowButtonMenu '
    poolDictionaries: ''
    category: 'Thangka-VideoScenes'

*MenuDefinitionEditor comment:*
*'Copyright (c) Xerox Corporation 1987, 1988'*

!MenuDefinitionEditor methodsFor: 'inquiries & assignment'
allTheMenusInOneCollection
    | tempCollection |
    tempCollection ← OrderedCollection new.
    tempCollection add: metaDiscussionMenu; add: landscapeMenu; add: nimbusMenu; add: haloMenu; add: faceMenu; add: jewelryMenu; add: leftGestureMenu; add: rightGestureMenu; add: clothingMenu; add: throneMenu; add: offeringsMenu.
    ↑tempCollection
canvas
    ↑canvas
canvas: aForm canvas ← aForm
deityName: aName
    deityName ← aName !MenuDefinitionEditor methodsFor: 'initialize'
flushCurrentSelection
    currentSelection = 'metaDiscussion' ifTrue: [metaDiscussionMenu ← AbstractDeityMenuZones new].
    currentSelection = 'halo' ifTrue: [haloMenu ← AbstractDeityMenuZones new].
    currentSelection = 'face' ifTrue: [faceMenu ← AbstractDeityMenuZones new].
    currentSelection = 'throne' ifTrue: [throneMenu ← AbstractDeityMenuZones new].
    currentSelection = 'jewelry' ifTrue: [jewelryMenu ← AbstractDeityMenuZones new].
    currentSelection = 'leftGesture' ifTrue: [leftGestureMenu ← AbstractDeityMenuZones new].
    currentSelection = 'rightGesture' ifTrue: [rightGestureMenu ← AbstractDeityMenuZones new].
    currentSelection = 'nimbus' ifTrue: [nimbusMenu ← AbstractDeityMenuZones new].
    currentSelection = 'landscape' ifTrue: [landscapeMenu ← AbstractDeityMenuZones new].
    currentSelection = 'clothing' ifTrue: [clothingMenu ← AbstractDeityMenuZones new].
    currentSelection = 'offerings' ifTrue: [offeringsMenu ← AbstractDeityMenuZones new]
initialize
    self initializeMenus.
    super initialize
initializeMenus
    metaDiscussionMenu ← AbstractDeityMenuZones new.
    lanscapeMenu ← AbstractDeityMenuZones new.
    haloMenu ← AbstractDeityMenuZones new.

```
faceMenu ← AbstractDeityMenuZones new.
throneMenu ← AbstractDeityMenuZones new.
jewelryMenu ← AbstractDeityMenuZones new.
leftGestureMenu ← AbstractDeityMenuZones new.
rightGestureMenu ← AbstractDeityMenuZones new.
nimbusMenu ← AbstractDeityMenuZones new.
landscapeMenu ← AbstractDeityMenuZones new.
clothingMenu ← AbstractDeityMenuZones new.
offeringsMenu ← AbstractDeityMenuZones new
```

!MenuDefinitionEditor methodsFor: 'menu messages'
addExtent

```
    | zone |
    zone ← selectedRectangle moveBy: -1 * self view displayBox origin.

currentSelection = 'metaDiscussion' ifTrue: [metaDiscussionMenu zonesAdd: zone].
    currentSelection = 'halo' ifTrue: [haloMenu zonesAdd: zone].
    currentSelection = 'face' ifTrue: [faceMenu zonesAdd: zone].
    currentSelection = 'throne' ifTrue: [throneMenu zonesAdd: zone].
    currentSelection = 'jewelry' ifTrue: [jewelryMenu zonesAdd: zone].
    currentSelection = 'leftGesture' ifTrue: [leftGestureMenu zonesAdd: zone].
    currentSelection = 'rightGesture' ifTrue: [rightGestureMenu zonesAdd: zone].
    currentSelection = 'nimbus' ifTrue: [nimbusMenu zonesAdd: zone].
    currentSelection = 'landscape' ifTrue: [landscapeMenu zonesAdd: zone].
    currentSelection = 'clothing' ifTrue: [clothingMenu zonesAdd: zone].
    currentSelection = 'offerings' ifTrue: [offeringsMenu zonesAdd: zone].
    selectedRectangle ← nil
``` addMenu

*"note: a menu file might be named*
*[]<ThangkaImages><GreenTara>metaDiscussion.menuText'*
*(StringTree parseFrom: (FileStream*
*oldFileNamed:'[]<ThangkaImages><GreenTara>metaDiscussion.menuText')*
*contents readStream) menu startUp "*

```
    | menuFileName |
    menuFileName ← '[]<ThangkaImages>', deityName, '>', currentSelection, '.menuText'.
    currentSelection = 'metaDiscussion' ifTrue: [metaDiscussionMenu menu: menuFileName].
    currentSelection = 'halo' ifTrue: [haloMenu menu: menuFileName].
    currentSelection = 'face' ifTrue: [faceMenu menu: menuFileName].
    currentSelection = 'throne' ifTrue: [throneMenu menu: menuFileName].
    currentSelection = 'jewelry' ifTrue: [jewelryMenu menu: menuFileName].
    currentSelection = 'leftGesture' ifTrue: [leftGestureMenu menu: menuFileName].
    currentSelection = 'rightGesture' ifTrue: [rightGestureMenu menu: menuFileName].
    currentSelection = 'nimbus' ifTrue: [nimbusMenu menu: menuFileName].
    currentSelection = 'landscape' ifTrue: [landscapeMenu menu: menuFileName].
    currentSelection = 'clothing' ifTrue: [clothingMenu menu: menuFileName].
    currentSelection = 'offerings' ifTrue: [offeringsMenu menu: menuFileName]
``` addStringTree

```
    | menu |
    menu ← (StringTree parseFrom: (FileStream oldFileNamed: '[]<ThangkaImages>', deityName,
currentSelection, '.menuText') contents readStream) menu.
``` redButtonActivity
    selectedRectangle ← Rectangle fromUser.
    Display
        border: selectedRectangle
        width: 1
        rule: Form under
        mask: Form black.
    view accept.
    view updateDisplay
retrieveZones
    | aFileName outFile collection nRectangles rectangle origin extent |
    collection ← self allTheMenusInOneCollection. self halt.
    aFileName ← '|<ThangkaImages>', deityName, 'menus.rectangularZones'.
    outFile ← FileStream oldFileNamed: aFileName.
    outFile binary.
    1 to: collection size do:
        [:index |
        outFile nextWordPut: (nRectangles ← (collection at: index) size).
        1 to: nRectangles do:
            [:counter |
            rectangle ← (collection at: index)
                        at: counter.
            origin ← rectangle origin.
            extent ← rectangle extent.
            outFile nextWordPut: origin x.
            outFile nextWordPut: origin y.
            outFile nextWordPut: extent x.
            outFile nextWordPut: extent y]].
    outFile close.
self halt.
save
    | aFileName outFile collection nRectangles rectangle origin collectionOfZones corner |
    collection ← self allTheMenusInOneCollection.
    self halt.
    aFileName ← '|<ThangkaImages>', deityName, 'menus.rectangularZones'.
    outFile ← FileStream newFileNamed: aFileName.
    outFile binary.
    1 to: 11 do:
        [:index |
        collectionOfZones ← collection at: index.
        outFile nextWordPut: (nRectangles ← collectionOfZones zones size).
        1 to: nRectangles do:
            [:counter |
            rectangle ← collectionOfZones zones at: counter.
            origin ← rectangle origin.
            corner ← rectangle corner.
            outFile nextWordPut: origin x.
            outFile nextWordPut: origin y.
            outFile nextWordPut: corner x.
            outFile nextWordPut: corner y]].
    outFile close.

```
    self halt
selectClothingMenu
    currentSelection ← 'clothing'.
selectFaceMenu
 currentSelection ← 'face'
selectHaloMenu
    currentSelection ← 'halo'
selectJewelryMenu
 currentSelection ← 'jewelry'
selectLandscapeMenu
    currentSelection ← 'landscape'
selectLeftGestureMenu
    currentSelection ← 'leftGesture'
selectMetaDiscussionMenu
    currentSelection ←'metaDiscussion'
selectNimbusMenu
    currentSelection ←'nimbus'
selectOfferingsMenu
    currentSelection ← 'offerings'
selectRightGestureMenu
    currentSelection ← 'rightGesture'
selectThroneMenu
        currentSelection ← 'throne'
```

!MenuDefinitionEditor methodsFor: 'control defaults'
yellowButtonActivity

*"Determine which item in the yellow button pop-up menu is selected. If one is selected, then send the corresponding message to the object designated as the menu message receiver."*

```
| result |
result ← YellowButtonMenu startUp.
result = = nil ifFalse: [self menuMessageReceiver perform: result]
```

"-- -- -- -- -- -- -- -- -- -- -- -- -- -- -- -- --"!

MenuDefinitionEditor class
    instanceVariableNames: ''

!MenuDefinitionEditor class methodsFor: 'class initialization'
initialize

*"MenuDefinitionEditor initialize."*

YellowButtonMenu ← (StringTree parseFrom: '

(currentSelection:
    (metaDiscussionMenu[selectMetaDiscussionMenu] lansdcapeMenu[selectLandscapeMenu]
haloMenu[selectHaloMenu]
faceMenu[selectFaceMenu]
throneMenu[selectThroneMenu]

jewelryMenu[selectJewelryMenu]
leftGestureMenu[selectLeftGestureMenu]
rightGestureMenu[selectRightGestureMenu]
nimbusMenu[selectNimbusMenu]
clothingMenu[selectClothingMenu]
offeringsMenu[selectOfferingsMenu] ))
(addExtent [addExtent])
(addMenu [addMenu])
(flushCurrentSelection[flushCurrentSelection])
(flushAndStartAgain[initialize])
(save [save])

` readStream) menu

!MenuDefinitionEditor class methodsFor: 'instance creation'
createOnImage: aDeityName
    *"Creates a StandardSystemView for a Digitizer on a scanned image of a*
    *Thangka proportioning diagram"*

| formView topView extent aForm menuDefinitionEditor |
    formView ← FormHolderView new model: (aForm ← Form readFrom: '[]<ThangkaImages>', aDeityName
, '.LineDrawingBitMap').
    menuDefinitionEditor ← self new.
    menuDefinitionEditor canvas: aForm.
    menuDefinitionEditor deityName: aDeityName.
    formView controller: menuDefinitionEditor.
    topView ← StandardSystemView new.
    topView model: aForm.
    topView addSubView: formView.
    topView label: 'aMenuDefinitionEditor'.
    topView borderWidth: 2.
    extent ← topView viewport extent.
    topView minimumSize: extent.
    topView maximumSize: extent.
    topView controller open
    *"MenuDefinitionEditor createOnImage:*
    *'Shakyamuni2'"*

MenuDefinitionEditor initialize

MouseMenuController subclass: #PostureDiagramAuthoringEditor
    instanceVariableNames: 'form postureDiagram currentRepresent
splineCurveOrLinearFit '
    classVariableNames: 'YellowButtonMenu '
    poolDictionaries: ''
    category: 'Thangka-Digitizing'

*PostureDiagramAuthoringEditor comment:*
*'Copyright (c) Xerox Corporation, 1987, 1988'*

!PostureDiagramAuthoringEditor methodsFor: 'initialize-release'
flush
    currentRepresentation ← nil
initialize
    super initialize.
    self setVariables.

reInitialize
    self flush.
    form ← (Form new extent: 2 @ 2) black.
    currentRepresentation ← splineCurveOrLinearFit = 's'
            ifTrue: [Spline new]
            ifFalse: [splineCurveOrLinearFit = 'c'
                  ifTrue: [Curve new]
                  ifFalse: [LinearFit new]].
    currentRepresentation form: form !PostureDiagramAuthoringEditor methodsFor: 'basic control sequen
controlActivity
    self viewHasCursor
        ifTrue:
            [sensor redButtonPressed ifTrue: [↑self redButtonActivity].
            sensor yellowButtonPressed ifTrue: [↑self yellowButtonActivity].
            sensor blueButtonPressed ifTrue: [↑self blueButtonActivity].
            *"self dragSpline"*]

!PostureDiagramAuthoringEditor methodsFor: 'private'
addKnotPoint: aPoint
    | fatForm |
    currentRepresentation add: aPoint.
    fatForm ← Form new extent: 5 @ 5.
    fatForm black.
    fatForm
        displayOn: Display
        at: aPoint
        clippingBox: view insetDisplayBox
        rule: Form over
        mask: Form black

*"Transcript show: currentSpline collectionOfPoints printString; cr"*
display
    splineCurveOrLinearFit = 'c' ifTrue: [self displayCurve].
    splineCurveOrLinearFit = 'l' ifTrue: [self displayLinearFit].
    splineCurveOrLinearFit = 's' ifTrue: [self displaySpline]
displayAndReInitialize
    currentRepresentation
        displayOn: Display
        at: 0 @ 0
        clippingBox: view insetDisplayBox
        rule: Form over
        mask: Form black.
    self updateView.
    self reInitialize
displayCurve
    currentRepresentation
        displayOn: Display
        at: 0 @ 0
        clippingBox: view insetDisplayBox
        rule: Form over
        mask: Form black.

displayLinearFit
    currentRepresentation
        displayOn: Display
        at: 0 @ 0'
        clippingBox: view insetDisplayBox
        rule: Form over
        mask: Form black.
displaySpline
    currentRepresentation computeCurve.
    currentRepresentation
        displayOn: Display
        at: 0 @ 0
        clippingBox: view insetDisplayBox
        rule: Form over
        mask: Form black
dragSpline
    currentSpline collectionOfPoints size < 1 ifFalse: [↑Cursor normal showWhile: [self trackSplineUntil:
[sensor anyButtonPressed or: [sensor keyboardPressed or: [self viewHasCursor not]]]]]
initializeYellowButtonMenu
    "self yellowButtonMenu: YellowButtonMenu
        yellowButtonMessages: YellowButtonMessages"
rubberBandCurve: startPoint to: endPoint until: aBlock
    "Return a curve"

| curve previousApex apex |
    curve ← Curve new.
    curve firstPoint: startPoint.
    curve secondPoint: (previousApex ← sensor cursorPoint).
    curve thirdPoint: endPoint.
    curve form: form.
    curve
        displayOn: Display
        at: 0 @ 0
        clippingBox: view insetDisplayBox
        rule: Form reverse
        mask: Form black.
[aBlock value]
    whileFalse: [(apex ← sensor cursorPoint) = previousApex
            ifFalse:
                [curve
                    displayOn: Display
                    at: 0 @ 0
                    clippingBox: view insetDisplayBox
                    rule: Form reverse
                    mask: Form black.
                curve secondPoint: apex.
                curve
                    displayOn: Display
                    at: 0 @ 0
                    clippingBox: view insetDisplayBox
                    rule: Form reverse
                    mask: Form black.
                previousApex ← apex]].
curve
    displayOn: Display
    at: 0 @ 0

```
            clippingBox: view insetDisplayBox
            rule: Form reverse
            mask: Form black.
        currentSegment listOfPointsAdd: curve firstPoint.
        currentSegment listOfPointsAdd: curve secondPoint.
        currentSegment listOfPointsAdd: curve thirdPoint.
        "curveInfo at: 1 put: curve firstPoint.
        curveInfo at: 2 put: curve secondPoint.
        curveInfo at: 3 put: curve thirdPoint."
        ↑curve
setVariables
        form ← (Form new extent: 2 @ 2) black.
        currentRepresentation ← LinearFit new.
        currentRepresentation form: form.
        postureDiagram ← PostureDiagram new
trackFormUntil: aBlock
        | previousPoint cursorPoint |
        previousPoint ← sensor cursorPoint.
        form
            displayOn: Display
            at: previousPoint
            rule: Form reverse.
        [aBlock value]
            whileFalse:
                [cursorPoint ← sensor cursorPoint.
                cursorPoint ~= previousPoint
                    ifTrue:
                        [form
                            displayOn: Display
                            at: previousPoint
                            rule: Form reverse.
                        form
                            displayOn: Display
                            at: cursorPoint
                            rule: Form reverse.
                        previousPoint ← cursorPoint]].
        form
            displayOn: Display
            at: previousPoint
            rule: Form reverse.
        ↑previousPoint
trackSplineUntil: aBlock
        | previousPoint cursorPoint |
        previousPoint ← sensor cursorPoint.
        [aBlock value]
            whileFalse:
                [cursorPoint ← sensor cursorPoint.
                cursorPoint ~= previousPoint
                    ifTrue:
                        [currentSpline computeCurve.
                        currentSpline
                            displayOn: Display
                            "at: previousPoint
                            rule: Form reverse".
                        previousPoint ← cursorPoint]].
        ↑previousPoint
```

!PostureDiagramAuthoringEditor methodsFor: 'control defaults'
yellowButtonActivity
> *"Determine which item in the yellow button pop-up menu is selected. If one is selected, then send the corresponding message to the object designated as the menu message receiver."*

```
| result |
result ← YellowButtonMenu startUp.
result = = nil ifFalse: [self menuMessageReceiver perform: result]
```

!PostureDiagramAuthoringEditor methodsFor: 'menu messages'
center
```
| clickPoint |
Cursor normal show.
clickPoint ← Sensor waitButton.
(Form new extent: 4 @ 4) darkGray displayAt: clickPoint.
postureDiagram center: clickPoint
```
curve
```
self reInitialize.
splineCurveOrLinearFit ← 'c'
```
deleteKnotPoint
```
currentRepresentation collectionOfPoints removeLast
```
erase
```
view cancel.
self reInitialize
```
headToNavel
```
postureDiagram headToNavel: currentRepresentation collectionOfPoints.
self displayAndReInitialize
```
leftArm
```
postureDiagram leftArm: currentRepresentation collectionOfPoints.
self displayAndReInitialize
```
leftFoot

```
postureDiagram leftFoot: currentRepresentation collectionOfPoints.
self displayAndReInitialize
```
leftGesture

```
postureDiagram leftGesture: currentRepresentation collectionOfPoints.
self displayAndReInitialize
```
leftLeg

```
postureDiagram leftLeg: currentRepresentation collectionOfPoints.
self displayAndReInitialize
```
linearFit
```
self reInitialize.
splineCurveOrLinearFit ← 'l'
```
lowerRight
```
| clickPoint |
Cursor normal show.
clickPoint ← Sensor waitButton.
(Form new extent: 4 @ 4) gray displayAt: clickPoint.
postureDiagram lowerRight: clickPoint
``` redButtonActivity
    | point |
    point ← sensor cursorPoint.
    Cursor normal showWhile: [self addKnotPoint: point].
    sensor waitNoButton
rightArm postureDiagram rightArm:currentRepresentation collectionOfPoints.
        self displayAndReInitialize
rightFoot postureDiagram rightFoot:currentRepresentation collectionOfPoints.
        self displayAndReInitialize
rightGesture postureDiagram rightGesture:currentRepresentation collectionOfPoints.
        self displayAndReInitialize
rightLeg postureDiagram rightLeg: currentRepresentation collectionOfPoints.
        self displayAndReInitialize
savePostureDiagram
        postureDiagram setUpHooksBetweenSplines; saveThePostureDiagram
spline
        self reInitialize.
        splineCurveOrLinearFit ← 's'
updateView
        view updateDisplay.
        view accept
upperLeft
        | clickPoint |
        Cursor normal show.
        clickPoint ← Sensor waitButton.
        (Form new extent: 4 @ 4) gray displayAt: clickPoint.
        postureDiagram upperLeft: clickPoint

"-- -- -- -- -- -- -- -- -- -- -- -- -- -- -- -- --"!

PostureDiagramAuthoringEditor class
    instanceVariableNames: ''

!PostureDiagramAuthoringEditor class methodsFor: 'instance creation'
createOnScannedImage: aFileName
    *"Creates a StandardSystemView for a Digitizer on a scanned image of a
    Thangka proportioning diagram"*

| formView topView extent aForm postureEditor |
    formView ← FormHolderView new model: (aForm ← Form readFrom: aFileName).
    postureEditor ← self new.
    formView controller: postureEditor.
    topView ← StandardSystemView new.
    topView model: aForm.
    topView addSubView: formView.
    topView label: 'PostureDiagram'.

```
topView borderWidth: 2.
extent ← topView viewport extent.
topView minimumSize: extent.
topView maximumSize: extent.
topView controller open
"PostureDiagramEditor createOnScannedImage:
[](ThangkaImages)GenericBuddha.scannedform'"
```

!PostureDiagramAuthoringEditor class methodsFor: 'class initialization'
initialize

*"PostureDiagramEditor initialize."*

```
YellowButtonMenu ← (StringTree parseFrom: '

(representation:

(spline[spline]
    curve[curve]
linearFit[linearFit]))
(flush[flush])
(spline: (insertKnotPoint[insertKnotPoint]
eraseKnotPoint[eraseKnotPoint]))
(computeAndDisplay[display]
erase[erase]
assignRepresentation: (headToNavel[headToNavel]
    leftArm[leftArm]
    leftGesture[leftGesture]
    rightArm[rightArm]
    rightGesture[rightGesture]
    leftLeg[leftLeg]
    leftFoot[leftFoot]
    rightLeg[rightLeg]
    rightFoot[rightFoot]))
(extent:
    (center[center]
    upperLeft[upperLeft]
    lowerRight[lowerRight]))
(save[savePostureDiagram])

' readStream) menu

PostureDiagramAuthoringEditor initialize
```

```
Object variableSubclass: #DictionaryOfPostureDiagramForms
    instanceVariableNames: ''
    classVariableNames: 'TableContents TableNames TableOffsets '
    poolDictionaries: ''
    category: 'Thangka-VideoScenes'
```

_Copyright (c) Xerox Corporation, 1987, 1988_

DictionaryOfPostureDiagramForms class
    instanceVariableNames: ''

DictionaryOfPostureDiagramForms class methodsFor: Initialize initialize
```
    TableContents ← OrderedCollection new.
    TableNames ← OrderedCollection new.
    "self initializeShakyamuni1."
    self initialize: 'Shakyamuni2'.
    "self initialize: 'Shakyamuni3'."
    self initialize: 'GreenTara'.
    self initialize: 'Saraswati'.
    self initialize: 'Sukhasiddhi'.
    self initialize: 'Vajravarahi'.
    self initialize: 'Milarepa'.
"   self initialize: 'Mahakala1'."
    self initializeTableOffsets
    "DictionaryOfPostureDiagramForms initialize"
``` initialize: deityName
```
    | post |
    TableNames add: deityName.
    post ← PostureDiagram createAPostureDiagramOfDeityNamed: deityName
FromTheseLinesResidingOnFileNamed:  'thangka:' , deityName , '.postureDiagram'.
    post normalizeCoordinates.
    TableContents add: post formWithPostureDiagramAsContinousSplines
``` initializeTableOffsets
```
    TableOffsets ← OrderedCollection new: 7.
    TableOffsets add: 63 @ 123; add: 35 @ 74; add: 62 @ 89; add: 78 @ 131; add: 44 @ 82; add: 40 @ 65; add: 0 @ 0
    " Order of offsets 'Shakyamuni2'.
     'GreenTara'
     'Saraswati'
     'Sukhasiddhi'
     'Vajravarahi'
     'Milarepa'
     'Mahakala1'"
```

DictionaryOfPostureDiagramForms class methodsFor: private computeOffsetOf: aDeityName
```
    | deityForm postureForm offset |
```

```
deityForm ← Form readFrom: '[]<ThangkaImages>', aDeityName, '.LineDrawingBitMap'.
deityForm displayAt: 200 @ 200.
postureForm ← self supplyFormOf: aDeityName.
offset ← (Cursor blank showWhile: [self trackForm: postureForm Until: [Sensor anyButtonPressed]])
-(200@200).
offset inspect
"(DictionaryOfPostureDiagramForms computeOffsetOf: 'Mahakala1')"
``` trackForm: form Until: aBlock
```
| previousPoint cursorPoint |
previousPoint ← Sensor cursorPoint.
form
    displayOn: Display
    at: previousPoint
    rule: Form reverse.
[aBlock value]
    whileFalse:
        [cursorPoint ← Sensor cursorPoint.
        cursorPoint ~= previousPoint
            ifTrue:
                [form
                    displayOn: Display
                    at: previousPoint
                    rule: Form reverse.
                form
                    displayOn: Display
                    at: cursorPoint
                    rule: Form reverse.
                previousPoint ← cursorPoint]].
form
    displayOn: Display
    at: previousPoint
    rule: Form reverse.
↑previousPoint
```

DictionaryOfPostureDiagramForms class methodsFor: Inquiries supplyFormAndOffsetOf: deityName
```
1 to: TableNames size do: [:index | deityName = (TableNames at: index) ifTrue: [↑OrderedCollection
with: (TableContents at: index)
        with: (TableOffsets at: index)
    "(DictionaryOfPostureDiagramForms supplyFormOf: 'GreenTara')"]]
``` supplyFormOf: deityName
```
1 to: TableNames size do: [:index | deityName = (TableNames at: index) ifTrue: [↑(TableContents at:
index)
    "(DictionaryOfPostureDiagramForms supplyFormOf: 'GreenTara') "]]
```

TableNames
```
↑TableNames
"(DictionaryOfPostureDiagramForms TableNames)"
```

Object subclass: #FileTransfer
instanceVariableNames: ''
classVariableNames: ''
poolDictionaries: ''
category: 'Thangka-FileTransfers'

*Copyright (c) Xerox Corporation, 1988*

FileTransfer class
   instanceVariableNames: ''

FileTransfer class methodsFor: examples convertOldFile: oldFile toCoral: newName
   " converts a File of Strings into a coral collection "

| fileOfStrings bigString collectionOfStrings point aCollection aString |
   aCollection ← SharedCollection newName: newName.
   fileOfStrings ← FileStream oldFileNamed: oldFile.
   bigString ← fileOfStrings contentsOfEntireFile.
   fileOfStrings close.
   collectionOfStrings ← Compiler evaluate: bigString.
   bigString ← nil.
   1
      to: collectionOfStrings size
      by: 2
      do:
         [:index |
         aString ← collectionOfStrings at: index.
         point ← Point readFrom: (collectionOfStrings at: index + 1).
         aCollection add: (Association key: aString value: point)].
   aCollection update.
   aCollection release.
   "FileTransfer convertOldFile: 'newTranscriptStage2LD2'
   toCoral: 'newTranscriptStage2LD2@private' "

covertOldFile: oldFile toNewBinaryFile: newFile
   " converts a File of Strings into binary format"

| fileOfStrings bigString collectionOfStrings newBinaryFile counter point |
   newBinaryFile ← FileStream newFileNamed: newFile.
   newBinaryFile binary.
   fileOfStrings ← FileStream oldFileNamed: oldFile.
   bigString ← fileOfStrings contentsOfEntireFile.
   fileOfStrings close.
   collectionOfStrings ← Compiler evaluate: bigString.
   bigString ← nil.
   counter ← 0.
   collectionOfStrings do:
      [:aString |
      (counter rem: 25)
         = 0 ifTrue: [Transcript show: counter printString; cr].
   counter ← counter + 1.
   counter odd ifTrue: [newBinaryFile nextStringPut: aString].
   counter even
      ifTrue:
         [point ← Point readFrom: aString.
         "self halt."
         newBinaryFile nextWordPut: point x.
         newBinaryFile nextWordPut: point y]].
newBinaryFile close
" file nextWordPut: 12001.
file nextLongNumberPut: 200000.
file nextStringPut: 'Avlokiteswara hello.....'.
file nextStringPut: 'Avlokiteswara hello.....'.

file close.

```
file ← FileStream oldFileNamed: 'junk'.
file binary.
shortNumber ← file nextWord.
number ← file nextLongNumber.
string1 ← file nextString.
string2 ← file nextString.

file close.

(OrderedCollection with: shortNumber with: number with: string1
with:
string2) inspect."
"FileTransfer covertOldFile: 'newTranscriptStage2LD2'
toNewBinaryFile:
'temp'"
``` covertOldFile: oldFile toOracle: newFile
" converts a File of Strings into binary format"

```
| fileOfStrings bigString collectionOfStrings point queryPort aString quote sendString |
queryPort ← OraclePort open: 'makkuni/thangka'.
queryPort submit: ' CREATE TABLE ' , newFile , ' (SCENETITLE char(90), BEGINFRAME number(5), ENDFRAME number(5));'.
self halt.
fileOfStrings ← FileStream oldFileNamed: oldFile.
bigString ← fileOfStrings contentsOfEntireFile.
fileOfStrings close.
quote ← $'.
collectionOfStrings ← Compiler evaluate: bigString.
bigString ← nil.
1
    to: collectionOfStrings size
    by: 2
    do:
        [:index |
        aString ← collectionOfStrings at: index.
        point ← Point readFrom: (collectionOfStrings at: index + 1).
        sendString ← 'INSERT INTO ' , newFile , '
values (' , quote , aString , quote , ' ' , point x printString , ' ' , point y printString , ');'.
        self halt.
        queryPort submit: sendString].
queryPort close
"FileTransfer covertOldFile: 'newTranscriptStage2LD2'
toNewBinaryFile:
'junk'"
``` createOracleFile: aFileName
" converts a File of Strings into binary format"

```
| queryPort |
queryPort ← OraclePort open: 'makkuni/thangka'.
queryPort submit: 'CREATE TABLE ' , aFileName , ' (SCENETITLE char(200), BEGINFRAME number(5), ENDFRAME number(5));'.

Transcript show: queryPort result printString; cr; cr.
self halt.
queryPort close
"FileTransfer createOracleFile: 'test'"
``` example2: oldFile
  " converts a File of Strings into binary format"

| fileOfStrings bigString collectionOfStrings point queryPort aString quote sendString |
  queryPort ← OraclePort open: 'makkuni/thangka'.
  fileOfStrings ← FileStream oldFileNamed: oldFile.
  bigString ← fileOfStrings contentsOfEntireFile.
  fileOfStrings close.
  quote ← String with: $'.
  collectionOfStrings ← Compiler evaluate: bigString.
  bigString ← nil.
  1
     to: 10
     by: 2
     do:
        [:index |
        "collectionOfStrings size"
        aString ← collectionOfStrings at: index.
        point ← Point readFrom: (collectionOfStrings at: index + 1).
        sendString ← 'INSERT INTO TEST1 VALUES (' , quote , aString , quote , ', ' , point x printString , ',' , point y printString , ');

self halt.
        Transcript show: sendString printString.
        queryPort submit: sendString.
        Transcript show: queryPort result printString; cr; cr].
  queryPort close
  "FileTransfer example2:   'newTranscriptStage2LD2'
  "

readFromBinaryFile: newFile
  " reads a file in binary format to a collection of strings and points"

| collectionOfStrings counter point collectionOfPoints binaryFile string |
  collectionOfPoints ← OrderedCollection new.

collectionOfStrings ← OrderedCollection new.
  binaryFile ← FileStream oldFileNamed: newFile.
  binaryFile binary.
  counter ← 0.
  [binaryFile atEnd]
     whileFalse:
        [((counter rem: 25)
            = 0 ifTrue: [Transcript show: counter printString; cr].
        counter ← counter + 1.
        counter odd
           ifTrue:
              [string ← binaryFile nextString.
              collectionOfStrings add: string].
        counter even
           ifTrue:
              [point ← binaryFile nextWord @ binaryFile nextWord.
              collectionOfPoints add: point]].
  binaryFile close.
  collectionOfStrings inspect.
  self halt
  "FileTransfer readFromBinaryFile: 'temp'"

```
readOldFile: oldFileName reFormatTo: menuFileName
    | fileOfStrings bigString collectionOfStrings counter point menuFile |
    menuFile ← FileStream newFileNamed: menuFileName.
    fileOfStrings ← FileStream oldFileNamed: oldFileName.
    bigString ← fileOfStrings contentsOfEntireFile.
    fileOfStrings close.
    collectionOfStrings ← Compiler evaluate: bigString.
    bigString ← nil.
    counter ← 0.
    collectionOfStrings do:
        [:aString |
        (counter rem: 25)
            = 0 ifTrue: [Transcript show: counter printString; cr].
        counter ← counter + 1.
        counter odd
            ifTrue:
                [menuFile nextPutAll: aString.
                menuFile nextPut: Character space.
                menuFile nextPut: '['].
        counter even
            ifTrue:
                [point ← Point readFrom: aString.
                "self halt."
                menuFile nextPutAll: point printString.
                menuFile nextPut: ']'.
                menuFile nextPut: Character cr]].
    menuFile close
    "FileTransfer readOldFile: 'newTranscript2Stage2LD1'
    reFormatTo:
    'LaserDisc1Menu' "

readOldFile: oldFileName separateMenuStringsTo: menuFileName separatePointsTo:
pointFileName
    | fileOfStrings bigString collectionOfStrings counter point menuFile pointFile | menuFile ← FileStream newFileNamed: menuFileName.
    pointFile ← FileStream newFileNamed: pointFileName.
    fileOfStrings ← FileStream oldFileNamed: oldFileName.
    bigString ← fileOfStrings contentsOfEntireFile.
    fileOfStrings close.
    collectionOfStrings ← Compiler evaluate: bigString.
    bigString ← nil.
    counter ← 0.
    collectionOfStrings do:
        [:aString |
        (counter rem: 25)
            = 0 ifTrue: [Transcript show: counter printString; cr].
        counter ← counter + 1.
        counter odd
            ifTrue:
                [menuFile nextPutAll: aString.
                menuFile nextPut: Character cr].
        counter even
            ifTrue:
                [point ← Point readFrom: aString.
                "self halt."
                pointFile nextPutAll: point printString. pointFile nextPut: Character cr].
        ].
    pointFile close.
    menuFile close
```

```
"FileTransfer readOldFile: 'newTranscript2Stage2LD1'
    separateMenuStringsTo:
    'LaserDisc1MenuStrings'
    separatePointsTo: 'LaserDisk1Points"

translateFrameNumbersOfOldFile: oldFileName toNewFile: newFileName by: frame
    | fileOfStrings bigString collectionOfStrings counter point newFile newPoint |
    newFile ← FileStream newFileNamed: newFileName.
    fileOfStrings ← FileStream oldFileNamed: oldFileName.
    bigString ← fileOfStrings contentsOfEntireFile.
    fileOfStrings close.
    collectionOfStrings ← Compiler evaluate: bigString.
    bigString ← nil.
    counter ← 0.
    collectionOfStrings do:
        [:aString |
        (counter rem: 25)
            = 0 ifTrue: [Transcript show: counter printString; cr].
        counter ← counter + 1.
        counter odd ifTrue: [aString storeOn: newFile].
        counter even
            ifTrue:
                [' ' storeOn: newFile.
                point ← Point readFrom: aString.
                "self halt."
                newPoint ← point + frame.
                newPoint printString storeOn: newFile].
        newFile nextPut: Character cr].
    newFile close
    " FileTransfer translateFrameNumbersOfOldFile: 'newTranscriptStage2LD2'
        toNewFile: 'temp' by: (-28)
```

FileTransfer class methodsFor: database databaseExample2: oldFile
```
    | fileOfStrings bigString collectionOfStrings point aString pointCollection titleCollection scriptFile |
    pointCollection ← OrderedCollection new.
    titleCollection ← OrderedCollection new.
    fileOfStrings ← FileStream oldFileNamed: oldFile.
    bigString ← fileOfStrings contentsOfEntireFile.
    fileOfStrings close.
    collectionOfStrings ← Compiler evaluate: bigString.
    bigString ← nil.
    1
        to: collectionOfStrings size
        by: 2
        do:
            [:index |
            aString ← collectionOfStrings at: index.
            ('*hakala*' match: aString)
                | ('*KALA*' match: aString)
                    ifTrue:
                        [point ← Point readFrom: (collectionOfStrings at: index + 1).
                        titleCollection add: aString.
                        pointCollection add: point]].
    scriptFile ← FileStream newFileNamed: 'junk.script'.
    pointCollection do:
        [:aPoint |
```

```
        scriptFile nextPut: 'search ', aPoint x printString.
        scriptFile nextPut: (String with: $\)].
    self halt
    "     (OSJob fork: 'videoDisc -n PA-2 delay 0.0') wait"
    "FileTransfer databaseExample2: 'newTranscriptStage2LD2'"
``` databaseExample: oldFile aCollectionOfKeyWords: aCollection
```
    | fileOfStrings bigString collectionOfStrings point aString pointCollection titleCollection |
    pointCollection ← OrderedCollection new.
    titleCollection ← OrderedCollection new.
    fileOfStrings ← FileStream oldFileNamed: oldFile.
    bigString ← fileOfStrings contentsOfEntireFile.
    fileOfStrings close.
    collectionOfStrings ← Compiler evaluate: bigString.
    bigString ← nil.
    1
        to: collectionOfStrings size
        by: 2
        do:
            [:index |
            aString ← collectionOfStrings at: index.
            aCollection do: [:aKeyWord | ('*' , aKeyWord , '*' match: aString)
                    | ('*' , aKeyWord , '*' match: aString)
                    ifTrue:
                        [point ← Point readFrom: (collectionOfStrings at: index + 1).
                        titleCollection add: aString.
                        pointCollection add: point]]].
    pointCollection do: [:aPoint | (OSJob fork: 'videoDisc -n PA-2 search ' , aPoint x printString) wait "FileTransfer databaseExample: 'StillImages1' aCollectionOfKeyWords:
    (OrderedCollection with: 'uddha' with: 'ara')"]
``` databaseExampleOfCreatingNewFile: aNewFile fromOldFile: anOldFile1 fromOldFile: anOldFile2 fromOldFile: anOldFile3 fromOldFile: anOldFile4 deityName: aKeyWord deityName: aSecondKeyWord zoneKeyWord: aThirdKeyWord zoneKeyWord: aFourthKeyWord
```
    "this method accepts the contents from 4 files, and searches for the key
    words, and places the matched items in a new file"

| fileOfStrings bigString collectionOfStrings point aString newFile nFiles fileNameCollection |
    newFile ← FileStream newFileNamed: aNewFile.
    anOldFile4 = nil
        ifTrue: [anOldFile3 = nil
            ifTrue: [anOldFile2 = nil
                ifTrue: [nFiles ← 1]
                ifFalse: [nFiles ← 2]]
            ifFalse: [nFiles ← 3]]
        ifFalse: [nFiles ← 4].
    fileNameCollection ← OrderedCollection
                with: anOldFile1
                with: anOldFile2
                with: anOldFile3
                with: anOldFile4.
    1 to: nFiles do:
        [:fileNameIndex |
        fileOfStrings ← FileStream oldFileNamed: (fileNameCollection at: fileNameIndex).
        bigString ← fileOfStrings contentsOfEntireFile.
        fileOfStrings close.
```

```
        collectionOfStrings ← Compiler evaluate: bigString.
        bigString ← nil.
        1
            to: collectionOfStrings size
            by: 2
            do:
                [:index |
                aString ← collectionOfStrings at: index.
                ('*' , aKeyWord , '*' match: aString)
                    | ('*' , aSecondKeyWord , '*' match: aString) & (('*' , aThirdKeyWord , '*' match:
aString)
                    | ('*' , aFourthKeyWord , '*' match: aString))
                ifTrue:
                    [newFile nextPutAll: aString , ' '.
                    point ← Point readFrom: (collectionOfStrings at: index + 1).
                    newFile nextPutAll: point printString.
                    newFile nextPut: Character cr]].
    newFile close
    "FileTransfer databaseExampleOfCreatingNewFile: 'junk' fromOldFile: 'S0.formattedWithQuotes'
        fromOldFile: 'S1.formattedWithQuotes' fromOldFile: 'S2.formattedWithQuotes' fromOldFile:
'S3.formattedWithQuotes' deityName: 'uddha'
        deityName: 'yamuni' zoneKeyWord: 'head' zoneKeyWord: 'face'"

databaseExampleOfCreatingNewFile: aNewFile fromOldFile: anOldFile1 fromOldFile: anOldFile2
fromOldFile: anOldFile3 fromOldFile: anOldFile4 deityName: aKeyWord deityName:
aSecondKeyWord zoneKeyWord: aThirdKeyWord zoneKeyWord: aFourthKeyWord zoneKeyWord:
aFifthKeyWord zoneKeyWord: aSixthKeyWord
    "this method accepts the contents from 4 files, and searches for the key words, and places the matched items in a new file"

| fileOfStrings bigString collectionOfStrings point aString newFile nFiles fileNameCollection discID
videoSegment |
    newFile ← FileStream newFileNamed: aNewFile.
    anOldFile4 = nil
        ifTrue: [anOldFile3 = nil
            ifTrue: [anOldFile2 = nil
                ifTrue: [nFiles ← 1]
                ifFalse: [nFiles ← 2]]
            ifFalse: [nFiles ← 3]]
        ifFalse: [nFiles ← 4].
    fileNameCollection ← OrderedCollection
                with: anOldFile1
                with: anOldFile2
                with: anOldFile3
                with: anOldFile4.
    1 to: nFiles do:
        [:fileNameIndex |
        fileOfStrings ← FileStream oldFileNamed: (fileNameCollection at: fileNameIndex).
        bigString ← fileOfStrings contentsOfEntireFile.
        fileOfStrings close.
        collectionOfStrings ← Compiler evaluate: bigString.
        bigString ← nil.
        1
            to: collectionOfStrings size
            by: 2
            do:
                [:index |
                aString ← collectionOfStrings at: index.
                ('*' , aKeyWord , '*' match: aString)
```

```
                            | ('*' , aSecondKeyWord , '*' match: aString) & (('*' , aThirdKeyWord , '*' match:
aString)
                            | ('*' , aFourthKeyWord , '*' match: aString) | ('*' , aFifthKeyWord , '*' match:
aString) | ('*' , aSixthKeyWord , '*' match: aString))
                        ifTrue:
                            [newFile nextPutAll: aString , ' '.
                            fileNameIndex = 1
                                ifTrue: [discID ← 1]
                                ifFalse: [discID ← fileNameIndex - 1].
                            point ← Point readFrom: (collectionOfStrings at: index + 1).
                            videoSegment ← VideoSegment
                                    discID: discID
                                    beginFrame: point x
                                    endFrame: point y.
                            newFile nextPutAll: '[' , videoSegment printString , ']'.
                            newFile nextPut: Character cr]].
        newFile close.
        FileModel editFileNamed: aNewFile
"FileTransfer databaseExampleOfCreatingNewFile:
'face' fromOldFile:
'StillImages1'
 fromOldFile: 'MobileImages1' fromOldFile:
'MobileImages2' fromOldFile: 'MobileImages3'
deityName: 'hakala'
deityName: 'Mahaka' zoneKeyWord: 'head' zoneKeyWord: 'face' zoneKeyWord: 'symbo' zoneKeyWord: 'desc"

databaseExampleOfCreatingNewFile: aNewFile fromOldFile: anOldFile1 fromOldFile: anOldFile2
fromOldFile: anOldFile3 fromOldFile: anOldFile4 keyWord: aKeyWord secondKeyWord:
aSecondKeyWord
    | fileOfStrings bigString collectionOfStrings point aString newFile nFiles fileNameCollection |
    newFile ← FileStream newFileNamed: aNewFile.
    anOldFile4 = nil
        ifTrue: [anOldFile3 = nil
            ifTrue: [anOldFile2 = nil
                    ifTrue: [nFiles ← 1]
                    ifFalse: [nFiles ← 2]]
                ifFalse: [nFiles ← 3]]
        ifFalse: [nFiles ← 4].
    fileNameCollection ← Dictionary
                with: anOldFile1
                with: anOldFile2
                with: anOldFile3
                with: anOldFile4.
1 to: nFiles do:
    [:fileNameIndex |
    fileOfStrings ← FileStream oldFileNamed: (fileNameCollection at: fileNameIndex).
    bigString ← fileOfStrings contentsOfEntireFile.
    fileOfStrings close.
    collectionOfStrings ← Compiler evaluate: bigString.
    bigString ← nil.
    1
        to: collectionOfStrings size
        by: 2
        do:
            [:index |
            aString ← collectionOfStrings at: index.
            ('*' , aKeyWord , '*' match: aString)
                | ('*' , aSecondKeyWord , '*' match: aString)
                    ifTrue:
```

```
                [newFile nextPutAll: aString , ' '.
                point ← Point readFrom: (collectionOfStrings at: index + 1).
                newFile nextPutAll: point printString.
                newFile nextPut: Character cr]].
    newFile close.
    "FileTransfer databaseExampleOfCreatingNewFile: aNewFile fromOldFile:
    anOldFile1 fromOldFile: anOldFile2 fromOldFile: anOldFile3 fromOldFile:
    anOldFile4 keyWord: aKeyWord secondKeyWord: aSecondKeyWord"
``` databaseExampleOfCreatingNewFileFrom: anOldFile toNewFile: aNewFile keyWord: aKeyWord secondKeyWord: aSecondKeyWord
```
    | fileOfStrings bigString collectionOfStrings point aString newFile quote |
    quote ← Character digitValue: -9.
    fileOfStrings ← FileStream oldFileNamed: anOldFile.
    bigString ← fileOfStrings contentsOfEntireFile.
    fileOfStrings close.
    collectionOfStrings ← Compiler evaluate: bigString.
    bigString ← nil.
    newFile ← FileStream newFileNamed: aNewFile.
    1
        to: collectionOfStrings size
        by: 2
        do:
            [:index |
            aString ← collectionOfStrings at: index.
            ('"' , aKeyWord , '"' match: aString)
                | ('"' , aSecondKeyWord , '"' match: aString)
                ifTrue:
                    [newFile nextPutAll: aString , ' '.
                    point ← Point readFrom: (collectionOfStrings at: index + 1).
                    newFile nextPutAll: point printString.
                    newFile nextPut: Character cr]].
    newFile close
    "FileTransfer databaseExampleOfCreatingNewFileFrom: 'MobileImages2'
        toNewFile: 'junk' keyWord: 'uddha' secondKeyWord: 'yamuni"
``` databaseExampleOfCreatingNewFileWithQuotesFrom: anOldFile toNewFile: aNewFile keyWord: aKeyWord secondKeyWord: aSecondKeyWord
```
    | fileOfStrings bigString collectionOfStrings point aString newFile |
    fileOfStrings ← FileStream oldFileNamed: anOldFile.
    bigString ← fileOfStrings contentsOfEntireFile.
    fileOfStrings close.
    collectionOfStrings ← Compiler evaluate: bigString.
    bigString ← nil.
    newFile ← FileStream newFileNamed: aNewFile.
    newFile nextPutAll: '#('.
    1
        to: collectionOfStrings size
        by: 2
        do:
            [:index |
            aString ← collectionOfStrings at: index.
            ('"' , aKeyWord , '"' match: aString)
                | ('"' , aSecondKeyWord , '"' match: aString)
                ifTrue:
                    [newFile nextPutAll: aString printString , ' '.
                    point ← Point readFrom: (collectionOfStrings at: index + 1).
                    newFile nextPutAll: point printString printString.
                    newFile nextPut: Character cr]].
    newFile nextPutAll: ')'.
```

```
newFile close
"FileTransfer databaseExampleOfCreatingNewFileWithQuotesFrom:
'StillImages1'
    toNewFile: 'S0.formattedWithQuotes' keyWord: 'uddha'
secondKeyWord:
'yamuni'"
```

Model subclass: #VideoDiskConsole
    instanceVariableNames: 'videoDeviceName currentDirection currentCommand previousCommand currentSearchMode stepRate topView saveFrameButtonView savedFrameNumber buttonAndSwitchState buttonsAndSwitches device '
    classVariableNames: 'VideoDiskCommandDictionary '
    poolDictionaries: ''
    category: 'Thangka-Interface-VideoConsoles'

*Copyright (c) Xerox Corporation, 1988*

VideoDiskConsole methodsFor: initialize release closeRequest
    "Stop the motion and kill the audio before closing down."

```
    buttonAndSwitchState ← nil.
    buttonsAndSwitches ← nil.
    BinaryChoice
        message: 'Turn off the video disk player?'
        displayAt: Sensor cursorPoint
        centered: true
        ifTrue: [self motorOff]
        ifFalse: [].
    ↑true
``` initialize
    "What you probably expect...."

```
    previousCommand ← nil.
    currentCommand ← nil.
    stepRate ← '34'.
    currentSearchMode ← 'frame'.
    savedFrameNumber ← '0'.
    buttonAndSwitchState ← Dictionary new.
    buttonsAndSwitches ← Dictionary new
```

VideoDiskConsole methodsFor: accessing buttonsAndSwitches
    ↑buttonsAndSwitches saveFrameButtonView: aSwitchView
    "Saved so we can change the label to reflect the number of the currently saved frame."

saveFrameButtonView ← aSwitchView topView
    ↑topView topView: aStandardSystemView
    "Needed to save a handle on my topView at instance creation time."

topView ← aStandardSystemView videoDiskName: aString

"The name of the video disk being controlled through this instance."

```
videoDeviceName ← aString.
device ← VideoDiskPlayer new.
device playerID: aString asNumber
```

VideoDiskConsole methodsFor: direction setDirectionToForward
"Set the current direction for the video disk to be #forward."

```
currentDirection ← #forward.
buttonAndSwitchState at: #direction put: #FORWARD.
self performCurrentCommand
``` setDirectionToReverse
"Set the current direction for the video disk to be #reverse."

```
currentDirection ← #reverse.
buttonAndSwitchState at: #direction put: #REVERSE.
self performCurrentCommand
```

VideoDiskConsole methodsFor: movement fastVideoDiskMotion
"Proceed at fast speed in the currentDirection."

```
currentCommand ← #fast.
buttonAndSwitchState at: #movement put: #FAST.
self performCurrentCommand
``` freezeVideoDiskMotion
"Still frame time!"

```
previousCommand ← currentCommand.
currentCommand ← #still.
buttonAndSwitchState at: #still put: #STILL.
self performCurrentCommand
``` motorOff
"Turn off the spin motor for the video disk."

```
OSJob forkAndWait: (VideoDiskCommandDictionary at: #basicCommand)
    , videoDeviceName , ' reset motoroff'
``` motorOn
"Turn on the spin motor for the video disk."

```
"OSJob forkAndWait: (VideoDiskCommandDictionary at: #basicCommand)
    , videoDeviceName , ' reset motoron'"
``` normalVideoDiskMotion
"Proceed at normal speed in the currentDirection."

```
currentCommand ← #norm.
```

```
buttonAndSwitchState at: #movement put: #NORM.
self performCurrentCommand
``` scanVideoDisk
"Scan in the currentDirection."

```
currentCommand ← #scan.
buttonAndSwitchState at: #movement put: #SCAN.
self performCurrentCommand
``` singleStepVideoDisk
"Step one frame in the currentDirection."

```
currentCommand ← #singleStep.
(buttonAndSwitchState at: #movement ifAbsent: []) isNil
    ifFalse:
        [(buttonsAndSwitches at: (buttonAndSwitchState at: #movement)) turnOff.
        buttonAndSwitchState at: #movement put: nil].
self performCurrentCommand
``` slowVideoDiskMotion
"Proceed slowly in the currentDirection."

```
currentCommand ← #slow.
buttonAndSwitchState at: #movement put: #SLOW.
self performCurrentCommand
``` stepVideoDisk
"Step in the currentDirection at the current stepRate."

```
currentCommand ← #step.
buttonAndSwitchState at: #movement put: #STEP.
self performCurrentCommand
``` stopPlayingVideoDisk
"Stop playing!"

```
currentCommand ← #stop.
buttonAndSwitchState at: #movement put: #STOP.
self performCurrentCommand
``` unfreezeVideoDiskMotion
"Proceed as before the freeze."

```
currentCommand ← previousCommand.
buttonAndSwitchState at: #still put: nil.
self restoreButtonAndSwitchStates.
self performCurrentCommand
```

VideoDiskConsole methodsFor: audio audioChannel1Off
```
| command |
command ← 'channel1off'.
device parseCommand: command
``` audioChannel1On
    | command |
    command ← 'channel1on'.
    device parseCommand: command audioChannel2Off
    | command |
    command ← 'channel2off'.
    device parseCommand: command audioChannel2On
    | command |
    command ← 'channel2on'.
    device parseCommand: command audioChannelsOff
    "Turn off both audio channels for the video disk."

| command |
    buttonAndSwitchState at: #audio put: #audioNeither.
    command ← 'channel1off channel2off'.
    device parseCommand: command audioChannelsOn
    "Turn on both audio channels for the video disk."

| command |
    buttonAndSwitchState at: #audio put: #audioBoth.
    command ← 'channel1on channel2on'.
    device parseCommand: command

VideoDiskConsole methodsFor: extended control disableExtendedAccess
    "Redefine my console's view to remove the buttons/switches
        that control search and display options of the video disk."

| switch |
    topView
        eraseAndRedisplayAfter:
            [self prepareTopViewForReconstruction.
            self class mountAudioSwitchesOn: self.
            self class mountMovementSwitchesOn: self.
            switch ← Switch newOff onAction: [self enableExtendedAccess].
            switch offAction: [self disableExtendedAccess].
            topView
                addSubView: ((SwitchView new label: 'EXT' asDisplayText)
                        model: switch)
                in: (0.9 @ 0 extent: 0.1 @ 1)
                borderWidth: 1.
            self restoreButtonAndSwitchStates]

enableExtendedAccess
    "Redefine my console's view to provide more
    buttons/switches to control search and display options of
    the video disk."

```
| button aRectangle buttonView connectorObject switch switchView |
topView
    eraseAndRedisplayAfter:
        [topView maximumSize: topView maximumSize x + 250 @ topView maximumSize y.
        aRectangle ← topView window.
        aRectangle height: topView window height.
        aRectangle width: topView window width + 250.
        topView window: aRectangle.
        button ← Button new onAction: [self toggleIndexDisplayMode].
        buttonView ← (SwitchView new label: 'Index display' asDisplayText)
                    model: button.
        topView
            addSubView: buttonView
            in: (0.81999998 @ 0.025 extent: 0.180000009 @ 0.12)
            borderWidth: 1.
        button ← Button new onAction: [self setStepRate].
        buttonView ← (SwitchView new label: 'Set step rate' asDisplayText)
                    model: button.
        topView
            addSubView: buttonView
            in: (0.81999998 @ 0.17 extent: 0.180000009 @ 0.12)
            borderWidth: 1.
        button ← Button new onAction: [self saveCurrentFrameNumberForReturn].
        saveFrameButtonView ← (SwitchView new label: ('Save #' , savedFrameNumber)
asDisplayText)
                    model: button.
        topView
            addSubView: saveFrameButtonView
            in: (0.81999998 @ 0.47 extent: 0.180000009 @ 0.12)
            borderWidth: 1.
        button ← Button new onAction: [self returnToSavedFrame].
        buttonView ← (SwitchView new label: 'Return' asDisplayText)
                    model: button.
        topView
            addSubView: buttonView
            in: (0.81999998 @ 0.59 extent: 0.180000009 @ 0.12)
            borderWidth: 1.
        connectorObject ← Object new.
        switch ← OneOnSwitch newOn onAction: [self setFrameMode].
        switch connection: connectorObject.
        switchView ← (SwitchView new label: 'frame' asDisplayText)
                    model: switch.
        topView
            addSubView: switchView
            in: (0.81999998 @ 0.735 extent: 0.0900000095 @ 0.12)
            borderWidth: 1.
        switch ← OneOnSwitch newOff onAction: [self setChapterMode].
        switch connection: connectorObject.
        switchView ← (SwitchView new label: 'chapter' asDisplayText)
                    model: switch.
        topView
            addSubView: switchView
            in: (0.910000038 @ 0.735 extent: 0.0900000095 @ 0.12)
            borderWidth: 1.
        button ← Button new onAction: [self searchForFrameOrChapter].
```

```
            buttonView ← (SwitchView new label: 'Search for ...' asDisplayText)
                    model: button.
        topView
            addSubView: buttonView
            in: (0.81999998 @ 0.855 extent: 0.180000009 @ 0.12)
            borderWidth: 1.
        self restoreButtonAndSwitchStates]
``` returnToSavedFrame
"Return to the saved frame."

```
| savedSearchMode command |
savedSearchMode ← currentSearchMode.
currentSearchMode ← 'frame'.
command ← (VideoDiskCommandDictionary at: #basicCommand)
      , videoDeviceName , ' reset search ' , savedFrameNumber , ' wait reset'.
self freezeVideoDiskMotion.
OSJob forkAndWait: command.
currentSearchMode ← savedSearchMode.
self unfreezeVideoDiskMotion
``` saveCurrentFrameNumberForReturn
"Save the number of the currently dislayed frame. If the
user later wishes, s/he can return to it."

```
| tempFile command stream |
self freezeVideoDiskMotion.
    tempFile ← '/tmp/vdtmp' , DateAndTime totalSeconds printString.
    command ← (VideoDiskCommandDictionary at: #basicCommand)
         , videoDeviceName , ' address > ' , tempFile.
    OSJob forkAndWait: command.
self unfreezeVideoDiskMotion.
stream ← FileStream oldFileNamed: tempFile.
savedFrameNumber ← stream contents asString.
stream close.
savedFrameNumber ← savedFrameNumber copyFrom: 1 to: (savedFrameNumber size -1).
saveFrameButtonView label: ('Save #' , savedFrameNumber) asDisplayText.
saveFrameButtonView displayViewOn: Display.
OSJob forkAndForget: '/bin/rm -f ' , tempFile , '&'.
``` searchForFrameOrChapter
"Prompt the user for a frame/chapter and then search for it."

```
| destination command |
   destination ← FillInTheBlank request: ('   Please enter the ' , currentSearchMode , '\for which you
wish to search.') withCRs initialAnswer: '1'.
   destination = ''
      ifTrue: [↑false]
      ifFalse:
         [command ← 'reset search:' , destination , ' reset'.
         device parseCommand: command]
``` setChapterMode
"Instruct the video disk to use chapter numbers when
searching."

```
| command |
currentSearchMode ← 'chapter'.
command ← (VideoDiskCommandDictionary at: #basicCommand) , videoDeviceName , ' ' ,
((VideoDiskCommandDictionary at: currentDirection)
                at: #chaptermode).
OSJob forkAndWait: command
``` setFrameMode

"Instruct the video disk to use frame numbers when searching."

```
| command |
currentSearchMode ← 'frame'.
command ← (VideoDiskCommandDictionary at: #basicCommand) , videoDeviceName , ' ' ,
((VideoDiskCommandDictionary at: currentDirection)
                at: #framemode).
OSJob forkAndWait: command
``` setStepRate

"Set the rate for stepping through frames. This number is
entered by the user in seconds and then multiplied by 34
(actually 33.7) to get the number given to the laser disk
(yuch!)."

```
| newRate |
newRate ← FillInTheBlank request: 'Please enter the number of seconds pause\to insert between
frames when stepping.' withCRs default: (stepRate asNumber / 33.7000012) rounded printString.
    newRate = ''
        ifTrue: [↑false]
        ifFalse: [stepRate ← (newRate asNumber * 33.7000012) rounded printString]
``` toggleIndexDisplayMode

"Cycle through chapter, frame, and no index displayed."

```
| command |
command ← (VideoDiskCommandDictionary at: currentDirection)
        at: #index.
device parseCommand: command
```

VideoDiskConsole methodsFor: private performCurrentCommand

"Do the current command."

```
currentCommand isNil
    ifTrue: [↑false]
    ifFalse: [currentCommand == #step
            ifTrue: [self performCurrentCommandWith: stepRate]
            ifFalse: [self performCurrentCommandWith: nil]]
``` performCurrentCommandWith: anArgument

"Do the current command."

```
| command |
currentCommand isNil
    ifTrue: [↑false]
    ifFalse: [anArgument isNil
```

```
ifTrue:
    [command ← (VideoDiskCommandDictionary at: currentDirection)
                at: currentCommand.
    device parseCommand: command]
ifFalse:
    [command ← (VideoDiskCommandDictionary at: #basicCommand)
            , videoDeviceName , ' ' , ((VideoDiskCommandDictionary at:
currentDirection)
                at: currentCommand) , ' ' , anArgument.
    OSJob forkAndWait: command]]
``` prepareTopViewForReconstruction
"Redefine my console's view to remove the buttons/switches
    that control search and display options of the video disk."

```
topView releaseSubViews.
topView removeSubViews.
topView maximumSize: topView minimumSize.
topView window: topView defaultWindow
``` restoreButtonAndSwitchStates
"Put highlighting back the way it should be on my switches
and buttons."

```
buttonAndSwitchState do:
    [:category |
    category isNil
        ifFalse: [(buttonsAndSwitches at: category) turnOn]]
``` startUp
"Turn on the audio channels and set the initial direction to #forward."

```
self audioChannelsOn.
self motorOn.
self setDirectionToForward
```

VideoDiskConsole class
    instanceVariableNames: ''

VideoDiskConsole class methodsFor: class Initialization initialize
"Set up the dictionary of legal video disk commands."
"VideoDiskConsole initialize."

```
| basicCommand forwardCommands reverseCommands |
VideoDiskCommandDictionary ← Dictionary new.
forwardCommands ← Dictionary new.
forwardCommands at: #singleStep put: 'fstep still'.
forwardCommands at: #step put: 'fstep still reset fstepinc'.
forwardCommands at: #slow put: 'fslow'.
forwardCommands at: #norm put: 'fplay'.
forwardCommands at: #fast put: 'ffast'.
```

```
forwardCommands at: #scan put: 'fscan'.
forwardCommands at: #still put: 'still'.
forwardCommands at: #stop put: 'stop'.
forwardCommands at: #index put: 'index'.
forwardCommands at: #framemode put: 'framemode'.
forwardCommands at: #chaptermode put: 'chaptermode'.
VideoDiskCommandDictionary at: #forward put: forwardCommands.
reverseCommands ← Dictionary new.
reverseCommands at: #singleStep put: 'reset rstep still'.
reverseCommands at: #step put: 'rstep still reset rstepinc'.
reverseCommands at: #slow put: 'rslow'.
reverseCommands at: #norm put: 'rplay'.
reverseCommands at: #fast put: 'rfast'.
reverseCommands at: #scan put: 'rscan'.
reverseCommands at: #still put: 'still'.
reverseCommands at: #stop put: 'stop'.
reverseCommands at: #index put: 'index'.
reverseCommands at: #framemode put: 'framemode'.
reverseCommands at: #chaptermode put: 'chaptermode'.
VideoDiskCommandDictionary at: #reverse put: reverseCommands.
```

VideoDiskConsole class methodsFor: instance creation new

↑super new initialize open

"Open an instance of me. I provide control access for the
    laser disk player."
    "VideoDiskConsole open."

| selection |
  selection ← (ActionMenu labelString: 'PO-1\PA-1\PA-2\PA-3\PA-4\PA-5' withCRs selectors: #('PO-1' 'PA-1' 'PA-2' 'PA-3' 'PA-4' 'PA-5' )) startUp.
    selection isNil ifFalse: [self openForDiskNamed: selection]

openForDiskNamed: aString

"Open an instance of me. I provide control access for the
    laser disk player."
    "VideoDiskConsole openForDiskNamed: '6'."

| aConsole switch |
    aConsole ← self createConsoleForDiskNamed: aString.
    self mountAudioSwitchesOn: aConsole.
    self mountMovementSwitchesOn: aConsole.
    switch ← Switch newOff onAction: [aConsole enableExtendedAccess].
    switch offAction: [aConsole disableExtendedAccess].
    aConsole topView
        addSubView: ((SwitchView new label: 'EXT' asDisplayText)
            model: switch)
      in: (0.9 @ 0 extent: 0.1 @ 1)
      borderWidth: 1.
    aConsole topView controller open

VideoDiskConsole class methodsFor: private

```
createConsoleForDiskNamed: aString
    | aConsole topView |
    aConsole ← (self new videoDiskName: aString) startUp.
    topView ← StandardSystemView
                model: aConsole
                label: 'Console for Video Disk ', aString
                minimumSize: 500 @ 150.
    topView maximumSize: topView minimumSize.
    topView window.
    topView insideColor: Form veryLightGray.
    aConsole topView: topView.
    ↑aConsole makeAOneOnSwitchWithConnector: aConnector withOnAction: aBlock withOffAction:
anotherBlock initialState: aSymbol
    "Create one of the OneOnSwitches used by a
    VideoDiskConsole."

| switch |
    aSymbol = #off
        ifTrue: [switch ← OneOnSwitch newOff]
        ifFalse: [switch ← OneOnSwitch newOn].
    switch onAction: aBlock.
    switch offAction: anotherBlock.
    switch connection: aConnector.
    ↑switch makeAudioSwitchesFor: aConsole
    | switches anObject |
    switches ← Dictionary new.
    anObject ← Object new.
    switches at: #1 put: (self
                makeAOneOnSwitchWithConnector: anObject
                withOnAction: [aConsole audioChannel1On]
                withOffAction: [aConsole audioChannel1Off]
                initialState: #off).
    aConsole buttonsAndSwitches at: #audio1 put: (switches at: #1).
    switches at: #2 put: (self
                makeAOneOnSwitchWithConnector: anObject
                withOnAction: [aConsole audioChannel2On]
                withOffAction: [aConsole audioChannel2Off]
                initialState: #off).
    aConsole buttonsAndSwitches at: #audio2 put: (switches at: #2).
    switches at: #both put: (self
                makeAOneOnSwitchWithConnector: anObject
                withOnAction: [aConsole audioChannelsOn]
                withOffAction: [aConsole audioChannelsOff]
                initialState: #on).
    aConsole buttonsAndSwitches at: #audioBoth put: (switches at: #both).
    switches at: #neither put: (self
                makeAOneOnSwitchWithConnector: anObject
                withOnAction: [aConsole audioChannelsOff]
                withOffAction: []
                initialState: #off).
    aConsole buttonsAndSwitches at: #audioNeither put: (switches at: #neither).
```

↑switches makeMovementSwitchesFor: aConsole

| switches connectorObject anotherConnectorObject |
switches ← Dictionary new.
connectorObject ← Object new.
switches at: #REVERSE put: (self
        makeAOneOnSwitchWithConnector: connectorObject
        withOnAction: [aConsole setDirectionToReverse]
        withOffAction: []
        initialState: #off).
aConsole buttonsAndSwitches at: #REVERSE put: (switches at: #REVERSE).
switches at: #FORWARD put: (self
        makeAOneOnSwitchWithConnector: connectorObject
        withOnAction: [aConsole setDirectionToForward]
        withOffAction: []
        initialState: #on).
aConsole buttonsAndSwitches at: #FORWARD put: (switches at: #FORWARD).
anotherConnectorObject ← Object new.
switches at: #STILL put: (self
        makeAOneOnSwitchWithConnector: anotherConnectorObject
        withOnAction: [aConsole freezeVideoDiskMotion]
        withOffAction: [aConsole unfreezeVideoDiskMotion]
        initialState: #off).
aConsole buttonsAndSwitches at: #STILL put: (switches at: #STILL).
switches at: #SINGLESTEP put: (Button new onAction: [aConsole singleStepVideoDisk]).
aConsole buttonsAndSwitches at: #SINGLESTEP put: (switches at: #SINGLESTEP).
switches at: #STEP put: (self
        makeAOneOnSwitchWithConnector: anotherConnectorObject
        withOnAction: [aConsole stepVideoDisk]
        withOffAction: []
        initialState: #off).
aConsole buttonsAndSwitches at: #STEP put: (switches at: #STEP).
switches at: #SLOW put: (self
        makeAOneOnSwitchWithConnector: anotherConnectorObject
        withOnAction: [aConsole slowVideoDiskMotion]
        withOffAction: []
        initialState: #off).
aConsole buttonsAndSwitches at: #SLOW put: (switches at: #SLOW).
switches at: #NORM put: (self
        makeAOneOnSwitchWithConnector: anotherConnectorObject
        withOnAction: [aConsole normalVideoDiskMotion]
        withOffAction: []
        initialState: #off).
aConsole buttonsAndSwitches at: #NORM put: (switches at: #NORM).
switches at: #FAST put: (self
        makeAOneOnSwitchWithConnector: anotherConnectorObject
        withOnAction: [aConsole fastVideoDiskMotion]
        withOffAction: []
        initialState: #off).
aConsole buttonsAndSwitches at: #FAST put: (switches at: #FAST).
switches at: #SCAN put: (self
        makeAOneOnSwitchWithConnector: anotherConnectorObject
        withOnAction: [aConsole scanVideoDisk]
        withOffAction: []

```
        initialState: #off).
aConsole buttonsAndSwitches at: #SCAN put: (switches at: #SCAN).
switches at: #STOP put: (self
        makeAOneOnSwitchWithConnector: anotherConnectorObject
        withOnAction: [aConsole stopPlayingVideoDisk]
        withOffAction: []
        initialState: #off).
aConsole buttonsAndSwitches at: #STOP put: (switches at: #STOP).
↑switches
``` mountAudioSwitchesOn: aConsole
"Still more artificial partitioning of the work to overcome the 'too many literals referenced' problem."

```
| audioSwitches |
audioSwitches ← self makeAudioSwitchesFor: aConsole.
aConsole topView
    addSubView: ((SwitchView new label: '1' asDisplayText)
        model: (audioSwitches at: #1))
    in: (0 @ 0 extent: 0.065 @ 0.25)
    borderWidth: 1.
aConsole topView
    addSubView: ((SwitchView new label: '2' asDisplayText)
        model: (audioSwitches at: #2))
    in: (0 @ 0.25 extent: 0.065 @ 0.25)
    borderWidth: 1.
aConsole topView
    addSubView: ((SwitchView new label: '1&2' asDisplayText)
        model: (audioSwitches at: #both))
    in: (0 @ 0.50 extent: 0.065 @ 0.25)
    borderWidth: 1.
aConsole topView
    addSubView: ((SwitchView new label: 'off' asDisplayText)
        model: (audioSwitches at: #neither))
    in: (0 @ 0.75 extent: 0.065 @ 0.25)
    borderWidth: 1.
``` mountMovementSwitchesOn: aConsole
"Still more artificial partitioning of the work to overcome the 'too many literals referenced' problem."

```
| movementSwitches |
movementSwitches ← self makeMovementSwitchesFor: aConsole.
aConsole topView
    addSubView: ((SwitchView new label: 'REVERSE' asDisplayText)
        model: (movementSwitches at: #REVERSE))
    in: (0.115 @ 0.05 extent: 0.184 @ 0.25)
    borderWidth: 1.
aConsole topView
    addSubView: ((SwitchView new label: 'FORWARD' asDisplayText)
        model: (movementSwitches at: #FORWARD))
    in: (0.671 @ 0.05 extent: 0.184 @ 0.25)
    borderWidth: 1.
aConsole topView
    addSubView: ((SwitchView new label: 'STILL' asDisplayText)
        model: (movementSwitches at: #STILL))
    in: (0.399 @ 0.05 extent: 0.182 @ 0.25)
    borderWidth: 1.
```

```
aConsole topView
    addSubView: ((SwitchView new label: 'SINGLE' asDisplayText)
            model: (movementSwitches at: #SINGLESTEP))
    in: (0.09 @ 0.375 extent: 0.12 @ 0.25)
    borderWidth: 1.
aConsole topView
    addSubView: ((SwitchView new label: 'STEP' asDisplayText)
            model: (movementSwitches at: #STEP))
    in: (0.235 @ 0.375 extent: 0.11 @ 0.25)
    borderWidth: 1.
aConsole topView
    addSubView: ((SwitchView new label: 'SLOW' asDisplayText)
            model: (movementSwitches at: #SLOW))
    in: (0.370 @ 0.375 extent: 0.11 @ 0.25)
    borderWidth: 1.
aConsole topView
    addSubView: ((SwitchView new label: 'NORM' asDisplayText)
            model: (movementSwitches at: #NORM))
    in: (0.505 @ 0.375 extent: 0.11 @ 0.25)
    borderWidth: 1.
aConsole topView
    addSubView: ((SwitchView new label: 'FAST' asDisplayText)
            model: (movementSwitches at: #FAST))
    in: (0.640 @ 0.375 extent: 0.11 @ 0.25)
    borderWidth: 1.
aConsole topView
    addSubView: ((SwitchView new label: 'SCAN' asDisplayText)
            model: (movementSwitches at: #SCAN))
    in: (0.775 @ 0.375 extent: 0.11 @ 0.25)
    borderWidth: 1.
aConsole topView
    addSubView: ((SwitchView new label: 'STOP' asDisplayText)
            model: (movementSwitches at: #STOP))
    in: (0.115 @ 0.7 extent: 0.75 @ 0.25)
    borderWidth: 1.
```

Object subclass: #VideoSegment
  instanceVariableNames: 'discID beginFrame endFrame '
  classVariableNames: ''
  poolDictionaries: ''
  category: 'Thangka-VideoScenes'

*Copyright (c) Xerox Corporation, 1987, 1988*

VideoSegment methodsFor: copying deepCopy
    "Implemented here for better performance."

↑discID deepCopy ! beginFrame deepCopy @ endFrame deepCopy shallowCopy
    "Implemented here for better performance."

↑discID ! beginFrame @ endFrame

VideoSegment methodsFor: printing

```
printOn: aStream
    "The receiver prints on aStream in terms of infix notation."

discID printOn: aStream.
    aStream nextPut: $!.
    aStream nextPut: $(.
    beginFrame printOn: aStream.
    aStream nextPut: $@.
    endFrame printOn: aStream.
    aStream nextPut: $)

storeOn: aStream
    aStream nextPut: $(; nextPutAll: self species name; nextPutAll: ' discID: '; store: discID; nextPutAll: '
 beginFrame: '; store: beginFrame; nextPutAll: ' endFrame: '; store: endFrame; nextPut: $)
```

VideoSegment methodsFor: inquiries and assignment

```
beginFrame
    ↑beginFrame beginFrame: aNumber
    beginFrame ← aNumber discID
    ↑discID discID: aNumber
    discID ← aNumber endFrame
    ↑endFrame endFrame: aNumber endFrame ← aNumber
```

VideoSegment methodsFor: private

```
setDiscID: arg1 setBeginFrame: arg2 setEndFrame: arg3
    discID ← arg1.
    beginFrame ← arg2.
    endFrame ← arg3
```

VideoSegment class
   InstanceVariableNames: ''

VideoSegment class methodsFor: instance creation

```
discID: discIDNumber beginFrame: aBeginningFrameNumber endFrame: anEndingFrameNumber
    "Answer a new instance of me"

↑self new
        setDiscID: discIDNumber
        setBeginFrame: aBeginningFrameNumber
        setEndFrame: anEndingFrameNumber
    "VideoSegment discID: 1 beginFrame: 1000 endFrame: 2000 "
```

MouseMenuController subclass: #ScenesTitlesOnDeityEditor
  instanceVariableNames: 'deityName canvas selectedZone currentSelection postureDiagramVisible proportioningDiagramVisible ClothingMenu ClothingZones FaceMenu FaceZones HaloMenu HaloZones JewelryMenu JewelryZones LandscapeMenu LandscapeZones LanscapeMenu LanscapeZones LeftGestureMenu LeftGestureZones MetaDiscussionMenu MetaDiscussionZones NimbusMenu NimbusZones OfferingsMenu OfferingsZones RightGestureMenu RightGestureZones ThroneMenu ThroneZones postureDiagramForm postureDiagramFormOffset player1 player2 player3 '
  classVariableNames: ''
  poolDictionaries: ''
  category: 'Thangka-VideoScenes'

*Copyright (c) Xerox Corporation, 1987, 1988*

ScenesTitlesOnDeityEditor methodsFor: Inquiries & assignment canvas
    ↑canvas canvas: aForm canvas ← aForm deityName: aName
    deityName ← aName initializeVideoDiskPlayers
    player1 ← VideoDiskPlayer new playerID: 1.
    player2 ← VideoDiskPlayer new playerID: 2.
    player3 ← VideoDiskPlayer new playerID: 3 postureDiagramVisible: aBoolean
    | formInfo |
    postureDiagramVisible ← aBoolean.
    postureDiagramVisible
        ifTrue:
            [formInfo ← DictionaryOfPostureDiagramForms supplyFormAndOffsetOf: deityName.
            postureDiagramForm ← formInfo at: 1.
            postureDiagramFormOffset ← formInfo at: 2]

proportioningDiagramVisible: aBoolean
    proportioningDiagramVisible ← aBoolean

ScenesTitlesOnDeityEditor methodsFor: Zones detectAllZonesOfWhichCursorPointIsMember: aCursorPoint
    | allZonesOfWhichPointIsMember |
    allZonesOfWhichPointIsMember ← OrderedCollection new.
    MetaDiscussionZones zones do: [:aRectangle | (aRectangle containsPoint: aCursorPoint)
            ifTrue: [allZonesOfWhichPointIsMember add: (OrderedCollection with: 'metaDiscussion' with: aRectangle)]].
        LandscapeZones zones do: [:aRectangle | (aRectangle containsPoint: aCursorPoint)
            ifTrue: [allZonesOfWhichPointIsMember add: (OrderedCollection with: 'landscape' with:

aRectangle)]].
    NimbusZones zones do: [:aRectangle | (aRectangle containsPoint: aCursorPoint)
        ifTrue: [allZonesOfWhichPointIsMember add: (OrderedCollection with: 'nimbus' with:
aRectangle)]].
    HaloZones zones do: [:aRectangle | (aRectangle containsPoint: aCursorPoint)
        ifTrue: [allZonesOfWhichPointIsMember add: (OrderedCollection with: 'halo' with:
aRectangle)]].
    FaceZones zones do: [:aRectangle | (aRectangle containsPoint: aCursorPoint)
        ifTrue: [allZonesOfWhichPointIsMember add: (OrderedCollection with: 'face' with:
aRectangle)]].
    JewelryZones zones do: [:aRectangle | (aRectangle containsPoint: aCursorPoint)
        ifTrue: [allZonesOfWhichPointIsMember add: (OrderedCollection with: 'jewelry' with:
aRectangle)]].
    LeftGestureZones zones do: [:aRectangle | (aRectangle containsPoint: aCursorPoint)
        ifTrue: [allZonesOfWhichPointIsMember add: (OrderedCollection with: 'leftGesture' with:
aRectangle)]].
    RightGestureZones zones do: [:aRectangle | (aRectangle containsPoint: aCursorPoint)
        ifTrue: [allZonesOfWhichPointIsMember add: (OrderedCollection with: 'rightGesture' with:
aRectangle)]].
    ClothingZones zones do: [:aRectangle | (aRectangle containsPoint: aCursorPoint)
        ifTrue: [allZonesOfWhichPointIsMember add: (OrderedCollection with: 'clothing' with:
aRectangle)]].
    ThroneZones zones do: [:aRectangle | (aRectangle containsPoint: aCursorPoint)
        ifTrue: [allZonesOfWhichPointIsMember add: (OrderedCollection with: 'throne' with:
aRectangle)]].
    OfferingsZones zones do: [:aRectangle | (aRectangle containsPoint: aCursorPoint)
        ifTrue: [allZonesOfWhichPointIsMember add: (OrderedCollection with: 'offerings' with:
aRectangle)]].
    ↑allZonesOfWhichPointIsMember
``` startUpMenu: aZoneName

```
    aZoneName = 'metaDiscussion' ifTrue: [↑MetaDiscussionMenu startUp].
    aZoneName = 'landscape' ifTrue: [↑LandscapeMenu startUp].
    aZoneName = 'nimbus' ifTrue: [↑NimbusMenu startUp].
    aZoneName = 'halo' ifTrue: [↑HaloMenu startUp].
    aZoneName = 'face' ifTrue: [↑FaceMenu startUp].
    aZoneName = 'jewelry' ifTrue: [↑JewelryMenu startUp].
    aZoneName = 'leftGesture' ifTrue: [↑LeftGestureMenu startUp].
    aZoneName = 'rightGesture' ifTrue: [↑RightGestureMenu startUp].
    aZoneName = 'clothing' ifTrue: [↑ClothingMenu startUp].
    aZoneName = 'throne' ifTrue: [↑ThroneMenu startUp].
    aZoneName = 'offerings' ifTrue: [↑OfferingsMenu startUp].
``` zoneHasCursorPoint

```
    | cursorPoint allZonesOfWhichPointIsMember dummyArea type rectangle lowest |
    cursorPoint ← sensor cursorPoint.
    dummyArea ← 1000 * 808.
    allZonesOfWhichPointIsMember ← self detectAllZonesOfWhichCursorPointIsMember: cursorPoint -
self view displayBox origin.
    allZonesOfWhichPointIsMember do:
        [:zoneIdentity |
        type ← zoneIdentity at: 1.
        rectangle ← zoneIdentity at: 2.
        rectangle area < dummyArea
            ifTrue:

[dummyArea ← rectangle area.
lowest ← type]].
lowest isNil ifTrue: [↑nil].
↑self startUpMenu: lowest

ScenesTitlesOnDeltyEditor methodsFor: laser disk control playScene: segment
  | discID player |
  segment discID = 1 ifTrue: [player ← player1. player playerID: 1. ].
  segment discID = 2 ifTrue: [player ← player2. player playerID: 2. ].
  segment discID = 3 ifTrue: [player ← player3. player playerID: 3. ].

player search: segment beginFrame. Transcript show: segment beginFrame printString, '*****'; cr.
  segment beginFrame = segment endFrame | (segment endFrame - segment beginFrame <= 2)
    ifTrue: [↑self].
  player repeat: segment endFrame count: 1

ScenesTitlesOnDeltyEditor methodsFor: basic control sequence controlActivity
  | symbol videoSegment |
  self viewHasCursor
    ifTrue:
      [postureDiagramVisible ifTrue: [self displayPostureDiagramUntil: [sensor anyButtonPressed]].
      "sensor redButtonPressed ifTrue: [↑self redButtonActivity]."
      sensor yellowButtonPressed | sensor redButtonPressed
        ifTrue:
          [symbol ← self zoneHasCursorPoint.
          symbol == nil | (symbol == 0)
            ifFalse:
              [videoSegment ← VideoSegment readFrom: symbol.
              self playScene: videoSegment]]]

displayPostureDiagramUntil: aBlock
  | displayPoint |
  displayPoint ← postureDiagramFormOffset + view displayBox origin.
  postureDiagramForm
    displayOn: Display
    at: displayPoint
    rule: Form reverse.
  [aBlock value]
    whileFalse: ["postureDiagramForm
          displayOn: Display
          at: displayPoint
          rule: Form reverse"].
  postureDiagramForm
    displayOn: Display
    at: displayPoint
    rule: Form reverse isControlActive
  ↑super isControlActive & sensor blueButtonPressed not

ScenesTitlesOnDeltyEditor methodsFor: initialize initializeMenuZones
    ClothingZones ← AbstractDeityMenuZones new initialize.
    FaceZones ← AbstractDeityMenuZones new initialize.
    HaloZones ← AbstractDeityMenuZones new initialize.
    JewelryZones ← AbstractDeityMenuZones new initialize.
    LandscapeZones ← AbstractDeityMenuZones new initialize.
    LanscapeZones ← AbstractDeityMenuZones new initialize.
    LeftGestureZones ← AbstractDeityMenuZones new initialize.
    MetaDiscussionZones ← AbstractDeityMenuZones new initialize.
    NimbusZones ← AbstractDeityMenuZones new initialize.
    OfferingsZones ← AbstractDeityMenuZones new initialize.
    RightGestureZones ← AbstractDeityMenuZones new initialize.
    ThroneZones ← AbstractDeityMenuZones new initialize ScenesTitlesOnDeityEditor methodsFor: menu messages ScenesTitlesOnDeityEditor methodsFor: menu initializations assignZone: aRectangle toMenu: anIndex
    anIndex = 1 ifTrue: [MetaDiscussionZones zonesAdd: aRectangle].
    anIndex = 2 ifTrue: [LandscapeZones zonesAdd: aRectangle].
    anIndex = 3 ifTrue: [NimbusZones zonesAdd: aRectangle].
    anIndex = 4 ifTrue: [HaloZones zonesAdd: aRectangle].
    anIndex = 5 ifTrue: [FaceZones zonesAdd: aRectangle].
    anIndex = 6 ifTrue: [JewelryZones zonesAdd: aRectangle].
    anIndex = 7 ifTrue: [LeftGestureZones zonesAdd: aRectangle].
    anIndex = 8 ifTrue: [RightGestureZones zonesAdd: aRectangle].
    anIndex = 9 ifTrue: [ClothingZones zonesAdd: aRectangle].
    anIndex = 10 ifTrue: [ThroneZones zonesAdd: aRectangle].
    anIndex = 11 ifTrue: [OfferingsZones zonesAdd: aRectangle]

fileInMenuStrings
    | file |
    'Shakyamuni2' = deityName ifTrue: [deityName ← 'sh'].
    MetaDiscussionMenu ← (MenuBuilder parseFrom: (file ← FileStream oldFileNamed: 'thangka:' , deityName , 'metaDiscussion.menuText') readOnly) menu.
    file close.
    LandscapeMenu ← (MenuBuilder parseFrom: (file ← FileStream oldFileNamed: 'thangka:' , deityName , 'landscape.menuText') readOnly) menu.
    file close.
    NimbusMenu ← (MenuBuilder parseFrom: (file ← FileStream oldFileNamed: 'thangka:' , deityName , 'nimbus.menuText') readOnly) menu.
    file close.
    HaloMenu ← (MenuBuilder parseFrom: (file ← FileStream oldFileNamed: 'thangka:' , deityName , 'halo.menuText') readOnly) menu.
    file close.
    FaceMenu ← (MenuBuilder parseFrom: (file ← FileStream oldFileNamed: 'thangka:' , deityName , 'face.menuText') readOnly) menu.
    file close.
    JewelryMenu ← (MenuBuilder parseFrom: (file ← FileStream oldFileNamed: 'thangka:' , deityName , 'jewelry.menuText') readOnly) menu.
    file close.
    LeftGestureMenu ← (MenuBuilder parseFrom: (file ← FileStream oldFileNamed: 'thangka:' , deityName , 'leftGesture.menuText') readOnly) menu.
    file close.
    RightGestureMenu ← (MenuBuilder parseFrom: (file ← FileStream oldFileNamed: 'thangka:' , deityName , 'rightGesture.menuText') readOnly) menu.
    file close.
    ClothingMenu ← (MenuBuilder parseFrom: (file ← FileStream oldFileNamed: 'thangka:' , deityName , 'clothing.menuText') readOnly) menu.
    file close.
    ThroneMenu ← (MenuBuilder parseFrom: (file ← FileStream oldFileNamed: 'thangka:' , deityName , 'throne.menuText') readOnly) menu.
    file close.
    OfferingsMenu ← (MenuBuilder parseFrom: (file ← FileStream oldFileNamed: 'thangka:' , deityName , 'offerings.menuText') readOnly) menu.
    file close.
    'sh' = deityName ifTrue: [deityName ← 'Shakyamuni2']

fileInMenuZones
    | aFileName outFile nRectangles origin rectangle corner |
    aFileName ← 'thangka:' , deityName , 'menus.rZones'.
    outFile ← FileStream oldFileNamed: aFileName.
    outFile binary.
    1 to: 11 do:
        [:index |
        nRectangles ← outFile nextWord.
        1 to: nRectangles do:
            [:counter |
            origin ← outFile nextWord @ outFile nextWord.
            corner ← outFile nextWord @ outFile nextWord.
            rectangle ← Rectangle new origin: origin corner: corner.
            self assignZone: rectangle toMenu: index]].
    outFile close.
    "self halt"

InitializeMenus
    self initializeMenuZones.
    self fileInMenuZones.
    self fileInMenuStrings menuStrings
    | outCollection |
    outCollection ← OrderedCollection new.
    outCollection add: MetaDiscussionMenu; add: LandscapeMenu; add: NimbusMenu; add: HaloMenu; add: FaceMenu; add: JewelryMenu; add: LeftGestureMenu; add: RightGestureMenu; add: ClothingMenu; add: ThroneMenu; add: OfferingsMenu.
    ↑outCollection menuStrings: aCollectionOfStrings
    "note: aCollectionOfStrings will have to be made into menus"

MetaDiscussionMenu ← (aCollectionOfStrings at: 1) menu.
    LandscapeMenu ← (aCollectionOfStrings at: 2) menu.
    NimbusMenu ← (aCollectionOfStrings at: 3) menu.
    HaloMenu ← (aCollectionOfStrings at: 4) menu.
    FaceMenu ← (aCollectionOfStrings at: 5) menu.
    JewelryMenu ← (aCollectionOfStrings at: 6) menu.
    LeftGestureMenu ← (aCollectionOfStrings at: 7) menu.
    RightGestureMenu ← (aCollectionOfStrings at: 8) menu.
    ClothingMenu ← (aCollectionOfStrings at: 9) menu.
    ThroneMenu ← (aCollectionOfStrings at: 10) menu.

OfferingsMenu ← (aCollectionOfStrings at: 11) menu menuZones
    | outCollection |
    outCollection ← OrderedCollection new.
    outCollection add: MetaDiscussionZones; add: LandscapeZones; add: NimbusZones; add: HaloZones; add: FaceZones; add: JewelryZones; add: LeftGestureZones; add: RightGestureZones; add: ClothingZones; add: ThroneZones; add: OfferingsZones.
    ↑outCollection menuZones: aCollectionOfRectangles
    MetaDiscussionZones ← aCollectionOfRectangles at: 1.
    LandscapeZones ← aCollectionOfRectangles at: 2.
    NimbusZones ← aCollectionOfRectangles at: 3.
    HaloZones ← aCollectionOfRectangles at: 4.
    FaceZones ← aCollectionOfRectangles at: 5.
    JewelryZones ← aCollectionOfRectangles at: 6.
    LeftGestureZones ← aCollectionOfRectangles at: 7.
    RightGestureZones ← aCollectionOfRectangles at: 8.
    ClothingZones ← aCollectionOfRectangles at: 9.
    ThroneZones ← aCollectionOfRectangles at: 10.
    OfferingsZones ← aCollectionOfRectangles at: 11 supplyTranscriptOfMenuStrings
    | file |
    'Shakyamuni2' = deityName
        ifTrue: [deityName ← 'sh'].
    MetaDiscussionMenu ← MenuBuilder parseFrom: (file ← FileStream oldFileNamed: 'thangka:', deityName, 'metaDiscussion.menuText') readOnly.
    file close.
    LandscapeMenu ← MenuBuilder parseFrom: (file ← FileStream oldFileNamed: 'thangka:', deityName, 'landscape.menuText') readOnly.
    file close.
    NimbusMenu ← MenuBuilder parseFrom: (file ← FileStream oldFileNamed: 'thangka:', deityName, 'nimbus.menuText') readOnly.
    file close.
    HaloMenu ← MenuBuilder parseFrom: (file ← FileStream oldFileNamed: 'thangka:', deityName, 'halo.menuText') readOnly.
    file close.
    FaceMenu ← MenuBuilder parseFrom: (file ← FileStream oldFileNamed: 'thangka:', deityName, 'face.menuText') readOnly.
    file close.
    JewelryMenu ← MenuBuilder parseFrom: (file ← FileStream oldFileNamed: 'thangka:', deityName, 'jewelry.menuText') readOnly.
    file close.
    LeftGestureMenu ← MenuBuilder parseFrom: (file ← FileStream oldFileNamed: 'thangka:', deityName, 'leftGesture.menuText') readOnly.
    file close.
    RightGestureMenu ← MenuBuilder parseFrom: (file ← FileStream oldFileNamed: 'thangka:', deityName, 'rightGesture.menuText') readOnly.
    file close.
    ClothingMenu ← MenuBuilder parseFrom: (file ← FileStream oldFileNamed: 'thangka:', deityName, 'clothing.menuText') readOnly.
    file close.
    ThroneMenu ← MenuBuilder parseFrom: (file ← FileStream oldFileNamed: 'thangka:', deityName, 'throne.menuText') readOnly.

file close.
OfferingsMenu ← MenuBuilder parseFrom: (file ← FileStream oldFileNamed: 'thangka:', deityName, 'offerings.menuText') readOnly.
file close.
'sh' = deityName
 ifTrue: [deityName ← 'Shakyamuni2'].
↑self menuStrings supplyTranscriptOfMenuZones
"this is a hack -- a function --that enables the zones to be accessed outside of the class"

| aFileName outFile nRectangles origin rectangle corner |
aFileName ← 'thangka:', deityName , 'menus.rzones'.
outFile ← FileStream oldFileNamed: aFileName.
outFile binary.
1 to: 11 do:
 [:index |
 nRectangles ← outFile nextWord.
 1 to: nRectangles do:
  [:counter |
  origin ← outFile nextWord @ outFile nextWord.
  corner ← outFile nextWord @ outFile nextWord.
  rectangle ← Rectangle new origin: origin corner: corner.
  self assignZone: rectangle toMenu: index]].
outFile close.
↑self menuZones

ScenesTitlesOnDeityEditor class
   instanceVariableNames: ''

ScenesTitlesOnDeityEditor class methodsFor: instance creation createForDeity: aDeityName
| formView topView extent aForm sceneTitleOnDeityEditor |
formView ← FormHolderView new model: (aForm ← Form readFrom: 'thangka:', aDeityName , '.form').
sceneTitleOnDeityEditor ← self new deityName: aDeityName.
sceneTitleOnDeityEditor initializeVideoDiskPlayers.
sceneTitleOnDeityEditor initializeMenus.
sceneTitleOnDeityEditor canvas: aForm.
sceneTitleOnDeityEditor deityName: aDeityName.
sceneTitleOnDeityEditor postureDiagramVisible: true.
formView controller: sceneTitleOnDeityEditor.
topView ← StandardSystemView new.
topView model: aForm.
topView addSubView: formView.
topView label: aDeityName.
topView borderWidth: 2.
extent ← topView viewport extent.
topView minimumSize: extent.
topView maximumSize: extent.
topView controller open
"ScenesTitlesOnDeityEditor createForDeity: 'Shakyamuni2'"

```
Object subclass: #AbstractDeityMenuZones
    instanceVariableNames: 'zones '
    classVariableNames: ''
    poolDictionaries: ''
    category: 'Thangka-VideoScenes'
```

*Copyright (c) Xerox Corporation, 1987, 1988*

AbstractDeityMenuZones methodsFor: initialize flush
    zones ← OrderedCollection new initialize
    zones ← OrderedCollection new.

AbstractDeityMenuZones methodsFor: inquiries & assignment zones
    ↑zones zones: aCollectionOfRectangularExtents
    "note: a menu may be linked to many regions"

zones ← aCollectionOfRectangularExtents zonesAdd: aRectangularRegion
    zones add: aRectangularRegion

```
Object variableSubclass: #DictionaryOfSkeletonTopologies
    instanceVariableNames: ''
    classVariableNames: 'TableContents TableNames '
    poolDictionaries: ''
    category: 'Thangka-Digitizing'
```

*Copyright (c) Xerox Corporation, 1988*

DictionaryOfSkeletonTopologies class
    instanceVariableNames: ''

DictionaryOfSkeletonTopologies class methodsFor: initialize initialize
```
    TableContents ← OrderedCollection new.
    TableNames ← OrderedCollection new.
    self initializeShakyaMuni1.
    self initializeShakyaMuni2.
    self initializeShakyaMuni3.
    self initializeGreenTara.
    self initializeSaraswati.
    self initializeSukhasiddhi.
    self initializeVajravarahi.
    self initializeMilarepa.
    self initializeMahakala1
    "DictionaryOfSkeletonTopologies initialize"
``` initializeGreenTara
```
    | contents |
    TableNames add: 'GreenTara'.
    contents ← OrderedCollection new.
    contents add: 'leaningToTheLeft'; add: 'verticalyDown' @ 'toKnee'; add: 'grantingTheBest'; add:
'verticalyDown' @ 'toHeart'; add: 'bestowingFearlessness'; add: 'squatting' @ 'steppingDown'; add:
'squatting' @ 'squatting'.
    TableContents add: contents
``` initializeMahakala
```
    | contents |
    TableNames add: 'Mahakala'.
    contents ← OrderedCollection new.
    contents add: 'leaningToTheRight'; add: 'horizontallyRaised' @ 'verticallyStretched'; add: ' '; add:
'horizontallyRaised' @ 'toKnee'; add: ' '; add: 'squatting' @ 'steppingDown'; add: 'squatting' @ 'squatting'.
    TableContents add: contents
``` initializeMahakala1
```
    | contents |
    TableNames add: 'Mahakala1'.
    contents ← OrderedCollection new.
    contents add: 'vertical'; add: 'horizontallyRaised'@'verticallyStretched'; add: ' '; add:
'horizontallyRaised'@'toHeart'; add: ' '; add:'squatting'@'steppingDown'; add:
'squatting'@'leaningToRight'.
    TableContents add: contents
``` initializeMilarepa
    | contents |
    TableNames add: 'Milarepa'.
    contents ← OrderedCollection new.
    contents add: 'leaningToTheRight'; add: 'horizontallyRaised'@'toBelly'; add: ' '; add: 'horizontallyRaised'@'toLap'; add: ' '; add: 'verticallyRaised'@'steppingDown'; add: 'squatting'@'squatting'.
    TableContents add: contents initializeSaraswati
    | contents |
    TableNames add: 'Saraswati'.
    contents ← OrderedCollection new.
    contents add: 'leaningToTheRight'; add: 'horizontallyRaised' @ 'toLap'; add: ' '; add: 'horizontallyRaised' @ 'verticallyStretched'; add: ' '; add: 'verticallyRaised' @ 'steppingDown'; add: 'verticallyRaised' @ 'steppingDown'.
    TableContents add: contents initializeShakyaMuni1
    | contents |
    TableNames add: 'Shakyamuni1'.
    contents ← OrderedCollection new.
    contents add: 'vertical'; add: 'verticalyDown' @ 'toLap'; add: 'meditativeEquipoise'; add: 'verticalyDown' @ 'toLap'; add: 'meditativeEquipoise'; add: 'squatting' @ 'squatting'; add: 'squatting' @ 'squatting'.
    TableContents add: contents initializeShakyaMuni2
    | contents |
    TableNames add: 'Shakyamuni2'.
    contents ← OrderedCollection new.
    contents add: 'vertical'; add: 'verticalyDown' @ 'toKnee'; add: 'meditativeEquipoise'; add: 'verticalyDown' @ 'toLap'; add: 'meditativeEquipoise'; add: 'squatting' @ 'squatting'; add: 'squatting' @ 'squatting'.
    TableContents add: contents initializeShakyaMuni3
    | contents |
    TableNames add: 'Shakyamuni3'.
    contents ← OrderedCollection new.
    contents add: 'vertical'; add: 'verticalyDown' @ 'toHeart'; add: 'meditativeEquipoise'; add: 'verticalyDown' @ 'toLap'; add: 'meditativeEquipoise'; add: 'squatting' @ 'squatting'; add: 'squatting' @ 'squatting'.
    TableContents add: contents initializeSukhasiddhi
    | contents |
    TableNames add: 'Sukhasiddhi'.
    contents ← OrderedCollection new.
    contents add: 'leaningToTheRight'; add: 'verticalyDown' @ 'toLap'; add: 'meditativeEquipoise'; add: 'horizontallyRaised'@'verticallyStretched'; add: 'threateningPointer'; add: 'squatting' @ 'squatting'; add: 'squatting' @ 'squatting'.
    TableContents add: contents initializeVajravarahi

| contents |
TableNames add: 'Vajravarahi'.
contents ← OrderedCollection new.
contents add: 'leaningToTheRight'; add:'horizontallyRaised'@'verticallyStretched'; add: 'meditativeEquipoise'; add:'horizontallyRaised'@'toHeart'; add: 'threateningPointer'; add: 'squatting' @ 'squatting'; add: 'standing'@'steppingDown'.
   TableContents add: contents

DictionaryOfSkeletonTopologies class methodsFor: deity table matchTopology: aSkeletonTopology
   | matches collectionOfMatches noMatch highestScore |
   collectionOfMatches ← OrderedCollection new.
   TableContents do:
      [:deityInformation |
      matches ← 0.
      aSkeletonTopology headToNavel = (deityInformation at: 1) ifTrue: [matches ← matches + 1].
      aSkeletonTopology leftArm x = (deityInformation at: 2) x ifTrue: [matches ← matches + 1].
      aSkeletonTopology leftArm y = (deityInformation at: 2) y ifTrue: [matches ← matches + 1].
      aSkeletonTopology leftGesture = (deityInformation at: 3) ifTrue: [matches ← matches + 1].
      aSkeletonTopology rightArm x = (deityInformation at: 4) x ifTrue: [matches ← matches + 1].
      aSkeletonTopology rightArm y = (deityInformation at: 4) y ifTrue: [matches ← matches + 1].
      aSkeletonTopology rightGesture = (deityInformation at: 5) ifTrue: [matches ← matches + 1].
      aSkeletonTopology leftLeg x = (deityInformation at: 6) x ifTrue: [matches ← matches + 1].
      aSkeletonTopology leftLeg y = (deityInformation at: 6) y ifTrue: [matches ← matches + 1].
      aSkeletonTopology rightLeg = (deityInformation at: 7) ifTrue: [matches ← matches + 1].
      aSkeletonTopology rightLeg y = (deityInformation at: 7) y ifTrue: [matches ← matches + 1].
      collectionOfMatches add: matches].
   noMatch ← 0.
   1 to: collectionOfMatches size do: [:index | (collectionOfMatches at: index)
         > noMatch
         ifTrue:
            [noMatch ← collectionOfMatches at: index.
            highestScore ← index]].
   ↑TableNames at: highestScore Object subclass: #DeitySceneTitlesDictionary
　　instanceVariableNames: ''
　　classVariableNames: 'Contents Names '
　　poolDictionaries: ''
　　category: 'Thangka-VideoScenes'

*Copyright (c) Xerox Corporation, 1987, 1988*

DeitySceneTitlesDictionary class
　　instanceVariableNames: ''

DeitySceneTitlesDictionary class methodsFor: instance creation constructEditor: index deityName: aDeityName
　　| info formView sceneTitleOnDeityEditor aForm topView extent |
　　info ← Contents at: index.
　　formView ← FormHolderView new model: (aForm ← info at: 1).
　　sceneTitleOnDeityEditor ← ScenesTitlesOnDeityEditor new deityName: aDeityName.
　　sceneTitleOnDeityEditor initializeVideoDiskPlayers.
　　sceneTitleOnDeityEditor canvas: aForm.
　　sceneTitleOnDeityEditor deityName: aDeityName.
　　sceneTitleOnDeityEditor postureDiagramVisible: true.
　　sceneTitleOnDeityEditor menuZones: (info at: 2).
　　sceneTitleOnDeityEditor menuStrings: (info at: 3).
　　formView controller: sceneTitleOnDeityEditor.
　　topView ← StandardSystemView new.
　　topView model: aForm.
　　topView addSubView: formView.
　　topView label: aDeityName.
　　topView borderWidth: 2.
　　extent ← topView viewport extent.
　　topView minimumSize: extent.
　　topView maximumSize: extent.
　　↑topView controller open createEditor: aDeityName
　　1 to: Names size do: [:index | (Names at: index)
　　　　　= aDeityName ifTrue: [↑self constructEditor: index deityName: aDeityName]].
　　↑nil
　　"DeitySceneTitlesDictionary createEditor: 'GreenTara'"

forDeity: aDeityName
　　1 to: Names size do: [:index | (Names at: index)
　　　　　= aDeityName ifTrue: [↑(Contents at: index) controller open]]

DeitySceneTitlesDictionary class methodsFor: initialize initialize
　　"All SceneOnDeity Editors must be initialized like: self initialize:
　　'GreenTara'"

Names ← OrderedCollection new.

```
    Contents ← OrderedCollection new.
"   self initialize: 'GreenTara'."
    self initialize: 'Shakyamuni2'
    "DeitySceneTitlesDictionary initialize"
``` initialize: aDeityName
"This method pre-computes scene titles, organizes forms"

```
| form editor menuZones menuStrings |
form ← Form readFrom: 'thangka:' ,aDeityName , '.form'.
editor ← ScenesTitlesOnDeityEditor new deityName: aDeityName.
editor initializeMenuZones.
menuZones ← editor supplyTranscriptOfMenuZones.
menuStrings ← editor supplyTranscriptOfMenuStrings.
Contents add: (OrderedCollection with: form with: menuZones with: menuStrings).
Names add: aDeityName
```

AbstractThangkaEditor subclass: #DeityDatabaseEditor
    instanceVariableNames: 'canvas diagramInformation center blankCanvas collectionOfLinearFits currentDeity spawnedASceneEditor '
    classVariableNames: 'YellowButtonMenu '
    poolDictionaries: ''
    category: 'Thangka-Digitizing'

*Copyright (c) Xerox Corporation, 1987, 1988*

DeityDatabaseEditor methodsFor: linear fits determineNewPoints
"this method is called by redButtonActivity; it allows the user to
manipulate constrained dependencies of the deity's parts, foe example
lower right arm rotates about upper arm with certain degrees of freedom.
I am still unclear about what happens to shoulders when the deity's axes
are tilted eitrher to the right or to the left"

```
| messageString |
    messageString ← diagramInformation currentSelection , 'Point' , diagramInformation pointIndex printString , 'rubberBandOutlineUntil:'.
    ↑self perform: messageString asSymbol with: [sensor noButtonPressed]
``` highLightSpline
" this method highlights the line between two knot points --or the two
points of a linear fit -- the deity's parts closest to the cursor point"

```
| p1 p2 d xp yp p u v bb|
bb ← BitBlt destForm: Display
        sourceForm: (Form dotOfSize: 1)
        halftoneForm: nil
        combinationRule: 6
        destOrigin: 0@0 sourceOrigin: 0@0
        extent: 1@1
        clipRect: view insetDisplayBox.
p ← Sensor cursorPoint.
collectionOfLinearFits do: [:aLinearFit | 1 to: aLinearFit size - 1 do:
        [:count |
        p1 ← (aLinearFit at: count)
                + view displayBox origin + center.
        p2 ← (aLinearFit at: count + 1)
                + view displayBox origin + center.
        d ← ((p1 x - p2 x) squared + (p1 y - p2 y) squared) sqrt.
        d = 0.0 ifTrue: [↑self].
        xp ← p2 x - p1 x / d.
        yp ← p2 y - p1 y / d.
        u ← p x - p1 x * xp + (p y - p1 y * yp).
        v ← p x - p1 x * yp - (p y - p1 y * xp).
        v abs < 10.0 & (u < (d + 10.0) & (u > -10.0))
            ifTrue:
                [u = 0.0
                    ifTrue:
                        [bb drawFrom: p1 to: p2.
                        ↑bb drawFrom: p1 to: p2].
                (v / u) abs < 0.2
```

```
            ifTrue:
                [bb drawFrom: p1 to: p2.
                ↑bb drawFrom: p1 to: p2]]]

obtainLinearFitDataBasedOnTheSelectedPoint: p
    | p1 p2 d xp yp u v linearFitCounter closePoint |
    linearFitCounter ← 0.
    collectionOfLinearFits do:
        [:aLinearFit |
        linearFitCounter ← linearFitCounter + 1.
        1 to: aLinearFit size - 1 do:
            [:count |
            p1 ← (aLinearFit at: count)
                    + view displayBox origin + center.
            p2 ← (aLinearFit at: count + 1)
                    + view displayBox origin + center.
            d ← ((p1 x - p2 x) squared + (p1 y - p2 y) squared) sqrt.
            d = 0.0 ifTrue: [↑self].
            xp ← p2 x - p1 x / d.
            yp ← p2 y - p1 y / d.
            u ← p x - p1 x * xp + (p y - p1 y * yp).
            v ← p x - p1 x * yp - (p y - p1 y * xp).
            v abs < 10 & (u < (d + 10) & (u > -10))
                ifTrue:
                    [diagramInformation ← DiagramInformation new
                            currentSelection: (self updateCurrentSelection: linearFitCounter)
                            selectedPoint: (closePoint ← self
                                    cursorPoint: p
                                    isCloseToPoint1: p1
                                    OrPoint2: p2) - view displayBox origin - center
                            pointIndex: (closePoint = p1
                                    ifTrue: [count]
                                    ifFalse: [count + 1])
                            selectedCollection: aLinearFit
                            collectionIndex: linearFitCounter
                            collectionOfLinearFits: collectionOfLinearFits.
            u = 0.0
                ifTrue:
                    ["self updateCurrentSelection: linearFitCounter.
                    selectedPoint ← aLinearFit at: count.
                    pointsIndex ← count.
                    selectedCollection ← aLinearFit.
                    collectionIndex ← linearFitCounter."
                    Display
                        drawLine: (Form extent: 1 @ 1) black
                        from: p1
                        to: p2
                        clippingBox: view computeBoundingBox
                        rule: 6
                        mask: nil.
                    ↑Display
                        drawLine: (Form extent: 1 @ 1) black
                        from: p1
                        to: p2
                        clippingBox: view computeBoundingBox
                        rule: 6
```

```
                    mask: nil].
(v / u) abs < 0.2
    ifTrue:
        [Display
            drawLine: (Form extent: 1 @ 1) black
            from: p1
            to: p2
            clippingBox: view computeBoundingBox
            rule: 6
            mask: nil.
        ↑Display
            drawLine: (Form extent: 1 @ 1) black
            from: p1
            to: p2
            clippingBox: view computeBoundingBox
            rule: 6
            mask: nil]]]
```

DeityDatabaseEditor methodsFor: basic control sequence controlActivity
```
self viewHasCursor
    ifTrue:
        [sensor redButtonPressed ifTrue: [↑self redButtonActivity].
        sensor yellowButtonPressed ifTrue: [↑self yellowButtonActivity].
        sensor blueButtonPressed ifTrue: [ ↑self blueButtonActivity].
        sensor keyboardPressed ifTrue: [↑self keyboardActivity].
        self highLightSpline]
``` isControlActive
```
↑super isControlActive & sensor blueButtonPressed not
```

DeityDatabaseEditor methodsFor: initialize-release computeCanvas: aPostureDiagram
" establish the extent of the canvas from the size of the posture diagram's
  extent; establish center; display posture diagram on the canvas"

```
blankCanvas ← Form new extent: aPostureDiagram lowerRight - aPostureDiagram upperLeft.
canvas ← Form new extent: aPostureDiagram lowerRight - aPostureDiagram upperLeft.
center ← aPostureDiagram center - aPostureDiagram upperLeft.
self checkForDependencies.
aPostureDiagram
    displayAsSplineWithHandsAndGesturesSeparated2At: center
    On: canvas
    left: false
    right: false.
"aPostureDiagram displayAsLinearFitAt: center On: canvas."
↑canvas
``` initialize

```
super initialize
```

DeityDatabaseEditor methodsFor: assignment and inquiry canvas
↑canvas canvas: aForm
canvas ← aForm collectionOfLinearFits
↑collectionOfLinearFits collectionOfLinearFits: aCollection
collectionOfLinearFits ←aCollection currentDeity
↑currentDeity currentDeity: aDeityName
currentDeity ← aDeityName cursorPoint: cursorPoint IsCloseToPoint1: point1 OrPoint2: point2
| distance2 distance1 |
distance1 ← cursorPoint dist: point1.
distance2 ← cursorPoint dist: point2.
distance1 <= distance2
    ifTrue: [↑point1]
    ifFalse: [↑point2]

returnAngleForPoint1: p1 centeredAbout: p2 point3: p3
| vector2 vector3 denom radianTheta theta |
vector2 ← p2 - p1.
vector3 ← p3 - p1.
denom ← ((vector2 dot: vector2)
       * (vector3 dot: vector3)) sqrt.
denom = 0.0 ifTrue:[denom ← 0.01].
radianTheta ← ((vector2 dot: vector3)
       / denom) arcCos.
↑theta ← radianTheta * 180 / Float pi returnPositionInCollectionOfDeityPart: aName
currentSelection = 'headToNavel' ifTrue: [↑1].
currentSelection = 'leftArm' ifTrue: [↑2].
currentSelection = 'leftGesture' ifTrue: [↑3].
currentSelection = 'rightArm' ifTrue: [↑4].
currentSelection = 'rightGesture' ifTrue: [↑5].
currentSelection = 'leftLeg' ifTrue: [↑6].
currentSelection = 'leftFoot' ifTrue: [↑7].
currentSelection = 'rightLeg' ifTrue: [↑8].
currentSelection = 'rightFoot' ifTrue: [↑9]

spawnedASceneEditor: aBoolean
spawnedASceneEditor ← aBoolean updateCurrentSelection: anIndexNumber

```
anIndexNumber = 1 ifTrue: [↑'headToNavel'].
anIndexNumber = 2 ifTrue: [↑'leftArm'].
anIndexNumber = 3 ifTrue: [↑'leftGesture'].
anIndexNumber = 4 ifTrue: [↑'rightArm'].
anIndexNumber = 5 ifTrue: [↑'rightGesture'].
anIndexNumber = 6 ifTrue: [↑'leftLeg'].
anIndexNumber = 7 ifTrue: [↑'leftFoot'].
anIndexNumber = 8 ifTrue: [↑'rightLeg'].
anIndexNumber = 9 ifTrue: [↑'rightFoot']
```

DeityDatabaseEditor methodsFor: Editors buildAnInteractionCanvas
   "input for gestural actions"

```
| displayView |
displayView ← FormHolderView new model: canvas.
displayView controller: self.
topView
    addSubView: displayView
    in: (0 @ 0 extent: 1 @ 1)
    borderWidth: 0.
topView model: canvas.
topView controller open
``` createAnEditor
   "create a standard system view"

```
topView ← StandardSystemView
            model: self
            label: 'database  editor first version'
            minimumSize: canvas extent.
topView maximumSize: canvas extent.
topView window: topView window viewport: (0 @ 0 extent: canvas extent)
``` createAnEditor: aLabel
   "create an editor with a label of the deity name"

```
topView ← StandardSystemView
            model: self
            label: aLabel
            minimumSize: canvas extent.
topView maximumSize: canvas extent.
topView window: topView window viewport: (0 @ 0 extent: canvas extent)
```

DeityDatabaseEditor methodsFor: menu messages keyboardActivity

```
| ch |
ch ← sensor keyboard.
(ch == $r or: [ch == $R])
    ifTrue: [↑self recognizeDiagram]
``` recognizeDiagram
   | recognizedDeity p |

```
recognizedDeity ← DictionaryOfSkeletonTopologies matchTopology: self parseDiagram.
Transcript show: recognizedDeity printString; cr.
currentDeity = recognizedDeity & (spawnedASceneEditor = false)
    ifTrue:
        [spawnedASceneEditor ← true].
(DeitySceneTitlesDictionary createEditor: recognizedDeity) == nil
    ifTrue: [DeityOutlineFormEditor createForDeity: recognizedDeity].
currentDeity ~= recognizedDeity
    ifTrue:
        [p ← PostureDiagram createAPostureDiagramOfDeityNamed: recognizedDeity
FromTheseLinesResidingOnFileNamed: 'thangka:' , recognizedDeity , '.postureDiagram'.
        p normalizeCoordinates.
        ↑DeityDatabaseEditor createAFreshOnNormalizedPostureDiagram: p]
``` redButtonActivity

" grab a point in the deity's representation, change the deigram; try and
    recognise the resulting figure. If it matches a pre-defined deity, then
create a scene titles editor for that particular deity; in this method the
    movements are constrained according pre-define dependences of the deity's parts wrt degrees of freedom, rotation, dimensioning and proportioning"

```
| point recognizedDeity p | .
Cursor normal
    showWhile:
        [self obtainLinearFitDataBasedOnTheSelectedPoint: (point ← sensor cursorPoint).
        diagramInformation isNil
            ifTrue: [↑self]
            ifFalse: [self determineNewPoints]].
diagramInformation ← nil.
self updateDisplay.
sensor waitNoButton
```

DeityDatabaseEditor methodsFor: linkages checkForDependencies

"re-link the deitys parts together"

```
self linkSpinalCordToArms.
self linkSpinalCordToLegs.
self linkLeftArmToGesture.
self linkRightArmToGesture.
self linkLeftLegToFoot.
self linkRightLegToFoot
``` linkLeftArmToGesture

```
| temp1 temp2 |
temp1 ← (collectionOfLinearFits at: 3) first.
"leftGesture"
temp2 ← (collectionOfLinearFits at: 2) last.
```

"leftArm"
temp1 = temp2 ifFalse: ["leftArm" self halt.
    (collectionOfLinearFits at: 3)
        at: 1 put: temp2]

linkLeftFootToLeg
| temp1 temp2 |
temp1 ← (collectionOfLinearFits at: 6) last.
"rightLeg"
temp2 ← (collectionOfLinearFits at: 7) first.
"rightFoot"
temp1 == temp2 ifFalse: ["rightLeg" self halt.
    (collectionOfLinearFits at: 6)
        at: 3 put: temp2]

linkLeftGestureToArm
"this means assign the current value of gesture to arm"

| temp1 temp2 |
temp1 ← (collectionOfLinearFits at: 3) first.
"leftGesture"
temp2 ← (collectionOfLinearFits at: 2) last.
"leftArm"
temp1 = temp2 ifFalse: ["leftArm" self halt.
    (collectionOfLinearFits at: 2)
        at: 4 put: temp1]

linkLeftLegToFoot
| temp1 temp2 |
temp1 ← (collectionOfLinearFits at: 6) last.
"rightLeg"
temp2 ← (collectionOfLinearFits at: 7) first.
"rightFoot"
temp1 == temp2 ifFalse: ["rightLeg"
    (collectionOfLinearFits at: 7)
        at: 1 put: temp1]

linkRightArmToGesture
| temp1 temp2 |
temp1 ← "rightGesture" (collectionOfLinearFits at: 5) first.
temp2 ← "rightArm" (collectionOfLinearFits at: 4) last.
temp1 == temp2 ifFalse: ["rightArm" (collectionOfLinearFits at: 5) at: 1 put: temp2]

linkRightFootToLeg
| temp1 temp2 |
temp1 ← "rightLeg" (collectionOfLinearFits at: 8) last.
temp2 ← "rightFoot" (collectionOfLinearFits at: 9) first.
temp1 == temp2 ifFalse: ["rightLeg" self halt. (collectionOfLinearFits at: 8) at: 3 put: temp2]

linkRightGestureToArm
| temp1 temp2 |
temp1 ← "rightGesture" (collectionOfLinearFits at: 5) first.
temp2 ← "rightArm" (collectionOfLinearFits at: 4) last.
temp1 == temp2 ifFalse: ["rightArm" self halt. (collectionOfLinearFits at: 4) at: 4 put: temp1]

linkRightLegToFoot

```
| temp1 temp2 |
temp1 ← "rightLeg" (collectionOfLinearFits at: 8)  last.
temp2 ← "rightFoot" (collectionOfLinearFits at: 9)  first.
temp1 == temp2 ifFalse: ["rightLeg" (collectionOfLinearFits at: 9)  at: 1 put: temp1]
``` linkSpinalCordToArms
```
| temp1 temp2 temp3 |
temp1 ← (collectionOfLinearFits at: 1)
            at: 2.
"headToNavel"
temp2 ← (collectionOfLinearFits at: 2) first.
temp3 ← (collectionOfLinearFits at: 4) first.
"leftArm"
temp1 ~= temp2 | (temp1 ~= temp3)
    ifTrue:
        ["leftArm" self halt.
        (collectionOfLinearFits at: 2)
            at: 1 put: temp1.
        "rightArm"
        (collectionOfLinearFits at: 4)
            at: 1 put: temp1]
``` linkSpinalCordToLegs
```
| temp1 temp2 temp3 |
temp1 ← (collectionOfLinearFits at: 1) last.
"headToNavel"
temp2 ← (collectionOfLinearFits at: 6) first.
"leftLeg"
temp3 ← (collectionOfLinearFits at: 8) first.
temp1 ~= temp2 | (temp1 ~= temp3)
    ifTrue:
        ["leftLeg"
        (collectionOfLinearFits at: 6)
            at: 1 put: temp1.
        "rightLeg"
        (collectionOfLinearFits at: 8)
            at: 1 put: temp1]
``` newcheckForDependencies
```
self linkSpinalCordToArms.
self linkSpinalCordToLegs.
self linkLeftArmToGesture.
self linkLeftGestureToArm.
self linkRightArmToGesture.
self linkRightGestureToArm.
self linkLeftLegToFoot.
self linkLeftFootToLeg.
self linkRightLegToFoot.
self linkRightFootToLeg
```

DeityDatabaseEditor methodsFor: parsing diagram parseDiagram

```
↑(SkeletonTopology
        headToNavel: (collectionOfLinearFits at: 1)
``` leftArm: (collectionOfLinearFits at: 2)
rightArm: (collectionOfLinearFits at: 4)
leftLeg: (collectionOfLinearFits at: 6)
rightLeg: (collectionOfLinearFits at: 8))

DeityDatabaseEditor methodsFor: reOutlining-posture parts computeAndDisplayAffectedShouldersOldPoint1: oldPoint1 NewPoint1: newPoint1
CenteredAbout: point2
| leftArmPoint2 leftArmPoint3 rightArmPoint2 rightArmPoint3 newLeftArmPoint2 newRightArmPoint2
spline angle angle1 angle2 leftArmPoint4 leftGesturePoint2 rightArmPoint4 rightGesturePoint2
newLeftArmPoint3 newRightArmPoint3 newLeftArmPoint4 newRightArmPoint4 newLeftGesturePoint2
newRightGesturePoint2 |
   leftArmPoint2 ← ((collectionOfLinearFits at: 2)
      at: 2)
      + (view displayBox origin + center).
   leftArmPoint3 ← ((collectionOfLinearFits at: 2)
      at: 3)
      + (view displayBox origin + center).
   leftArmPoint4 ← ((collectionOfLinearFits at: 2)
      at: 4)
      + (view displayBox origin + center).
   leftGesturePoint2 ← ((collectionOfLinearFits at: 3)
      at: 2)
      + (view displayBox origin + center).
   rightArmPoint2 ← ((collectionOfLinearFits at: 4)
      at: 2)
      + (view displayBox origin + center).
   rightArmPoint3 ← ((collectionOfLinearFits at: 4)
      at: 3)
      + (view displayBox origin + center).
   rightArmPoint4 ← ((collectionOfLinearFits at: 4)
      at: 4)
      + (view displayBox origin + center).
   rightGesturePoint2 ← ((collectionOfLinearFits at: 5)
      at: 2)
      + (view displayBox origin + center).
   angle1 ← (newPoint1 - point2) theta radiansToDegrees.
   angle2 ← (oldPoint1 - point2) theta radiansToDegrees.
   angle ← angle1 - angle2.
   newLeftArmPoint2 ← (leftArmPoint2 - point2 rotateBy: angle)
      + point2.
   newRightArmPoint2 ← (rightArmPoint2 - point2 rotateBy: angle)
      + point2.
   newLeftArmPoint3 ← (leftArmPoint3 - point2 rotateBy: angle)
      + point2.
   newRightArmPoint3 ← (rightArmPoint3 - point2 rotateBy: angle)
      + point2.
   newLeftArmPoint4 ← (leftArmPoint4 - point2 rotateBy: angle)
      + point2.
   newRightArmPoint4 ← (rightArmPoint4 - point2 rotateBy: angle)
      + point2.
   newLeftGesturePoint2 ← (leftGesturePoint2 - point2 rotateBy: angle)
      + point2.
   newRightGesturePoint2 ← (rightGesturePoint2 - point2 rotateBy: angle)
      + point2.

spline ← Spline new form: (Form new extent: 4 @ 4) black.
spline add: newLeftArmPoint4; add: newLeftArmPoint3; add: newLeftArmPoint2; add: point2; add:
newRightArmPoint2; add: newRightArmPoint3; add: newRightArmPoint4.
spline computeCurve.
spline
    displayOn: Display
    at: 0 @ 0
    clippingBox: view insetDisplayBox
    rule: Form reverse
    mask: nil.
spline
    displayOn: Display
    at: 0 @ 0
    clippingBox: view insetDisplayBox
    rule: Form reverse
    mask: nil.
self
    replaceOldPoint: leftArmPoint2
    OfCollection: 2
    With: newLeftArmPoint2.
self
    replaceOldPoint: rightArmPoint2
    OfCollection: 4
    With: newRightArmPoint2.
self
    replaceOldPoint: leftArmPoint3
    OfCollection: 2
    With: newLeftArmPoint3.
self
    replaceOldPoint: rightArmPoint3
    OfCollection: 4
    With: newRightArmPoint3.
self
    replaceOldPoint: leftArmPoint4
    OfCollection: 2
    With: newLeftArmPoint4.
self
    replaceOldPoint: rightArmPoint4
    OfCollection: 4
    With: newRightArmPoint4.
self
    replaceOldPoint: leftArmPoint4
    OfCollection: 3
    With: newLeftArmPoint4.
self
    replaceOldPoint: rightArmPoint4
    OfCollection: 5
    With: newRightArmPoint4.
self
    replaceOldPoint: leftGesturePoint2
    OfCollection: 3
    With: newLeftGesturePoint2.
self
    replaceOldPoint: rightGesturePoint2
    OfCollection: 5
    With: newRightGesturePoint2 computeAndDisplayAffectedShouldersOldPoint2: oldPoint2 NewPoint2: newPoint2
CenteredAbout: point1
| leftArmPoint2 leftArmPoint3 rightArmPoint2 rightArmPoint3 newLeftArmPoint2 newRightArmPoint2 spline angle angle1 angle2 leftArmPoint4 leftGesturePoint2 rightArmPoint4 rightGesturePoint2 |
   leftArmPoint2 ← ((collectionOfLinearFits at: 2)
      at: 2)
      + (view displayBox origin + center).
   leftArmPoint3 ← ((collectionOfLinearFits at: 2)
      at: 3)
      + (view displayBox origin + center).
   leftArmPoint4 ← ((collectionOfLinearFits at: 2)
      at: 4)
      + (view displayBox origin + center).
   leftGesturePoint2 ← ((collectionOfLinearFits at: 3)
      at: 2)
      + (view displayBox origin + center).
   rightArmPoint2 ← ((collectionOfLinearFits at: 4)
      at: 2)
      + (view displayBox origin + center).
   rightArmPoint3 ← ((collectionOfLinearFits at: 4)
      at: 3)
      + (view displayBox origin + center).
   rightArmPoint4 ← ((collectionOfLinearFits at: 4)
      at: 4)
      + (view displayBox origin + center).
   rightGesturePoint2 ← ((collectionOfLinearFits at: 5)
      at: 2)
      + (view displayBox origin + center).
   angle1 ← (newPoint2 - point1) theta radiansToDegrees.
   angle2 ← (oldPoint2 - point1) theta radiansToDegrees.
   angle ← angle1 - angle2.
   newLeftArmPoint2 ← (leftArmPoint2 - point1 rotateBy: angle asFloat)
      + point1.
   newRightArmPoint2 ← (rightArmPoint2 - point1 rotateBy: angle asFloat)
      + point1.
   spline ← Spline new form: (Form new extent: 4 @ 4) black.
   spline add: leftArmPoint4; add: leftArmPoint3; add: newLeftArmPoint2; add: newPoint2; add: newRightArmPoint2; add: rightArmPoint3; add: rightArmPoint4.
   spline computeCurve.
   spline
      displayOn: Display
      at: 0 @ 0
      clippingBox: view insetDisplayBox
      rule: Form reverse
      mask: nil.
   spline
      displayOn: Display
      at: 0 @ 0
      clippingBox: view insetDisplayBox
      rule: Form reverse
      mask: nil.
   self
      replaceOldPoint: oldPoint2
      OfCollection: 2
      With: newPoint2.

```
self
    replaceOldPoint: oldPoint2
    OfCollection: 4
    With: newPoint2.
self
    replaceOldPoint: leftArmPoint2
    OfCollection: 2
    With: newLeftArmPoint2.
self
    replaceOldPoint: rightArmPoint2
    OfCollection: 4
    With: newRightArmPoint2 computeAndDragFeetAndLegsBy: aDisplacement
    | leftLegPoint1 leftLegPoint2 leftLegPoint3 leftFootPoint2 rightLegPoint1 rightLegPoint2
    rightLegPoint3 rightFootPoint2 newLeftLegPoint1 spline1 spline2 newLeftLegPoint2 newLeftLegPoint3
    newLeftFootPoint2 newRightLegPoint1 newRightLegPoint2 newRightLegPoint3 newRightFootPoint2
    newLeftFootPoint1 leftFootPoint1 newRightFootPoint1 rightFootPoint1 |
        newLeftLegPoint1 ← (leftLegPoint1 ← ((collectionOfLinearFits at: 6)
                            at: 1)
                            + (view displayBox origin + center)) + aDisplacement.
        newLeftLegPoint2 ← (leftLegPoint2 ← ((collectionOfLinearFits at: 6)
                            at: 2)
                            + (view displayBox origin + center)) + aDisplacement.
        newLeftLegPoint3 ← (leftLegPoint3 ← ((collectionOfLinearFits at: 6)
                            at: 3)
                            + (view displayBox origin + center)) + aDisplacement.
        newLeftFootPoint1 ← (leftFootPoint1 ← ((collectionOfLinearFits at: 7)
                            at: 1)
                            + (view displayBox origin + center)) + aDisplacement.
        newLeftFootPoint2 ← (leftFootPoint2 ← ((collectionOfLinearFits at: 7)
                            at: 2)
                            + (view displayBox origin + center)) + aDisplacement.
        newRightLegPoint1 ← (rightLegPoint1 ← ((collectionOfLinearFits at: 8)
                            at: 1)
                            + (view displayBox origin + center)) + aDisplacement.
        newRightLegPoint2 ← (rightLegPoint2 ← ((collectionOfLinearFits at: 8)
                            at: 2)
                            + (view displayBox origin + center)) + aDisplacement.
        newRightLegPoint3 ← (rightLegPoint3 ← ((collectionOfLinearFits at: 8)
                            at: 3)
                            + (view displayBox origin + center)) + aDisplacement.
        newRightFootPoint1 ← (rightFootPoint1 ← ((collectionOfLinearFits at: 9)
                            at: 1)
                            + (view displayBox origin + center)) + aDisplacement.
        newRightFootPoint2 ← (rightFootPoint2 ← ((collectionOfLinearFits at: 9)
                            at: 2)
                            + (view displayBox origin + center)) + aDisplacement.
    spline1 ← Spline new form: (Form new extent: 4 @ 4) black.
    spline2 ← Spline new form: (Form new extent: 4 @ 4) black.
    spline1 add: newLeftLegPoint1; add: newLeftLegPoint2; add: newLeftLegPoint3; add:
newLeftFootPoint2.
    spline2 add: newRightLegPoint1; add: newRightLegPoint2; add: newRightLegPoint3; add:
newRightFootPoint2.
    spline1 computeCurve.
    spline2 computeCurve.
``` spline1
    displayOn: Display
    at: 0 @ 0
    clippingBox: view insetDisplayBox
    rule: Form reverse
    mask: nil.
spline1
    displayOn: Display
    at: 0 @ 0
    clippingBox: view insetDisplayBox
    rule: Form reverse
    mask: nil.
spline2
    displayOn: Display
    at: 0 @ 0
    clippingBox: view insetDisplayBox
    rule: Form reverse
    mask: nil.
spline2
    displayOn: Display
    at: 0 @ 0
    clippingBox: view insetDisplayBox
    rule: Form reverse
    mask: nil.
self
    replaceOldPoint: leftLegPoint1
    OfCollection: 6
    With: newLeftLegPoint1.
self
    replaceOldPoint: leftLegPoint2
    OfCollection: 6
    With: newLeftLegPoint2.
self
    replaceOldPoint: leftLegPoint3
    OfCollection: 6
    With: newLeftLegPoint3.
self
    replaceOldPoint: leftFootPoint1
    OfCollection: 7
    With: newLeftFootPoint1.
.self
    replaceOldPoint: leftFootPoint2
    OfCollection: 7
    With: newLeftFootPoint2.
self
    replaceOldPoint: rightLegPoint1
    OfCollection: 8
    With: newRightLegPoint1.
self
    replaceOldPoint: rightLegPoint2
    OfCollection: 8
    With: newRightLegPoint2.
self
    replaceOldPoint: rightLegPoint3
    OfCollection: 8
    With: newRightLegPoint3.

self
    replaceOldPoint: rightFootPoint1
    OfCollection: 9
    With: newRightFootPoint1.
self
    replaceOldPoint: rightFootPoint2
    OfCollection: 9
    With: newRightFootPoint2.

headToNavelPoint1rubberBandOutlineUntil: aBlock
"Show an xor line from startPoint to the cursor point until aBlock
evaluates to true, then remove the line and answer the endPoint."

```
| spline point1 point3 point2 point4 currentPoint newPoint1 oldPoint newPoint3 oldPoint3 |
point2 ← ((collectionOfLinearFits at: 1)
            at: 2)
          + (view displayBox origin + center).
point3 ← ((collectionOfLinearFits at: 1)
            at: 3)
          + (view displayBox origin + center).
point4 ← ((collectionOfLinearFits at: 1)
            at: 4)
          + (view displayBox origin + center).
point1 ← ((collectionOfLinearFits at: 1)
            at: 1)
          + (view displayBox origin + center).
oldPoint ← point1.
oldPoint3 ← point3.
spline ← Spline new form: (Form new extent: 4 @ 4) black.
spline add: point1; add: point2; add: point3; add: point4.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 1)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint1 ← self
                        computePoint1OldPoint: oldPoint
                        cursorPoint: currentPoint
                        centeredAbout: point2.
            spline collectionOfPoints at: 1 put: newPoint1.
            "now compute point3"
            newPoint3 ← self
                        computeNewPoint3ofOldPoint3: oldPoint3
                        OldPoint1: oldPoint
```

```
                NewPoint1: newPoint1
                CenteredAbout: point2.
            spline collectionOfPoints at: 3 put: newPoint3.
            spline computeCurve.
            spline
                displayOn: Display
                at: 0 @ 0
                clippingBox: view insetDisplayBox
                rule: Form reverse
                mask: nil.
            "display"
            " now compute new shoulder points, and re display."
            self
                computeAndDisplayAffectedShouldersOldPoint1: oldPoint
                NewPoint1: newPoint1
                CenteredAbout: point2.
            oldPoint ← newPoint1.
            oldPoint3 ← newPoint3]].
    spline
        displayOn: Display
        at: 0 @ 0
        clippingBox: view insetDisplayBox
        rule: Form reverse
        mask: nil.
    "erase"
    self
        replaceOldPoint: point1
        OfCollection: 1
        With: newPoint1.
    self
        replaceOldPoint: point3
        OfCollection: 1
        With: newPoint3
``` headToNavelPoint2rubberBandOutlineUntil: aBlock headToNavelPoint3rubberBandOutlineUntil: aBlock
"Show an xor line from startPoint to the cursor point until aBlock
evaluates to true, then remove the line and answer the endPoint."

```
    | spline point1 point3 point2 point4 currentPoint newPoint3 oldPoint3 oldPoint2 newPoint2 |
    point2 ← ((collectionOfLinearFits at: 1)
                at: 2)
                + (view displayBox origin + center).
    point3 ← ((collectionOfLinearFits at: 1)
                at: 3)
                + (view displayBox origin + center).
    point4 ← ((collectionOfLinearFits at: 1)
                at: 4)
                + (view displayBox origin + center).
    point1 ← ((collectionOfLinearFits at: 1)
                at: 1)
                + (view displayBox origin + center).
    oldPoint2 ← point2.
    oldPoint3 ← point3.
    spline ← Spline new form: (Form new extent: 4 @ 4) black.
```

```
spline add: point1; add: point2; add: point3; add: point4.
spline computeCurve.
spline
    displayOn: Display
    at: 0 @ 0
    clippingBox: view insetDisplayBox
    rule: Form reverse
    mask: nil.
aBlock whileFalse: [((currentPoint ← sensor cursorPoint) = (spline collectionOfPoints at: 3)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint3 ← self
                    computePoint1OldPoint: oldPoint3
                    cursorPoint: currentPoint
                    centeredAbout: point1.
            spline collectionOfPoints at: 3 put: newPoint3.
            "now compute point3"
            newPoint2 ← self
                    computePoint1OldPoint: oldPoint2
                    cursorPoint: currentPoint
                    centeredAbout: point1.
            spline collectionOfPoints at: 2 put: newPoint2.
            spline computeCurve.
            spline
                displayOn: Display
                at: 0 @ 0
                clippingBox: view insetDisplayBox
                rule: Form reverse
                mask: nil.
            "display"
            " now compute new shoulder points, and re display."
            self
                computeAndDisplayAffectedShouldersOldPoint2: oldPoint2
                NewPoint2: newPoint2
                CenteredAbout: point1.
            oldPoint2 ← newPoint2.
            oldPoint3 ← newPoint3]].
spline
    displayOn: Display
    at: 0 @ 0
    clippingBox: view insetDisplayBox
    rule: Form reverse
    mask: nil.
"erase"
self
    replaceOldPoint: point3
    OfCollection: 1
    With: newPoint3.
self
```

```
        replaceOldPoint: point2
        OfCollection: 1
        With: newPoint2 headToNavelPoint4rubberBandOutlineUntil: aBlock
    "Show an xor line from startPoint to the cursor point until aBlock
    evaluates to true, then remove the line and answer the endPoint."

| spline point1 point3 point2 point4 currentPoint newPoint1 oldPoint1 |
    point4 ← ((collectionOfLinearFits at: 1)
                at: 1)
                + (view displayBox origin + center).
    point3 ← ((collectionOfLinearFits at: 1)
                at: 2)
                + (view displayBox origin + center).
    point2 ← ((collectionOfLinearFits at: 1)
                at: 3)
                + (view displayBox origin + center).
    point1 ← ((collectionOfLinearFits at: 1)
                at: 4)
                + (view displayBox origin + center).
    oldPoint1 ← point1.
    spline ← Spline new form: (Form new extent: 4 @ 4) black.
    spline add: point1; add: point2; add: point3; add: point4.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 1)
            ifFalse:
                [spline
                    displayOn: Display
                    at: 0 @ 0
                    clippingBox: view insetDisplayBox
                    rule: Form reverse
                    mask: nil.
                "erase"
                "make the point travel along an arc"
                newPoint1 ← self
                            computePoint1OldPoint: oldPoint1
                            cursorPoint: currentPoint
                            centeredAbout: point2.
                spline collectionOfPoints at: 1 put: newPoint1.
                self computeAndDragFeetAndLegsBy: (newPoint1-oldPoint1).
                spline computeCurve.
                spline
                    displayOn: Display
                    at: 0 @ 0
                    clippingBox: view insetDisplayBox
                    rule: Form reverse
                    mask: nil.
                oldPoint1 ← newPoint1]].
    spline
```

```
        displayOn: Display
        at: 0 @ 0
        clippingBox: view insetDisplayBox
        rule: Form reverse
        mask: nil.
    "erase"
    self
        replaceOldPoint: point1
        OfCollection: 1
        With: newPoint1 leftArmPoint2rubberBandOutlineUntil: aBlock
    "Show an xor line from startPoint to the cursor point until aBlock
     evaluates to true, then remove the line and answer the endPoint."

| spline point1 point3 point2 point4 currentPoint point5 dragGesturePoint dragLowerArmPoint
    newPoint3 dragUpperArmPoint newPoint2 newPoint4 newPoint5 |
        point1 ← ((collectionOfLinearFits at: 2)
                at: 1).
                + (view displayBox origin + center).
        point2 ← ((collectionOfLinearFits at: 2)
                at: 2)
                + (view displayBox origin + center).
        point3 ← ((collectionOfLinearFits at: 2)
                at: 3)
                + (view displayBox origin + center).
        point4 ← ((collectionOfLinearFits at: 2)
                at: 4)
                + (view displayBox origin + center).
        point5 ← ((collectionOfLinearFits at: 3)
                at: 2)
                + (view displayBox origin + center).
    spline ← Spline new form: (Form new extent: 4 @ 4) black.
    spline add: point1; add: point2; add: point3; add: point4; add: point5.
    dragGesturePoint ← point5 - point4.
    dragLowerArmPoint ← point4 - point3.
    dragUpperArmPoint ← point3 - point2.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 2)
            ifFalse:
                [spline
                    displayOn: Display
                    at: 0 @ 0
                    clippingBox: view insetDisplayBox
                    rule: Form reverse
                    mask: nil.
                "erase"
                "make the point travel along an arc"
                newPoint2 ← self
                        computePoint1OldPoint: point2
```

```
                cursorPoint: currentPoint
                centeredAbout: point1.
        spline collectionOfPoints at: 2 put: newPoint2.
        spline collectionOfPoints at: 3 put: (newPoint3 ← newPoint2 + dragUpperArmPoint).
        " drag the lower hand"
        spline collectionOfPoints at: 4 put: (newPoint4 ← newPoint3 + dragLowerArmPoint).
        "now drag the gesture"
        spline collectionOfPoints at: 5 put: (newPoint5 ← newPoint4 + dragGesturePoint).
        spline computeCurve.
        spline
            displayOn: Display
            at: 0 @ 0
            clippingBox: view insetDisplayBox
            rule: Form reverse
            mask: nil.
        "display"
        self
            replaceOldPoint: point2
            OfCollection: 2
            With: newPoint2.
        self
            replaceOldPoint: point3
            OfCollection: 2
            With: newPoint3.
        self
            replaceOldPoint: point4
            OfCollection: 2
            With: newPoint4.
        self
            replaceOldPoint: point4
            OfCollection: 3
            With: newPoint4.
        self
            replaceOldPoint: point5
            OfCollection: 3
            With: newPoint5.
        point2 ← newPoint2.
        point3 ← newPoint3.
        point5 ← newPoint5.
        point4 ← newPoint4]].
    spline
        displayOn: Display
        at: 0 @ 0
        clippingBox: view insetDisplayBox
        rule: Form reverse
        mask: nil
    "erase"

leftArmPoint3rubberBandOutlineUntil: aBlock
    "Show an xor line from startPoint to the cursor point until aBlock
    evaluates to true, then remove the line and answer the endPoint."

| spline point1 point3 point2 point4 currentPoint point5 dragGesturePoint newGesturePoint oldPoint4
    oldPoint3 oldPoint5 dragLowerArmPoint newPoint3 newLowerArmPoint |
        point1 ← ((collectionOfLinearFits at: 2)
                    at: 1)
```

```
                    + (view displayBox origin + center).
    point2 ← ((collectionOfLinearFits at: 2)
                at: 2)
                    + (view displayBox origin + center).
    point3 ← ((collectionOfLinearFits at: 2)
                at: 3)
                    + (view displayBox origin + center).
    point4 ← ((collectionOfLinearFits at: 2)
                at: 4)
                    + (view displayBox origin + center).
    point5 ← ((collectionOfLinearFits at: 3)
                at: 2)
                    + (view displayBox origin + center).
    oldPoint3 ← point3. oldPoint4 ← point4. oldPoint5 ← point5.
    spline ← Spline new form: (Form new extent: 4 @ 4) black.
    spline add: point1; add: point2; add: point3; add: point4; add: point5.
    dragGesturePoint ← point5 - point4. dragLowerArmPoint ← point4-point3.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 3)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint3 ← self
                        computePoint1OldPoint: oldPoint3
                        cursorPoint: currentPoint
                        centeredAbout: point2.
            spline collectionOfPoints at: 3 put: newPoint3.
" drag the lower hand"
spline collectionOfPoints at: 4 put: (newLowerArmPoint ← newPoint3 + dragLowerArmPoint).
            "now drag the gesture"
            spline collectionOfPoints at: 5 put: (newGesturePoint ← newLowerArmPoint +
dragGesturePoint).
            spline computeCurve.
            spline
                displayOn: Display
                at: 0 @ 0
                clippingBox: view insetDisplayBox
                rule: Form reverse
                mask: nil.
            "display"
            self
                replaceOldPoint: oldPoint3
                OfCollection: 2
                With: newPoint3.
```

```
        self
            replaceOldPoint: oldPoint4
            OfCollection: 2
            With: newLowerArmPoint. self
            replaceOldPoint: oldPoint4
            OfCollection: 3
            With: newLowerArmPoint.
        self
            replaceOldPoint: oldPoint5
            OfCollection: 3
            With: newGesturePoint.
        oldPoint3 ← newPoint3.
        oldPoint5 ← newGesturePoint. oldPoint4 ← newLowerArmPoint. ]].
    spline
        displayOn: Display
        at: 0 @ 0
        clippingBox: view insetDisplayBox
        rule: Form reverse
        mask: nil
    "erase"
``` leftArmPoint4rubberBandOutlineUntil: aBlock

"Show an xor line from startPoint to the cursor point until aBlock
evaluates to true, then remove the line and answer the endPoint."

```
    | spline point1 point3 point2 point4 currentPoint point5 dragGesturePoint newGesturePoint oldPoint4
newPoint4 |
    point1 ← ((collectionOfLinearFits at: 2)
                at: 1)
                + (view displayBox origin + center).
    point2 ← ((collectionOfLinearFits at: 2)
                at: 2)
                + (view displayBox origin + center).
    point3 ← ((collectionOfLinearFits at:2)
                at: 3)
                + (view displayBox origin + center).
    point4 ← ((collectionOfLinearFits at: 2)
                at: 4)
                + (view displayBox origin + center).
    point5 ← ((collectionOfLinearFits at: 3)
                at: 2)
                + (view displayBox origin + center).
    oldPoint4 ← point4.
    spline ← Spline new form: (Form new extent: 4 @ 4) black.
    spline add: point1; add: point2; add: point3; add: point4; add: point5.
    dragGesturePoint ← point5 - point4.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 4)
            ifFalse:
                [spline
```

```
            displayOn: Display
            at: 0 @ 0
            clippingBox: view insetDisplayBox
            rule: Form reverse
            mask: nil.
        "erase"
        "make the point travel along an arc"
        newPoint4 ← self
                    computePoint1OldPoint: oldPoint4
                    cursorPoint: currentPoint
                    centeredAbout: point3.
        spline collectionOfPoints at: 4 put: newPoint4.
        "now drag the gesture"
        spline collectionOfPoints at: 5 put: (newGesturePoint ← newPoint4 + dragGesturePoint).
        spline computeCurve.
        spline
            displayOn: Display
            at: 0 @ 0
            clippingBox: view insetDisplayBox
            rule: Form reverse
            mask: nil.
        "display"
        self
            replaceOldPoint: oldPoint4
            OfCollection: 2
            With: newPoint4.
        self
            replaceOldPoint: oldPoint4
            OfCollection: 3
            With: newPoint4.
        self
            replaceOldPoint: point5
            OfCollection: 3
            With: newGesturePoint.
        oldPoint4 ← newPoint4.
        point5 ← newGesturePoint]].
    spline
        displayOn: Display
        at: 0 @ 0
        clippingBox: view insetDisplayBox
        rule: Form reverse
        mask: nil
    "erase"

leftFootPoint1rubberBandOutlineUntil: aBlock
    self leftLegPoint3rubberBandOutlineUntil: aBlock leftFootPoint2rubberBandOutlineUntil: aBlock
    "Show an xor line from startPoint to the cursor point until aBlock
    evaluates to true, then remove the line and answer the endPoint."

| spline point1 point2 currentPoint oldPoint1 newPoint1 | point2 ← ((collectionOfLinearFits at: 6)
                at: 3)
            + (view displayBox origin + center).
```

```
point1 ← ((collectionOfLinearFits at: 7)
            at: 2)
        + (view displayBox origin + center).
oldPoint1 ← point1.
spline ← Spline new form: (Form new extent: 4 @ 4) black.
spline add: point1; add: point2.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 1)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint1 ← self
                        computePoint1OldPoint: oldPoint1
                        cursorPoint: currentPoint
                        centeredAbout: point2.
            spline collectionOfPoints at: 1 put: newPoint1.
            spline computeCurve.
            spline
                displayOn: Display
                at: 0 @ 0
                clippingBox: view insetDisplayBox
                rule: Form reverse
                mask: nil.
            "display"
            self
                replaceOldPoint: oldPoint1
                OfCollection: 7
                With: newPoint1.
            oldPoint1← newPoint1]].
spline
    displayOn: Display
    at: 0 @ 0
    clippingBox: view insetDisplayBox
    rule: Form reverse
    mask: nil
"erase"
``` leftGesturePoint1rubberBandOutlineUntil: aBlock self leftArmPoint4rubberBandOutlineUntil: aBlock leftGesturePoint2rubberBandOutlineUntil: aBlock
"Show an xor line from startPoint to the cursor point until aBlock
evaluates to true, then remove the line and answer the endPoint."

| spline point1 point2 currentPoint oldPoint1 newPoint1 | point2 ← ((collectionOfLinearFits at: 2)
          at: 4)
        + (view displayBox origin + center).
point1 ← ((collectionOfLinearFits at: 3)
          at: 2)
        + (view displayBox origin + center).
oldPoint1 ← point1.
spline ← Spline new form: (Form new extent: 4 @ 4) black.
spline add: point1; add: point2.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 1)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint1 ← self
                        computePoint1OldPoint: oldPoint1
                        cursorPoint: currentPoint
                        centeredAbout: point2.
            spline collectionOfPoints at: 1 put: newPoint1.
            spline computeCurve.
            spline
                displayOn: Display
                at: 0 @ 0
                clippingBox: view insetDisplayBox
                rule: Form reverse
                mask: nil.
            "display"
            self
                replaceOldPoint: oldPoint1
                OfCollection: 3
                With: newPoint1.
            oldPoint1← newPoint1]].
spline
    displayOn: Display
    at: 0 @ 0
    clippingBox: view insetDisplayBox
    rule: Form reverse
    mask: nil
"erase"

leftLegPoint1rubberBandOutlineUntil: aBlock self headToNavelPoint1rubberBandOutlineUntil: aBlock leftLegPoint2rubberBandOutlineUntil: aBlock
```
| point1 point2 point3 point4 dragFootPoint dragLegPoint spline currentPoint newPoint2 newLegPoint newFootPoint |
    point1 ← ((collectionOfLinearFits at: 6)
            at: 1)
            + (view displayBox origin + center).
    point2 ← ((collectionOfLinearFits at: 6)
            at: 2)
            + (view displayBox origin + center).
    point3 ← ((collectionOfLinearFits at: 6)
            at: 3)
            + (view displayBox origin + center).
    point4 ← ((collectionOfLinearFits at: 7)
            at: 2)
            + (view displayBox origin + center).
    dragFootPoint ← (point4 - point3) .
    dragLegPoint ← (point3 - point2) .
    spline ← Spline new form: (Form new extent: 4 @ 4) black.
    spline add: point1; add: point2; add: point3; add: point4.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 2)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint2 ← self
                    computePoint1OldPoint: point2
                    cursorPoint: currentPoint
                    centeredAbout: point1.
            spline collectionOfPoints at: 2 put: newPoint2.
            " drag the lower leg"
            spline collectionOfPoints at: 3 put: (newLegPoint ← newPoint2 + dragLegPoint).
            "now drag the foot"
            spline collectionOfPoints at: 4 put: (newFootPoint ← newLegPoint + dragFootPoint).
            spline computeCurve.
            spline
                displayOn: Display
                at: 0 @ 0
                clippingBox: view insetDisplayBox
                rule: Form reverse
                mask: nil.
            "display"
            self
```

```
                    replaceOldPoint: point2
                    OfCollection: 6
                    With: newPoint2.
                self
                    replaceOldPoint: point3
                    OfCollection: 6
                    With: newLegPoint.
                self
                    replaceOldPoint: point3
                    OfCollection: 7
                    With: newLegPoint.
                self
                    replaceOldPoint: point4
                    OfCollection: 7
                    With: newFootPoint.
                point2 ← newPoint2.
                point3 ← newLegPoint.
                point4 ← newFootPoint]].
    spline
        displayOn: Display
        at: 0 @ 0
        clippingBox: view insetDisplayBox
        rule: Form reverse
        mask: nil
"erase"
``` leftLegPoint3rubberBandOutlineUntil: aBlock

"Show an xor line from startPoint to the cursor point until aBlock
    evaluates to true, then remove the line and answer the endPoint."

```
| spline point1 point3 point2 point4 currentPoint dragFootPoint newPoint3 newFootPoint |
point1 ← ((collectionOfLinearFits at: 6)
            at: 1)
            + (view displayBox origin + center).
point2 ← ((collectionOfLinearFits at: 6)
            at: 2)
            + (view displayBox origin + center).
point3 ← ((collectionOfLinearFits at: 6)
            at: 3)
            + (view displayBox origin + center).
point4 ← ((collectionOfLinearFits at: 7)
            at: 2)
            + (view displayBox origin + center).
spline ← Spline new form: (Form new extent: 4 @ 4) black.
spline add: point1; add: point2; add: point3; add: point4.
dragFootPoint ← point4 - point3.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 3)
        ifFalse:
            [spline
```

```
        displayOn: Display
        at: 0 @ 0
        clippingBox: view insetDisplayBox
        rule: Form reverse
        mask: nil.
    "erase"
    "make the point travel along an arc"
    newPoint3 ← self
                computePoint1OldPoint: point3
                cursorPoint: currentPoint
                centeredAbout: point2.
    spline collectionOfPoints at: 3 put: newPoint3.
    "now drag the gesture"
    spline collectionOfPoints at: 4 put: (newFootPoint ← newPoint3 + dragFootPoint).
    spline computeCurve.
    spline
        displayOn: Display
        at: 0 @ 0
        clippingBox: view insetDisplayBox
        rule: Form reverse
        mask: nil.
    "display"
    self
        replaceOldPoint: point3
        OfCollection: 6
        With: newPoint3.
    self
        replaceOldPoint: point3
        OfCollection: 7
        With: newPoint3.
    self
        replaceOldPoint: point4
        OfCollection: 7
        With: newFootPoint.
    point3 ← newPoint3.
    point4 ← newFootPoint]].
spline
    displayOn: Display
    at: 0 @ 0
    clippingBox: view insetDisplayBox
    rule: Form reverse
    mask: nil
"erase"
``` rightArmPoint2rubberBandOutlineUntil: aBlock
"Show an xor line from startPoint to the cursor point until aBlock
    evaluates to true, then remove the line and answer the endPoint."

```
| spline point1 point3 point2 point4 currentPoint point5 dragGesturePoint dragLowerArmPoint
newPoint3 dragUpperArmPoint newPoint2 newPoint4 newPoint5 |
    point1 ← ((collectionOfLinearFits at: 4)
            at: 1)
            + (view displayBox origin + center).
    point2 ← ((collectionOfLinearFits at: 4)
            at: 2)
            + (view displayBox origin + center).
```

```
point3 ← ((collectionOfLinearFits at: 4)
        at: 3)
        + (view displayBox origin + center).
point4 ← ((collectionOfLinearFits at: 4)
        at: 4)
        + (view displayBox origin + center).
point5 ← ((collectionOfLinearFits at: 5)
        at: 2)
        + (view displayBox origin + center).
spline ← Spline new form: (Form new extent: 4 @ 4) black.
spline add: point1; add: point2; add: point3; add: point4; add: point5.
dragGesturePoint ← point5 - point4.
dragLowerArmPoint ← point4 - point3.
dragUpperArmPoint ← point3 - point2.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 2)
    ifFalse:
        [spline
            displayOn: Display
            at: 0 @ 0
            clippingBox: view insetDisplayBox
            rule: Form reverse
            mask: nil.
        "erase"
        "make the point travel along an arc"
        newPoint2 ← self
                    computePoint1OldPoint: point2
                    cursorPoint: currentPoint
                    centeredAbout: point1.
        spline collectionOfPoints at: 2 put: newPoint2.
        spline collectionOfPoints at: 3 put: (newPoint3 ← newPoint2 + dragUpperArmPoint).
        " drag the lower hand"
        spline collectionOfPoints at: 4 put: (newPoint4 ← newPoint3 + dragLowerArmPoint).
        "now drag the gesture"
        spline collectionOfPoints at: 5 put: (newPoint5 ← newPoint4 + dragGesturePoint).
        spline computeCurve.
        spline
            displayOn: Display
            at: 0 @ 0
            clippingBox: view insetDisplayBox
            rule: Form reverse
            mask: nil.
        "display"
        self
            replaceOldPoint: point2
            OfCollection: 4
            With: newPoint2.
        self
            replaceOldPoint: point3
            OfCollection: 4
```

```
                With: newPoint3.
            self
                replaceOldPoint: point4
                OfCollection: 4
                With: newPoint4.
            self
                replaceOldPoint: point4
                OfCollection: 5
                With: newPoint4.
            self
                replaceOldPoint: point5
                OfCollection: 5
                With: newPoint5.
            point2 ← newPoint2.
            point3 ← newPoint3.
            point5 ← newPoint5.
            point4 ← newPoint4]].
    spline
        displayOn: Display
        at: 0 @ 0
        clippingBox: view insetDisplayBox
        rule: Form reverse
        mask: nil
    "erase"
``` rightArmPoint3rubberBandOutlineUntil: aBlock
"Show an xor line from startPoint to the cursor point until aBlock
evaluates to true, then remove the line and answer the endPoint."

```
| spline point1 point3 point2 point4 currentPoint point5 dragGesturePoint newGesturePoint oldPoint4
oldPoint3 oldPoint5 dragLowerArmPoint newPoint3 newLowerArmPoint |
    point1 ← ((collectionOfLinearFits at: 4)
            at: 1)
            + (view displayBox origin + center).
    point2 ← ((collectionOfLinearFits at: 4)
            at: 2)
            + (view displayBox origin + center).
    point3 ← ((collectionOfLinearFits at: 4)
            at: 3)
            + (view displayBox origin + center).
    point4 ← ((collectionOfLinearFits at: 4)
            at: 4)
            + (view displayBox origin + center).
    point5 ← ((collectionOfLinearFits at: 5)
            at: 2)
            + (view displayBox origin + center).
    oldPoint3 ← point3. oldPoint4 ← point4. oldPoint5 ← point5.
    spline ← Spline new form: (Form new extent: 4 @ 4) black.
    spline add: point1; add: point2; add: point3; add: point4; add: point5.
    dragGesturePoint ← point5 - point4. dragLowerArmPoint ← point4-point3.
    spline computeCurve.
    spline
        displayOn: Display
        at: 0 @ 0
        clippingBox: view insetDisplayBox
        rule: Form reverse
```

```
            mask: nil.
    aBlock whileFalse: [(currentPoint ← sensor cursorPoint) = (spline collectionOfPoints at: 3)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint3 ← self
                        computePoint1OldPoint: oldPoint3
                        cursorPoint: currentPoint
                        centeredAbout: point2.
            spline collectionOfPoints at: 3 put: newPoint3.
" drag the lower hand"
spline collectionOfPoints at: 4 put: (newLowerArmPoint ← newPoint3 + dragLowerArmPoint).
            "now drag the gesture"
            spline collectionOfPoints at: 5 put: (newGesturePoint ← newLowerArmPoint +
 dragGesturePoint).
            spline computeCurve.
            spline
                displayOn: Display
                at: 0 @ 0
                clippingBox: view insetDisplayBox
                rule: Form reverse
                mask: nil.
            "display"
            self
                replaceOldPoint: oldPoint3
                OfCollection: 4
                With: newPoint3.
            self
                replaceOldPoint: oldPoint4
                OfCollection: 4
                With: newLowerArmPoint. self
                replaceOldPoint: oldPoint4
                OfCollection: 5
                With: newLowerArmPoint.
            self
                replaceOldPoint: oldPoint5
                OfCollection: 5
                With: newGesturePoint.
            oldPoint3 ← newPoint3.
            oldPoint5 ← newGesturePoint. oldPoint4 ← newLowerArmPoint. ]].
    spline
        displayOn: Display
        at: 0 @ 0
        clippingBox: view insetDisplayBox
        rule: Form reverse
        mask: nil
    "erase"

rightArmPoint4rubberBandOutlineUntil: aBlock
    "Show an xor line from startPoint to the cursor point until aBlock
``` evaluates to true, then remove the line and answer the endPoint."

| spline point1 point3 point2 point4 currentPoint point5 dragGesturePoint newGesturePoint oldPoint4 newPoint4 |
    point1 ← ((collectionOfLinearFits at: 4)
        at: 1)
        + (view displayBox origin + center).
    point2 ← ((collectionOfLinearFits at: 4)
        at: 2)
        + (view displayBox origin + center).
    point3 ← ((collectionOfLinearFits at:4)
        at: 3)
        + (view displayBox origin + center).
    point4 ← ((collectionOfLinearFits at: 4)
        at: 4)
        + (view displayBox origin + center).
    point5 ← ((collectionOfLinearFits at: 5)
        at: 2)
        + (view displayBox origin + center).
    oldPoint4 ← point4.
    spline ← Spline new form: (Form new extent: 4 @ 4) black.
    spline add: point1; add: point2; add: point3; add: point4; add: point5.
    dragGesturePoint ← point5 - point4.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 4)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint4 ← self
                computePoint1OldPoint: oldPoint4
                cursorPoint: currentPoint
                centeredAbout: point3.
            spline collectionOfPoints at: 4 put: newPoint4.
            "now drag the gesture"
            spline collectionOfPoints at: 5 put: (newGesturePoint ← newPoint4 + dragGesturePoint).
            spline computeCurve.
            spline
                displayOn: Display
                at: 0 @ 0
                clippingBox: view insetDisplayBox
                rule: Form reverse
                mask: nil.
            "display"
            self

```
                replaceOldPoint: oldPoint4
                OfCollection: 4
                With: newPoint4.
            self
                replaceOldPoint: oldPoint4
                OfCollection: 5
                With: newPoint4.
            self
                replaceOldPoint: point5
                OfCollection: 5
                With: newGesturePoint.
            oldPoint4 ← newPoint4.
            point5 ← newGesturePoint]].
    spline
        displayOn: Display
        at: 0 @ 0
        clippingBox: view insetDisplayBox
        rule: Form reverse
        mask: nil
    "erase"

rightFootPoint1rubberBandOutlineUntil: aBlock
    self rightLegPoint3rubberBandOutlineUntil: aBlock rightFootPoint2rubberBandOutlineUntil: aBlock
    "Show an xor line from startPoint to the cursor point until aBlock
    evaluates to true, then remove the line and answer the endPoint."

| spline point1 point2 currentPoint oldPoint1 newPoint1 | point2 ← ((collectionOfLinearFits at: 8)
                at: 3)
                + (view displayBox origin + center).
    point1 ← ((collectionOfLinearFits at: 9)
                at: 2)
                + (view displayBox origin + center).
    oldPoint1 ← point1.
    spline ← Spline new form: (Form new extent: 4 @ 4) black.
    spline add: point1; add: point2.
    spline computeCurve.
    spline
        displayOn: Display
        at: 0 @ 0
        clippingBox: view insetDisplayBox
        rule: Form reverse
        mask: nil.
    aBlock whileFalse: [((currentPoint ← sensor cursorPoint) = (spline collectionOfPoints at: 1)
            ifFalse:
                [spline
                    displayOn: Display
                    at: 0 @ 0
                    clippingBox: view insetDisplayBox
                    rule: Form reverse
                    mask: nil.
                "erase"
                "make the point travel along an arc"
```

```
                newPoint1 ← self
                        computePoint1OldPoint: oldPoint1
                        cursorPoint: currentPoint
                        centeredAbout: point2.
                spline collectionOfPoints at: 1 put: newPoint1.
                spline computeCurve.
                spline
                    displayOn: Display
                    at: 0 @ 0
                    clippingBox: view insetDisplayBox
                    rule: Form reverse
                    mask: nil.
                "display"
                self
                    replaceOldPoint: oldPoint1
                    OfCollection: 9
                    With: newPoint1.
                oldPoint1 ← newPoint1]].
    spline
        displayOn: Display
        at: 0 @ 0
        clippingBox: view insetDisplayBox
        rule: Form reverse
        mask: nil
    "erase"
``` rightGesturePoint1rubberBandOutlineUntil: aBlock

```
    self rightArmPoint4rubberBandOutlineUntil: aBlock
``` rightGesturePoint2rubberBandOutlineUntil: aBlock
```
    "Show an xor line from startPoint to the cursor point until aBlock
    evaluates to true, then remove the line and answer the endPoint."

| spline point1 point2 currentPoint oldPoint1 newPoint1 | point2 ← ((collectionOfLinearFits at: 4)
                at: 4)
                + (view displayBox origin + center).
    point1 ← ((collectionOfLinearFits at: 5)
                at: 2)
                + (view displayBox origin + center).
    oldPoint1 ← point1.
    spline ← Spline new form: (Form new extent: 4 @ 4) black.
    spline add: point1; add: point2.
    spline computeCurve.
    spline
        displayOn: Display
        at: 0 @ 0
        clippingBox: view insetDisplayBox
        rule: Form reverse
        mask: nil.
    aBlock whileFalse: [(currentPoint ← sensor cursorPoint) = (spline collectionOfPoints at: 1)
            ifFalse:
                [spline
                    displayOn: Display
```

```
            at: 0 @ 0
            clippingBox: view insetDisplayBox
            rule: Form reverse
            mask: nil.
        "erase"
        "make the point travel along an arc"
        newPoint1 ← self
                computePoint1OldPoint: oldPoint1
                cursorPoint: currentPoint
                centeredAbout: point2.
        spline collectionOfPoints at: 1 put: newPoint1.
        spline computeCurve.
        spline
            displayOn: Display
            at: 0 @ 0
            clippingBox: view insetDisplayBox
            rule: Form reverse
            mask: nil.
        "display"
        self
            replaceOldPoint: oldPoint1
            OfCollection: 5
            With: newPoint1.
        oldPoint1 ← newPoint1]].
spline
    displayOn: Display
    at: 0 @ 0
    clippingBox: view insetDisplayBox
    rule: Form reverse
    mask: nil
"erase"

rightLegPoint1rubberBandOutlineUntil: aBlock
    self headToNavelPoint1rubberBandOutlineUntil: aBlock rightLegPoint2rubberBandOutlineUntil: aBlock
    | point1 point2 point3 point4 dragFootPoint dragLegPoint spline currentPoint newPoint2 newLegPoint
newFootPoint |
    point1 ← ((collectionOfLinearFits at: 8)
            at: 1)
            + (view displayBox origin + center).
    point2 ← ((collectionOfLinearFits at: 8)
            at: 2)
            + (view displayBox origin + center).
    point3 ← ((collectionOfLinearFits at: 8)
            at: 3)
            + (view displayBox origin + center).
    point4 ← ((collectionOfLinearFits at: 9)
            at: 2)
            + (view displayBox origin + center).
    dragFootPoint ← (point4 - point3) .
    dragLegPoint ← (point3 - point2) .
    spline ← Spline new form: (Form new extent: 4 @ 4) black.
    spline add: point1; add: point2; add: point3; add: point4.
    spline computeCurve.
    spline
```

```
        displayOn: Display
        at: 0 @ 0
        clippingBox: view insetDisplayBox
        rule: Form reverse
        mask: nil.
aBlock whileFalse: [(currentPoint ← sensor cursorPoint) = (spline collectionOfPoints at: 2)
    ifFalse:
        [spline
            displayOn: Display
            at: 0 @ 0
            clippingBox: view insetDisplayBox
            rule: Form reverse
            mask: nil.
        "erase"
        "make the point travel along an arc"
        newPoint2 ← self
                    computePoint1OldPoint: point2
                    cursorPoint: currentPoint
                    centeredAbout: point1.
        spline collectionOfPoints at: 2 put: newPoint2.
        " drag the lower leg"
        spline collectionOfPoints at: 3 put: (newLegPoint ← newPoint2 + dragLegPoint).
        "now drag the foot"
        spline collectionOfPoints at: 4 put: (newFootPoint ← newLegPoint + dragFootPoint).
        spline computeCurve.
        spline
            displayOn: Display
            at: 0 @ 0
            clippingBox: view insetDisplayBox
            rule: Form reverse
            mask: nil.
        "display"
        self
            replaceOldPoint: point2
            OfCollection: 8
            With: newPoint2.
        self
            replaceOldPoint: point3
            OfCollection: 8
            With: newLegPoint.
        self
            replaceOldPoint: point3
            OfCollection: 9
            With: newLegPoint.
        self
            replaceOldPoint: point4
            OfCollection: 9
            With: newFootPoint.
        point2 ← newPoint2.
        point3 ← newLegPoint.
        point4 ← newFootPoint]].
spline
    displayOn: Display
    at: 0 @ 0
    clippingBox: view insetDisplayBox
    rule: Form reverse
``` mask: nil
"erase"

rightLegPoint3rubberBandOutlineUntil: aBlock
"Show an xor line from startPoint to the cursor point until aBlock
 evaluates to true, then remove the line and answer the endPoint."

| spline point1 point3 point2 point4 currentPoint dragFootPoint newPoint3 newFootPoint |
point1 ← ((collectionOfLinearFits at: 8)
        at: 1)
        + (view displayBox origin + center).
point2 ← ((collectionOfLinearFits at: 8)
        at: 2)
        + (view displayBox origin + center).
point3 ← ((collectionOfLinearFits at: 8)
        at: 3)
        + (view displayBox origin + center).
point4 ← ((collectionOfLinearFits at: 9)
        at: 2)
        + (view displayBox origin + center).
spline ← Spline new form: (Form new extent: 4 @ 4) black.
spline add: point1; add: point2; add: point3; add: point4.
dragFootPoint ← point4 - point3.
spline computeCurve.
spline
    displayOn: Display
    at: 0 @ 0
    clippingBox: view insetDisplayBox
    rule: Form reverse
    mask: nil.
aBlock whileFalse: [(currentPoint ← sensor cursorPoint) = (spline collectionOfPoints at: 3)
        ifFalse:
            [spline
                displayOn: Display
                at: 0 @ 0
                clippingBox: view insetDisplayBox
                rule: Form reverse
                mask: nil.
            "erase"
            "make the point travel along an arc"
            newPoint3 ← self
                        computePoint1OldPoint: point3
                        cursorPoint: currentPoint
                        centeredAbout: point2.
            spline collectionOfPoints at: 3 put: newPoint3.
            "now drag the gesture"
            spline collectionOfPoints at: 4 put: (newFootPoint ← newPoint3 + dragFootPoint).
            spline computeCurve.
            spline
                displayOn: Display
                at: 0 @ 0
                clippingBox: view insetDisplayBox
                rule: Form reverse
                mask: nil.
            "display"
            self replaceOldPoint: point3
                OfCollection: 8
                With: newPoint3.
            self
                replaceOldPoint: point3
                OfCollection: 9
                With: newPoint3.
            self
                replaceOldPoint: point4
                OfCollection: 9
                With: newFootPoint.
            point3 ← newPoint3.
            point4 ← newFootPoint]].
    spline
        displayOn: Display
        at: 0 @ 0
        clippingBox: view insetDisplayBox
        rule: Form reverse
        mask: nil
    "erase"

DeityDatabaseEditor methodsFor: reOutlining-private computeNewPoint3ofOldPoint3: oldPoint3 OldPoint1: oldPoint1 NewPoint1: newPoint1
CenteredAbout: point2
    | constant newPoint3X newPoint3Y |
    constant ← ((oldPoint3 x asFloat - point2 x asFloat) squared + (oldPoint3 y asFloat - point2 y asFloat)
    squared / ((newPoint1 x asFloat - point2 x asFloat) squared + (newPoint1 y asFloat - point2 y asFloat)
    squared)) asFloat sqrt.
        newPoint3X ← point2 x asFloat - (newPoint1 x asFloat - point2 x asFloat * constant).
        newPoint3Y ← point2 y asFloat - (newPoint1 y asFloat - point2 y asFloat * constant).
        ↑newPoint3X @ newPoint3Y computePoint1OldPoint: anOldPoint cursorPoint: aCursorPoint centeredAbout: aCenterPoint
    | newPoint1X constant newPoint1Y newPoint |
    constant ← ((anOldPoint x asFloat - aCenterPoint x asFloat) squared + (anOldPoint y asFloat -
    aCenterPoint y asFloat) squared / ((aCursorPoint x asFloat - aCenterPoint x asFloat) squared +
    (aCursorPoint y asFloat - aCenterPoint y asFloat) squared)) asFloat sqrt.
        newPoint1X ← aCenterPoint x asFloat + (aCursorPoint x asFloat - aCenterPoint x asFloat * constant).
        newPoint1Y ← aCenterPoint y asFloat + (aCursorPoint y asFloat - aCenterPoint y asFloat * constant).
    Sensor leftShiftDown ifTrue: [↑anOldPoint].
    newPoint ← newPoint1X @ newPoint1Y.
    Transcript show: (self
            returnAngleForPoint1: newPoint
            centeredAbout: aCenterPoint
            point3: anOldPoint) printString; cr; cr.
    ↑newPoint computePoint3OldPoint: oldPoint newPoint1: newPoint1 centeredAbout: point2
    | constant newPoint3X newPoint3Y |
    constant ← ((oldPoint x asFloat - point2 x asFloat) squared + (oldPoint y asFloat - point2 y asFloat)
    squared / ((newPoint1 x asFloat - point2 x asFloat) squared + (newPoint1 y asFloat - point2 y asFloat)
    squared)) asFloat sqrt.
        newPoint3X ← point2 x asFloat - (newPoint1 x asFloat - point2 x asFloat * constant).
        newPoint3Y ← point2 y asFloat - (newPoint1 y asFloat - point2 y asFloat * constant).
        ↑(newPoint3X @ newPoint3Y)

DeityDatabaseEditor methodsFor: replacing points replaceOldPoint: oldPoint OfCollection: aCollectionIndex With: newPoint
    | newCollection |
    newPoint isNil
        ifFalse:
            [
            newCollection ← collectionOfLinearFits at: aCollectionIndex.
            newCollection replace: ( oldPoint - center - view displayBox origin )with: (newPoint - center - view displayBox origin).
            collectionOfLinearFits replace: (collectionOfLinearFits at: aCollectionIndex) with: newCollection.
            ]

replaceOldPointInCollectionOfLinearFitsWith: newPoint
    | pointInQuestion newCollection |
    newPoint isNil
        ifFalse:
            [pointInQuestion ← diagramInformation hitPoint.
            newCollection ← diagramInformation selectedCollection.
            newCollection replace: pointInQuestion with: newPoint - center - view displayBox origin.
            collectionOfLinearFits replace: diagramInformation selectedCollection with: newCollection.
            self checkForDependencies.
            ]

DeityDatabaseEditor methodsFor: displaying concatenate: firstCollection and: secondCollection and: thirdCollection and: fourthCollection and: fifthCollection
    | temp |
    temp ← OrderedCollection new.
    temp addAllLast: firstCollection.
    temp removeLast.
    temp addAllLast: secondCollection.
    thirdCollection isNil
        ifTrue: [↑temp]
        ifFalse:
            [temp removeLast.
            temp addAllLast: thirdCollection.
            fourthCollection isNil
                ifTrue: [↑temp]
                ifFalse:
                    [temp removeLast.
                    temp addAllLast: fourthCollection.
                    fifthCollection isNil
                        ifTrue: [↑temp]
                        ifFalse:
                            [temp removeLast.
                            ↑temp addAllLast: fifthCollection]]]

displayAsSplineWithHandsAndGesturesInOneMotionAt: aPoint On: aMedium
    " this method assumes that gesture are extensions of the arms"

| displaySequence displayForms tempSpline |
    displaySequence ← OrderedCollection new.

tempSpline ← Spline new.
displaySequence add: (collectionOfLinearFits at: 1); add: (self
        concatenate: (collectionOfLinearFits at: 2)
        and: (collectionOfLinearFits at: 3)
        and: nil
        and: nil
        and: nil); add: (self
        concatenate: (collectionOfLinearFits at: 4)
        and: (collectionOfLinearFits at: 5)
        and: nil
        and: nil
        and: nil); add: (self
        concatenate: (collectionOfLinearFits at: 6)
        and: (collectionOfLinearFits at: 7)
        and: nil
        and: nil
        and: nil); add: (self
        concatenate: (collectionOfLinearFits at: 8)
        and: (collectionOfLinearFits at: 9)
        and: nil
        and: nil
        and: nil).
displayForms ← OrderedCollection new.
" displayForms is a collection of forms to be drawn for the splines"

displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
1 to: displaySequence size do:
    [:index |
    tempSpline form: (displayForms at: index).
    tempSpline collectionOfPoints: (displaySequence at: index).
    tempSpline computeCurve.
    tempSpline displayOn: aMedium at: aPoint]

displayAsSplineWithHandsAndGesturesSeparated2At: aPoint On: aMedium left: leftGestureSeparate right: rightGestureSeparate
" this method assumes that gesture are not extensions of the arms"

| displaySequence displayForms tempSpline leftGestureCollection rightGestureCollection |
displaySequence ← OrderedCollection new.
tempSpline ← Spline new.
leftGestureCollection ← self obtainLeftGestureCollection: leftGestureSeparate.
rightGestureCollection ← self obtainRightGestureCollection: rightGestureSeparate.
displaySequence add: (collectionOfLinearFits at: 1); add: (self
        concatenate: (collectionOfLinearFits at: 2)
        and: leftGestureCollection
        and: nil
        and: nil
        and: nil); add: (self
        concatenate: (collectionOfLinearFits at: 4)
        and: rightGestureCollection
        and: nil
        and: nil
        and: nil); add: (self
        concatenate: (collectionOfLinearFits at: 6)

```
                and: (collectionOfLinearFits at: 7)
                and: nil
                and: nil
                and: nil); add: (self
                    concatenate: (collectionOfLinearFits at: 8)
                and: (collectionOfLinearFits at: 9)
                and: nil
                and: nil
                and: nil).
    displayForms ← OrderedCollection new.
    " displayForms is a collection of forms to be drawn for the splines"
    displayForms add: (Form new extent: 4 @ 4) black; add: (Form new extent: 4 @ 4) gray; add: (Form
new extent: 4 @ 4) gray; add: (Form new extent: 4 @ 4) gray; add: (Form new extent: 4 @ 4) gray; add:
(Form new extent: 4 @ 4) darkGray; add: (Form new extent: 4 @ 4) darkGray; add: (Form new extent: 4
@ 4) darkGray; add: (Form new extent: 4 @ 4) darkGray.
    1 to: displaySequence size do:
        [:index |
        tempSpline form: (displayForms at: index).
        tempSpline collectionOfPoints: (displaySequence at: index).
        tempSpline computeCurve.
        tempSpline displayOn: aMedium at: aPoint]

displayAsSplineWithHandsAndGesturesSeparatedAt: aPoint On: aMedium left:
leftGestureSeparate right: rightGestureSeparate
    " this method assumes that gesture are not extensions of the arms"

| displaySequence displayForms tempSpline firstPoint thirdPoint secondPoint leftGestureCollection
fourthPoint rightGestureCollection |
    leftGestureCollection ← OrderedCollection new.
    rightGestureCollection ← OrderedCollection new.
    displaySequence ← OrderedCollection new.
    tempSpline ← Spline new.
    leftGestureSeparate
        ifTrue:
            [firstPoint ← (collectionOfLinearFits at: 3)
                    at: 1.
            secondPoint ← (collectionOfLinearFits at: 3)
                    at: 1.
            " make the second point the same so that spline appears strongly
            hinged at the left arm"
            fourthPoint ← (collectionOfLinearFits at: 3)
                    at: 2.
            thirdPoint ← firstPoint + fourthPoint / 2 + (-20 @ 0).
            leftGestureCollection add: firstPoint; add: secondPoint; "add: thirdPoint; "add: fourthPoint]
        ifFalse: [leftGestureCollection ← collectionOfLinearFits at: 3].
    rightGestureSeparate
        ifTrue:
            [self halt. firstPoint ← (collectionOfLinearFits at: 5)
                    at: 1.
            secondPoint ← (collectionOfLinearFits at: 5)
                    at: 1.
            " make the second point the same so that spline appears strongly
            hinged at the left arm"
            fourthPoint ← (collectionOfLinearFits at: 5)
                    at: 2.
            thirdPoint ← firstPoint + fourthPoint / 2 + (20 @ 0).
```

```
            rightGestureCollection add: firstPoint; add: secondPoint;" add: thirdPoint; "add: fourthPoint]
        ifFalse: [rightGestureCollection ← collectionOfLinearFits at: 5].
    displaySequence add: (collectionOfLinearFits at: 1); add: (self
        concatenate: (collectionOfLinearFits at: 2)
        and: leftGestureCollection
        and: nil
        and: nil
        and: nil); add: (self
        concatenate: (collectionOfLinearFits at: 4)
        and: rightGestureCollection
        and: nil
        and: nil
        and: nil); add: (self
        concatenate: (collectionOfLinearFits at: 6)
        and: (collectionOfLinearFits at: 7)
        and: nil
        and: nil
        and: nil); add: (self
        concatenate: (collectionOfLinearFits at: 8)
        and: (collectionOfLinearFits at: 9)
        and: nil
        and: nil
        and: nil).
    displayForms ← OrderedCollection new.
    " displayForms is a collection of forms to be drawn for the splines"
    displayForms add: (Form new extent: 4 @ 4) black; add: (Form new extent: 4 @ 4) gray; add: (Form
    new extent: 4 @ 4) gray; add: (Form new extent: 4 @ 4) gray; add: (Form new extent: 4 @ 4) gray; add:
    (Form new extent: 4 @ 4) darkGray; add: (Form new extent: 4 @ 4) darkGray; add: (Form new extent: 4
    @ 4) darkGray; add: (Form new extent: 4 @ 4) darkGray.
    1 to: displaySequence size do:
        [:index |
        tempSpline form: (displayForms at: index).
        tempSpline collectionOfPoints: (displaySequence at: index).
        tempSpline computeCurve.
        tempSpline displayOn: aMedium at: aPoint]

obtainLeftGestureCollection: continousOrSeparate
    "this method emphasizes graphically whether a deity's gesture is
    continous with the arms"

| leftGestureCollection firstPoint secondPoint thirdPoint fourthPoint |
    leftGestureCollection ← OrderedCollection new.
    continousOrSeparate
        ifTrue:
            [firstPoint ← (collectionOfLinearFits at: 3)
                at: 1.
            secondPoint ← (collectionOfLinearFits at: 3)
                at: 1.
            " make the second point the same so that spline appears strongly
                hinged at the left arm"
            thirdPoint ← (collectionOfLinearFits at: 3)
                at: 2.
            fourthPoint ← (collectionOfLinearFits at: 3)
                at: 2.
            leftGestureCollection add: firstPoint; add: secondPoint; add: thirdPoint; add: fourthPoint.
            ↑leftGestureCollection]
``` ifFalse: [↑leftGestureCollection ← collectionOfLinearFits at: 3]

obtainRightGestureCollection: continousOrSeparate
"this method emphasizes graphically whether a deity's gesture is
continous with the arms"

| firstPoint secondPoint thirdPoint fourthPoint rightGestureCollection |
rightGestureCollection ← OrderedCollection new.
continousOrSeparate
    ifTrue:
        [firstPoint ← (collectionOfLinearFits at: 5)
            at: 1.
        secondPoint ← (collectionOfLinearFits at: 5)
            at: 1.
        " make the second point the same so that spline appears strongly
           hinged at the right arm"
        thirdPoint ← (collectionOfLinearFits at: 5)
            at: 2.
        fourthPoint ← (collectionOfLinearFits at: 5)
            at: 2.
        rightGestureCollection add: firstPoint; add: secondPoint; add: thirdPoint; add: fourthPoint.
        ↑rightGestureCollection]
    ifFalse: [↑rightGestureCollection ← collectionOfLinearFits at: 5]

updateDisplay
    blankCanvas displayAt: view displayBox origin.
    "· self displayAsSplineWithHandsAndGesturesInOneMotionAt: view
    displayBox origin + center On: Display."
    self
        displayAsSplineWithHandsAndGesturesSeparated2At: view displayBox origin + center
        On: Display
        left: false
        right: false.
    view updateDisplay.
    view accept

DeityDatabaseEditor class
    instanceVariableNames: ''

DeityDatabaseEditor class methodsFor: instance creation createAFreshOnNormalizedPostureDiagram: aPostureDiagram
    | deityDatabaseEditor formView aForm topView extent | deityDatabaseEditor ← self new.
    deityDatabaseEditor whereDidIComeFrom: 0.
    deityDatabaseEditor whoAmI: 1.
    deityDatabaseEditor reEnactment: false.
    deityDatabaseEditor collectionOfLinearFits: aPostureDiagram postureDiagramAsOneCollection.
    deityDatabaseEditor currentDeity: aPostureDiagram deityName.
    deityDatabaseEditor spawnedASceneEditor: false.
    formView ← FormHolderView new model: (aForm ← deityDatabaseEditor computeCanvas:
aPostureDiagram).

```
formView controller: deityDatabaseEditor.
topView ← StandardSystemView new.
topView model: aForm.
topView addSubView: formView.
topView label: '"0--->', deityDatabaseEditor whoAmI printString, '"'.
topView borderWidth: 2.
extent ← topView viewport extent.
topView minimumSize: extent.
topView maximumSize: extent.
↑topView controller open
"|p| p ← PostureDiagram createAPostureDiagramOfDeityNamed:
'Shakyamuni1'
   FromTheseLinesResidingOnFileNamed:
'thangka:Shakyamuni1.postureDiagram'. p
normalizeCoordinates.
DeityDatabaseEditor createAFreshOnNormalizedPostureDiagram: p"

createASiblingEditorof: anObject comingFrom: anOriginalVocabularyEditorEvent
   | newVocabularyEditor |
   newVocabularyEditor ← self new.
   newVocabularyEditor activeVocabulary: anObject.
   newVocabularyEditor whereDidIComeFrom: anOriginalVocabularyEditorEvent.
   newVocabularyEditor whoAmI: TempleDesignProcessManager Derivation + 1.
   newVocabularyEditor defaultDisplayCanvas.
   newVocabularyEditor initializeTheCanvas.
   newVocabularyEditor createAnEditor buildAnInteractionCanvas
   "VocabularyEditor createASiblingEditorof: TileInlay1 new comingFrom: 0"

createASiblingEditorWithCollectionOfLinearFits: aCollection Extent: anExtent comingFrom:
anOriginalEvent
   | newDeityDatabaseEditor |
   newDeityDatabaseEditor ← self new.
   newDeityDatabaseEditor whereDidIComeFrom: anOriginalEvent.
   newDeityDatabaseEditor whoAmI: ThangkaProcessManager Derivation + 1.
   newDeityDatabaseEditor reEnactment: false.
   newDeityDatabaseEditor collectionOfLinearFits: aCollection.
   newDeityDatabaseEditor computeCanvasFromExtent: anExtent.
   newDeityDatabaseEditor createAnEditor buildAnInteractionCanvas
   "VocabularyEditor createASiblingEditorof: TileInlay1 new comingFrom: 0"

createOnNormalizedPostureDiagram: aPostureDiagram
   "Creates a StandardSystemView for a Digitizer on a scanned image of a
      Thangka proportioning diagram"

| deityDatabaseEditorEditor |
   deityDatabaseEditorEditor ← self new.
   deityDatabaseEditorEditor collectionOfLinearFits: aPostureDiagram postureDiagramAsOneCollection.

deityDatabaseEditorEditor computeCanvas: aPostureDiagram.
   deityDatabaseEditorEditor createAnEditor buildAnInteractionCanvas "|p| p ← PostureDiagram createAPostureDiagramOfDeityNamed: 'GreenTara'
   FromTheseLinesResidingOnFileNamed:
‗<ThangkaImages>example.postureDiagram'. p normalizeCoordinates.
DeityDatabaseEditor createOnNormalizedPostureDiagram: p "
```

GreenTara

|p| p ← PostureDiagram createAPostureDiagramOfDeityNamed:
   'GreenTara'
     FromTheseLinesResidingOnFileNamed:
   'thangka:GreenTara.postureDiagram'. p
   normalizeCoordinates.
     DeityDatabaseEditor createAFreshOnNormalizedPostureDiagram: p

Milarepa

|p| p ← PostureDiagram createAPostureDiagramOfDeityNamed:
   'Milarepa'
     FromTheseLinesResidingOnFileNamed:
   'thangka:Milarepa.postureDiagram'. p
   normalizeCoordinates.
     DeityDatabaseEditor createAFreshOnNormalizedPostureDiagram: p postureDiagramFromFile: aName

| deityDatabaseEditor aPostureDiagram |
   aPostureDiagram ← PostureDiagram createAPostureDiagramOfDeityNamed: aName
FromTheseLinesResidingOnFileNamed: '[]<ThangkaImages>', aName , '.postureDiagram'.
   aPostureDiagram normalizeCoordinates.
   ThangkaProcessManager initialise.
   deityDatabaseEditor ← self new.
   deityDatabaseEditor whereDidIComeFrom: 0.
   deityDatabaseEditor whoAmI: 1.
   deityDatabaseEditor reEnactment: false.
   deityDatabaseEditor collectionOfLinearFits: aPostureDiagram postureDiagramAsOneCollection.
   deityDatabaseEditor computeCanvas: aPostureDiagram.
   deityDatabaseEditor createAnEditor: aName; buildAnInteractionCanvas
   " FileDirectory filesMatching: '[]<ThangkaImages>*.postureDiagram' ."
   "DeityDatabaseEditor postureDiagramFromFile: 'GreenTara'."

Saraswati

"DeityDatabaseEditor Saraswati"
|p| p ← PostureDiagram createAPostureDiagramOfDeityNamed:
   'Saraswati'
     FromTheseLinesResidingOnFileNamed:
   'thangka:Saraswati.postureDiagram'. p
   normalizeCoordinates.
     DeityDatabaseEditor createAFreshOnNormalizedPostureDiagram: p shakyamuni1

"DeityDatabaseEditor shakyamuni1"
|p| p ← PostureDiagram createAPostureDiagramOfDeityNamed:
   'Shakyamuni1'
     FromTheseLinesResidingOnFileNamed:
   'thangka:Shakyamuni1.postureDiagram'. p
   normalizeCoordinates.
     DeityDatabaseEditor createAFreshOnNormalizedPostureDiagram: p

Vajravarahi

"DeityDatabaseEditor Vajravarahi"
|p| p ← PostureDiagram createAPostureDiagramOfDeityNamed:

'Vajravarahi'
    FromTheseLinesResidingOnFileNamed:
'thangka:Vajravarahi.postureDiagram'. p
normalizeCoordinates.
DeityDatabaseEditor createAFreshOnNormalizedPostureDiagram: p

**MouseMenuController subclass: #AbstractThangkaEditor
    instanceVariableNames: 'whoAmI whereDidIComeFrom reEnactment '
    classVariableNames: ''
    poolDictionaries: ''
    category: 'Thangka-Service'**

*Copyright (c) Xerox Corporation, 1987, 1988*

AbstractThangkaEditor methodsFor: inquiries & assignments reEnactment
↑   reEnactment reEnactment: aBoolean
    reEnactment ← aBoolean whereDidIComeFrom

↑whereDidIComeFrom whereDidIComeFrom: fromSomeBody whereDidIComeFrom ← fromSomeBody whoAmI

↑whoAmI whoAmI: someBody whoAmI ← someBody

```
Object subclass: #PostureDiagram
    instanceVariableNames: 'deityName headToNavel leftArm rightArm leftLeg
rightLeg leftGesture rightGesture leftFoot rightFoot center upperLeft lowerRight
transformedCollectionOfSplines '
    classVariableNames: ''
    poolDictionaries: ''
    category: 'Thangka-Digitizing'
```

*Copyright (c) Xerox Corporation, 1987, 1988*

PostureDiagram methodsFor: Inquiries & assignments center
    ↑center center: aPoint
    center ← aPoint collectionOfSplines: aCollection
    headToNavel ← aCollection at: 1.
    leftArm ← aCollection at: 2.
    leftGesture ← aCollection at: 3.
    rightArm ← aCollection at: 4.
    rightGesture ← aCollection at: 5.
    leftLeg ← aCollection at: 6.
    leftFoot ← aCollection at: 7.
    rightLeg ← aCollection at: 8.
    rightFoot ← aCollection at: 9 deityName
    ↑deityName deityName: aName
    deityName ← aName headToBellyButton: aCollectionOfKnotPoints
    headToBellyButton ← aCollectionOfKnotPoints headToNavel
    ↑headToNavel headToNavel: aCollectionOfPoints
    headToNavel ← aCollectionOfPoints leftArm
    ↑leftArm leftArm: aCollectionOfKnotPoints
    leftArm ← aCollectionOfKnotPoints leftFoot
    ↑leftFoot leftFoot: aCollectionOfKnotPoints
    leftFoot ← aCollectionOfKnotPoints leftGesture
    ↑leftGesture leftGesture: aCollectionOfKnotPoints
    leftGesture ← aCollectionOfKnotPoints leftLeg
    ↑leftLeg leftLeg: aCollectionOfKnotPoints
    leftLeg ← aCollectionOfKnotPoints lowerRight

↑lowerRight lowerRight: aPoint
    lowerRight ← aPoint.

postureDiagramAsOneCollection
    | tempCollection |
    tempCollection ← OrderedCollection new.
    tempCollection add: headToNavel; add: leftArm; add: leftGesture; add: rightArm; add: rightGesture; add: leftLeg; add: leftFoot; add: rightLeg; add: rightFoot.
    ↑tempCollection rightArm: aCollectionOfKnotPoints
    rightArm ← aCollectionOfKnotPoints rightFoot
    ↑rightFoot rightFoot: aCollectionOfKnotPoints
    rightFoot ← aCollectionOfKnotPoints rightGesture
    ↑rightGesture rightGesture: aCollectionOfKnotPoints
    rightGesture ← aCollectionOfKnotPoints rightLeg: aCollectionOfKnotPoints
    rightLeg ← aCollectionOfKnotPoints upperLeft

↑upperLeft upperLeft: aPoint upperLeft ← aPoint

PostureDiagram methodsFor: extracting knotPoints computeATriangiularArea: aCollectionOfPoints

| p2 p3 |
p2 ← (aCollectionOfPoints at: 2)
         - aCollectionOfPoints first.
p3 ← (aCollectionOfPoints at: 3)
         - aCollectionOfPoints first.
↑p2 y * p3 x - (p2 x * p3 y) / 2 abs extractKnotPoints
  | time areaMin constant timeStepsAfterAKnot totalArea knotPoints currentPoint previousPoint previousPointMinus1 previousPointMinus2 trianglePts currentArea previousArea prePreviousArea splineCurve f |
    areaMin ← 800 * 1000 / 20000.
    constant ← 800 * 1000 / 4000.
    timeStepsAfterAKnot ← 0.
    time ← 0.
    totalArea ← 0.
    knotPoints ← OrderedCollection new.
    trianglePts ← OrderedCollection new.
    3 timesRepeat: [trianglePts add: nil].
    Cursor blank showWhile: [[Sensor redButtonPressed]
        whileTrue:
            [time = 0 ifTrue: [knotPoints add: Sensor cursorPoint].
            time ← time + 1.
            timeStepsAfterAKnot ← timeStepsAfterAKnot + 1.
            (Form new extent: 4 @ 4) lightGray
                displayOn: Display
                at: Sensor cursorPoint
              "  clippingBox: ("
                rule: Form over
                mask: Form black.
            "view insetDisplayBox"
            currentPoint ← Sensor cursorPoint.
            timeStepsAfterAKnot = 1
                ifTrue:
                    [previousPoint ← knotPoints last.
                    previousPointMinus1 ← previousPoint.
                    previousPointMinus2 ← previousPoint].
            timeStepsAfterAKnot = 2
                ifTrue:
                    [previousPointMinus1 ← knotPoints last.
                    previousPointMinus2 ← previousPointMinus1].
            timeStepsAfterAKnot = 3 ifTrue: [previousPointMinus2 ← previousPointMinus1].
            trianglePts at: 1 put: knotPoints last; at: 2 put: previousPoint; at: 3 put: currentPoint.
            currentArea ← (self computeATrianglularArea: trianglePts) abs.
            trianglePts at: 2 put: previousPointMinus1; at: 3 put: previousPoint.
            previousArea ← (self computeATrianglularArea: trianglePts) abs.
            trianglePts at: 2 put: previousPointMinus2; at: 3 put: previousPointMinus1.
            prePreviousArea ← (self computeATrianglularArea: trianglePts) abs.
            totalArea ← totalArea + currentArea.
            totalArea >= constant | (currentArea > (previousArea + prePreviousArea) & (totalArea >= areaMin))
                ifTrue:
                    [knotPoints add: currentPoint.
                    timeStepsAfterAKnot ← 0.
                    totalArea ← 0].
            previousPoint ← currentPoint.

```
        previousPointMinus1 ← previousPoint.
        previousPointMinus2 ← previousPointMinus1]].
knotPoints add: currentPoint.
splineCurve ← Spline new.
splineCurve form: (Form new extent: 3 @ 3) black.
1 to: knotPoints size do:
    [:counter |
    f ← (Form new extent: 7 @ 7) black.
    f displayAt: (knotPoints at: counter).
    splineCurve add: (knotPoints at: counter)].
splineCurve computeCurve.
splineCurve displayOn: Display.
↑knotPoints
```

PostureDiagram methodsFor: Initialize assignInstanceVariablesFromLargeCollection: aHugeCollection
```
| |
headToNavel ← aHugeCollection at: 1.
leftArm ← aHugeCollection at: 2.
leftGesture ← aHugeCollection at: 3.
rightArm ← aHugeCollection at: 4.
rightGesture ← aHugeCollection at: 5.
leftLeg ← aHugeCollection at: 6.
leftFoot ← aHugeCollection at: 7.
rightLeg ← aHugeCollection at: 8.
rightFoot ← aHugeCollection at: 9
``` control
```
| done |
done ← false.
Sensor waitButton.
[done]
    whileFalse:
        [self extractKnotPoints.
        Sensor waitButton]
```

Initialize
```
headToBellyButton ← OrderedCollection new.
leftArm ← OrderedCollection new.
rightArm ← OrderedCollection new.
leftLeg ← OrderedCollection new.
rightLeg ← OrderedCollection new
```

PostureDiagram methodsFor: displaying--private displayAsSplineWithHandsAndGesturesSeparated2At: aPoint On: aMedium left: leftGestureSeparate right: rightGestureSeparate
" this method assumes that gesture are not extensions of the arms"

```
| displaySequence displayForms tempSpline leftGestureCollection rightGestureCollection |
displaySequence ← OrderedCollection new.
tempSpline ← Spline new.
leftGestureCollection ← self obtainLeftGestureCollection: leftGestureSeparate.
rightGestureCollection ← self obtainRightGestureCollection: rightGestureSeparate.
displaySequence add: (headToNavel); add: (self
```

```
        concatenate: (leftArm)
        and: leftGestureCollection
        and: nil
        and: nil
        and: nil); add: (self
        concatenate: (rightArm)
        and: rightGestureCollection
        and: nil
        and: nil
        and: nil); add: (self
        concatenate: (leftLeg)
        and: (leftFoot)
        and: nil
        and: nil
        and: nil); add: (self
        concatenate: (rightLeg)
        and: (rightFoot)
        and: nil
        and: nil
        and: nil).
    displayForms ← OrderedCollection new.
    " displayForms is a collection of forms to be drawn for the splines"
    displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
    1 to: displaySequence size do:
        [:index |
        tempSpline form: (displayForms at: index).
        tempSpline collectionOfPoints: (displaySequence at: index).
        tempSpline computeCurve.
        tempSpline displayOn: aMedium at: aPoint]
``` formWithPostureDiagramAsContinousSplines

```
    | form cen |
    form ← Form new extent: lowerRight - upperLeft.
    cen ← center - upperLeft.
    self
        displayAsSplineWithHandsAndGesturesSeparated2At: cen
        On: form
        left: false
        right: false.
    ↑form
``` obtainLeftGestureCollection: continousOrSeparate

```
    "this method emphasizes graphically whether a deity's gesture is
    continous with the arms"

| leftGestureCollection firstPoint secondPoint thirdPoint fourthPoint |
    leftGestureCollection ← OrderedCollection new.
    continousOrSeparate
        ifTrue:
            [firstPoint ← (leftGesture)
                    at: 1.
            secondPoint ← (leftGesture)
                    at: 1.
```

```
    " make the second point the same so that spline appears strongly
        hinged at the left arm"
    thirdPoint ← (leftGesture)
            at: 2.
    fourthPoint ← (leftGesture)
            at: 2.
    leftGestureCollection add: firstPoint; add: secondPoint; add: thirdPoint; add: fourthPoint.
        ↑leftGestureCollection]
    ifFalse: [↑leftGestureCollection ← leftGesture]

obtainRightGestureCollection: continousOrSeparate
    "this method emphasizes graphically whether a deity's gesture is
    continous with the arms"

| firstPoint secondPoint thirdPoint fourthPoint rightGestureCollection |
    rightGestureCollection ← OrderedCollection new.
    continousOrSeparate
        ifTrue:
            [firstPoint ← (rightGesture)
                    at: 1.
            secondPoint ← (rightGesture)
                    at: 1.
            " make the second point the same so that spline appears strongly
                hinged at the right arm"
            thirdPoint ← (rightGesture)
                    at: 2.
            fourthPoint ← (rightGesture)
                    at: 2.
            rightGestureCollection add: firstPoint; add: secondPoint; add: thirdPoint; add: fourthPoint.
                ↑rightGestureCollection]
        ifFalse: [↑rightGestureCollection ← rightGesture]
```

PostureDiagram methodsFor: displaying

```
concatenate: firstCollection and: secondCollection and: thirdCollection and: fourthCollection and:
fifthCollection
    | temp |
    temp ← OrderedCollection new.
    temp addAllLast: firstCollection.
    temp removeLast.
    temp addAllLast: secondCollection.
    thirdCollection isNil
        ifTrue: [↑temp]
        ifFalse:
            [temp removeLast.
            temp addAllLast: thirdCollection.
            fourthCollection isNil
                ifTrue: [↑temp]
                ifFalse:
                    [temp removeLast.
                    temp addAllLast: fourthCollection.
                    fifthCollection isNil
                        ifTrue: [↑temp]
                        ifFalse:
                            [temp removeLast.
                            ↑temp addAllLast: fifthCollection]]]
``` displayAsLinearFitAt: aPoint On: aMedium
    | displaySequence displayForms tempLinearFit |
    displaySequence ← OrderedCollection new.
    tempLinearFit ← LinearFit new.
    displaySequence add: headToNavel; add: leftArm; add: leftGesture; add: rightArm; add: rightGesture; add: leftLeg; add: leftFoot; add: rightLeg; add: rightFoot.
    displayForms ← OrderedCollection new.
    " displayForms is a collection of forms to be drawn for the splines"
    displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
    1 to: displaySequence size do:
        [:index |
        tempLinearFit form: (displayForms at: index).
        tempLinearFit collectionOfPoints: (displaySequence at: index).
        tempLinearFit displayOn: aMedium at: aPoint]

displayAsSpline2At: aPoint On: aMedium
    | displaySequence displayForms tempSpline |
    displaySequence ← OrderedCollection new.
    tempSpline ← Spline new.
    displaySequence add: headToNavel; add: (self
        concatenate: leftArm
        and: leftGesture
        and: nil
        and: nil
        and: nil); add: (self
        concatenate: rightArm
        and: rightGesture
        and: nil
        and: nil
        and: nil); add: (self
        concatenate: leftLeg
        and: leftFoot
        and: nil
        and: nil
        and: nil); add: (self
        concatenate: rightLeg
        and: rightFoot
        and: nil
        and: nil
        and: nil).
    displayForms ← OrderedCollection new.
    " displayForms is a collection of forms to be drawn for the splines"
    displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
    1 to: displaySequence size do:
        [:index |
        tempSpline form: (displayForms at: index).
        tempSpline collectionOfPoints: (displaySequence at: index).
        tempSpline computeCurve.
        tempSpline displayOn: aMedium at: aPoint]

displayAsSpline3At: aPoint On: aMedium
　　| displaySequence displayForms tempSpline |
　　displaySequence ← OrderedCollection new.
　　tempSpline ← Spline new.
　　displaySequence add: headToNavel; add: (self
　　　　concatenate:( leftGesture reverse)
　　　　and:( leftArm reverse)
　　　　and: rightArm
　　　　and: rightGesture
　　　　and: nil); add: (self
　　　　concatenate: leftLeg
　　　　and: leftFoot
　　　　and: nil
　　　　and: nil
　　　　and: nil); add: (self
　　　　concatenate: rightLeg
　　　　and: rightFoot
　　　　and: nil
　　　　and: nil
　　　　and: nil).
　　displayForms ← OrderedCollection new.
　　" displayForms is a collection of forms to be drawn for the splines"
　　displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
　　1 to: displaySequence size do:
　　　　[:index |
　　　　tempSpline form: (displayForms at: index).
　　　　tempSpline collectionOfPoints: (displaySequence at: index).
　　　　tempSpline computeCurve.
　　　　tempSpline displayOn: aMedium at: aPoint]

displayAsSplineAt: aPoint On: aMedium
　　| displaySequence displayForms tempSpline |
　　displaySequence ← OrderedCollection new.
　　tempSpline ← Spline new.
　　displaySequence add: headToNavel; add: leftArm; add: leftGesture; add: rightArm; add: rightGesture; add: leftLeg; add: leftFoot; add: rightLeg; add: rightFoot.
　　displayForms ← OrderedCollection new.
　　" displayForms is a collection of forms to be drawn for the splines"
　　displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
　　1 to: displaySequence size do:
　　　　[:index |
　　　　tempSpline form: (displayForms at: index).
　　　　tempSpline collectionOfPoints: (displaySequence at: index).
　　　　tempSpline computeCurve.
　　　　tempSpline displayOn: aMedium at: aPoint]

displayAt: aPoint On: aMedium
　　| displaySequence displayForms |
　　displaySequence ← OrderedCollection new.

displaySequence add: headToNavel; add: leftArm; add: leftGesture; add: rightArm; add: rightGesture; add: leftLeg; add: leftFoot; add: rightLeg; add: rightFoot.
displayForms ← OrderedCollection new.
"displayForms is a collection of forms to be drawn for the splines"
displayForms add: (Form new extent: 4 @ 4) black; add: (Form new extent: 4 @ 4) gray; add: (Form new extent: 4 @ 4) gray; add: (Form new extent: 4 @ 4) gray; add: (Form new extent: 4 @ 4) gray; add: (Form new extent: 4 @ 4) darkGray; add: (Form new extent: 4 @ 4) darkGray; add: (Form new extent: 4 @ 4) darkGray; add: (Form new extent: 4 @ 4) darkGray.
1 to: displaySequence size do: [:index | self
    displaySpline: (displaySequence at: index)
    at: aPoint
    withForm: (displayForms at: index)
    On: aMedium]

displaySpline: totalCollection at: aPoint withForm: aForm On: aMedium
| splineCurve |
    totalCollection do:
    [:aCollection |
    splineCurve ← Spline new.
    splineCurve form: aForm.
    aCollection do: [:aKnotPoint | splineCurve add: aKnotPoint + aPoint].
    splineCurve computeCurve.
    splineCurve displayOn: aMedium]

PostureDiagram methodsFor: saving saveThePostureDiagram
" note: Proportioning Diagram must have a corresponding deity outline.
The file format is as follows:
center
upperLeft
lowerRight
headToNavel
leftArm
leftGesture
rightArm
rightGesture
leftLeg
leftFoot
rightLeg
rightFoot"

| aFileName outFile tempCollection |
aFileName ← '[]<ThangkaImages>' , (FillInTheBlank request: 'nameOfFile') , '.postureDiagram'.
outFile ← FileStream newFileNamed: aFileName.
outFile binary.
outFile nextWordPut: center x.
outFile nextWordPut: center y.
outFile nextWordPut: upperLeft x.
outFile nextWordPut: upperLeft y.
outFile nextWordPut: lowerRight x.
outFile nextWordPut: lowerRight y.
tempCollection ← self postureDiagramAsOneCollection.
tempCollection do:
    [:aSpline |
    outFile nextWordPut: aSpline size.

```
    aSpline do:
        [:knotPoint |
        outFile nextWordPut: knotPoint x.
        outFile nextWordPut: knotPoint y]].
outFile close
``` saveThePostureDiagramOnFileNamed: aFileName
```
" note: Proportioning Diagram must have a corresponding deity outline.
 The file format is as follows:
center
upperLeft
lowerRight
headToNavel
leftArm
leftGesture
rightArm
rightGesture
leftLeg
leftFoot
rightLeg
rightFoot"

| outFile tempCollection |
outFile ← FileStream newFileNamed: aFileName.
outFile binary.
outFile nextWordPut: center x.
outFile nextWordPut: center y.
outFile nextWordPut: upperLeft x.
outFile nextWordPut: upperLeft y.
outFile nextWordPut: lowerRight x.
outFile nextWordPut: lowerRight y.
tempCollection ← self  postureDiagramAsOneCollection.
tempCollection do:
    [:aSpline |
    outFile nextWordPut: aSpline size.
    aSpline do:
        [:knotPoint |
        outFile nextWordPut: knotPoint x.
        outFile nextWordPut: knotPoint y]].
outFile close
``` saveTheProportioningDiagram
```
" note: Proportioning Diagram must have a corresponding deity outline.
 The file format is as follows:
center
upperLeft
lowerRight
headToNavel
leftArm
leftGesture
rightArm
rightGesture
leftLeg
leftFoot
rightLeg
rightFoot"
```

```
| aFileName outFile tempCollection |
aFileName ← '[<Thangkalmages>', (FillInTheBlank request: 'nameOfFile') , '.postureDiagram'.
outFile ← FileStream newFileNamed: aFileName.
outFile binary.
outFile nextWordPut: center x.
outFile nextWordPut: center y.
outFile nextWordPut: upperLeft x.
outFile nextWordPut: upperLeft y.
outFile nextWordPut: lowerRight x.
outFile nextWordPut: lowerRight y.
tempCollection ← OrderedCollection new.
tempCollection add: headToNavel; add: leftArm; add: leftGesture; add: rightArm; add: rightGesture;
 add: leftLeg; add: leftFoot; add: rightLeg; add: rightFoot.
    tempCollection do:
        [:aSpline |
        outFile nextWordPut: aSpline size.
        aSpline do:
            [:knotPoint |
            outFile nextWordPut: knotPoint x.
            outFile nextWordPut: knotPoint y]].
    outFile close
``` saveTheProportioningDiagramOnFileNamed: aFileName
" note: Proportioning Diagram must have a corresponding deity outline.
 The file format is as follows:
center
upperLeft
lowerRight
headToNavel
leftArm
leftGesture
rightArm
rightGesture
leftLeg
leftFoot
rightLeg
rightFoot"

```
| outFile tempCollection |
outFile ← FileStream newFileNamed: aFileName.
outFile binary.
outFile nextWordPut: center x.
outFile nextWordPut: center y.
outFile nextWordPut: upperLeft x.
outFile nextWordPut: upperLeft y.
outFile nextWordPut: lowerRight x.
outFile nextWordPut: lowerRight y.
tempCollection ← OrderedCollection new.
tempCollection add: headToNavel; add: leftArm; add: leftGesture; add: rightArm; add: rightGesture;
 add: leftLeg; add: leftFoot; add: rightLeg; add: rightFoot.
    tempCollection do:
        [:aSpline |
        outFile nextWordPut: aSpline size.
        aSpline do:
            [:knotPoint |
``` outFile nextWordPut: knotPoint x.
            outFile nextWordPut: knotPoint y]].
    outFile close

PostureDiagram methodsFor: transformations normalizeCoordinates
    self setUpHooksBetweenSplines.
    self
        transformationType: 'normalize'
        withArg: center
        withArg: nil
        withArg: nil rotateBy: anAngle
    ↑self
        transformationType: 'rotate'
        withArg: anAngle
        withArg: nil
        withArg: nil scaleBy: aPoint
    ↑self
        transformationType: 'scale'
        withArg: aPoint
        withArg: nil
        withArg: nil transformACollectionOfSplines: aCollectionOfSplines transformationType: aTransformationType withArg: arg1 withArg: arg2 withArg: arg3
    | newCollectionOfSplines newSpline newPoint | newCollectionOfSplines ← OrderedCollection new.
    aCollectionOfSplines do:
        [:aSpline | newSpline ← OrderedCollection new.
        aSpline do:
            [:aKnotPoint |
            aKnotPoint do:
                [:aPoint |
                Transcript show: 'proportioning', aTransformationType , '****'.
                aTransformationType = 'normalize' ifTrue: [newPoint ← aPoint - arg1].
                aTransformationType = 'rotate' ifTrue: [newPoint ← aPoint rotateBy: arg1].
                aTransformationType = 'scale' ifTrue: [newPoint ← aPoint scaleBy: arg1].
                aTransformationType = 'translate' ifTrue: [newPoint ← aPoint translateBy: arg1].
                aTransformationType = 'concatanate' ifTrue: [newPoint ← aPoint translateBy: arg1].
                newSpline add: newPoint].
            newCollectionOfSplines add: newSpline].
        ].
    aTransformationType = 'normalize'
        ifTrue:
            [transformedCollectionOfSplines ← newCollectionOfSplines.
            ↑self collectionOfLines: newCollectionOfSplines]
        ifFalse: [↑newCollectionOfSplines]

transformationType: aTransformationType withArg: arg1 withArg: arg2 withArg: arg3
    | newCollectionOfSplines newSpline newPoint |

```
        newCollectionOfSplines ← OrderedCollection new.
    self postureDiagramAsOneCollection do:
        [:aSpline |
        newSpline ← OrderedCollection new.
        aSpline do:
            [:aPoint |
            Transcript show: 'proportioning' , aTransformationType , '***'.
            aTransformationType = 'normalize' ifTrue: [newPoint ← aPoint - arg1].
            aTransformationType = 'rotate' ifTrue: [newPoint ← aPoint rotateBy: arg1].
            aTransformationType = 'scale' ifTrue: [newPoint ← aPoint scaleBy: arg1].
            aTransformationType = 'translate' ifTrue: [newPoint ← aPoint translateBy: arg1].
            aTransformationType = 'concatanate' ifTrue: [newPoint ← aPoint translateBy: arg1].
            newSpline add: newPoint].
        newCollectionOfSplines add: newSpline].
    aTransformationType = 'normalize'
        ifTrue:
            [transformedCollectionOfSplines ← newCollectionOfSplines.
            ↑self collectionOfSplines: newCollectionOfSplines]
        ifFalse: [↑newCollectionOfSplines]

translateBy: aPoint
    ↑self
        transformationType: 'translate'
        withArg: aPoint
        withArg: nil
        withArg: nil
```

PostureDiagram methodsFor: menu messages

```
display
    splineCurveOrLinearFit = 'c' ifTrue: [self displayCurve].
    splineCurveOrLinearFit = 'l' ifTrue: [self displayLinearFit].
    splineCurveOrLinearFit = 's' ifTrue: [self displaySpline]
```

PostureDiagram methodsFor: hooks

```
linkArms
    | temp1 temp2 |
    temp1 ← rightArm first.
    temp2 ← leftArm first.
    temp1 == temp2 ifFalse: [rightArm at: 1 put: temp2]

linkLeftFootToLeg
    | temp1 temp2 |
    temp1 ← leftLeg last.
    temp2 ← leftFoot first.
    temp1 == temp2 ifFalse: [ leftLeg at: 1 put: temp1]

linkLeftGestureToArm
    | temp1 temp2 |
    temp1 ← leftGesture first.
    temp2 ← leftArm last.
    temp1 == temp2 ifFalse: [leftArm at: 4 put: temp1]

linkLegs
    | temp1 temp2 |
```

```
temp1 ← rightLeg first.
temp2 ← leftLeg first.
temp1 == temp2 ifFalse: [rightLeg at: 1 put: temp2]
``` linkRightFootToLeg
```
| temp1 temp2 |
temp1 ← rightLeg last.
temp2 ← rightFoot first.
temp1 == temp2 ifFalse: [rightLeg at: 1 put: temp1]
``` linkRightGestureToArm
```
| temp1 temp2 |
temp1 ← rightGesture first.
temp2 ← rightArm last.
temp1 == temp2 ifFalse: [rightArm at: 4 put: temp1]
``` linkSpinalCordToArms
```
| temp1 temp2 |
temp1 ← headToNavel at: 2.
temp2 ← leftArm first.
temp1 == temp2
    ifFalse:
        [leftArm at: 1 put: temp1.
        rightArm at: 1 put: temp1]
``` linkSpinalCordToLegs
```
| temp1 temp2 |
temp1 ← headToNavel last.
temp2 ← leftLeg first.
temp1 == temp2
    ifFalse:
        [leftLeg at: 1 put: temp1.
        rightLeg at: 1 put: temp1]
``` setUpHooksBetweenSplines
```
self linkLeftGestureToArm.
self linkRightGestureToArm.
self linkArms.
self linkSpinalCordToArms.
self linkLeftFootToLeg.
self linkRightFootToLeg.
self linkLegs.
self linkSpinalCordToLegs
```

PostureDiagram class
  instanceVariableNames: ''

PostureDiagram class methodsFor: instance creation createAPostureDiagramOfDeityNamed: aName FromTheseLinesResidingOnFileNamed: aFileName

```
| file postureDiagram instanceVariableCache tempCol size |
postureDiagram ← self new.
```

```
postureDiagram deityName: aName.
file ← FileStream oldFileNamed: aFileName.
file binary.
postureDiagram center: file nextWord @ file nextWord.
postureDiagram upperLeft: file nextWord @ file nextWord.
postureDiagram lowerRight: file nextWord @ file nextWord.
instanceVariableCache ← OrderedCollection new.
9
    timesRepeat:
        [tempCol ← OrderedCollection new.
         size ← file nextWord.
         size timesRepeat: [tempCol add: file nextWord @ file nextWord].
         instanceVariableCache add: tempCol].
file close.
Transcript show: 'postureDiagram read from file....'.
postureDiagram assignInstanceVariablesFromLargeCollection: instanceVariableCache.
↑postureDiagram" displayAsSpline2At: Sensor waitButton - postureDiagram center On: Display"
"PostureDiagram createAPostureDiagramOfDeityNamed: 'GreenTara'
FromTheseLinesResidingOnFileNamed:
'[]<ThangkaImages>GreenTara.postureDiagram' "
```

PostureDiagram class methodsFor: examples example0
```
    | p |
    p ← self new.
    p control
    "PostureDiagram example0"
``` example1
```
    | postureDiagram |
    postureDiagram ← PostureDiagram createAPostureDiagramOfDeityNamed: 'SittingDeity'
FromTheseLinesResidingOnFileNamed: 'GreenTara.postureDiagram'.
    postureDiagram normalizeCoordinates.
"   postureDiagram scaleBy: 0.5@0.5."
    postureDiagram displayAsLinearFitAt: Sensor waitButton On: Display.
    postureDiagram displayAsSpline2At: Sensor waitButton On: Display.
    postureDiagram inspect
    "PostureDiagram example1"
``` example2
```
    | postureDiagram |
    postureDiagram ← PostureDiagram createAPostureDiagramOfDeityNamed: 'SittingDeity'
FromTheseLinesResidingOnFileNamed: '[]<ThangkaImages>example.postureDiagram'.
    postureDiagram normalizeCoordinates.
"   postureDiagram scaleBy: 0.5@0.5."
    postureDiagram displayAsLinearFitAt: Sensor waitButton On: Display.
    postureDiagram displayAsSpline2At: Sensor waitButton On: Display.
    SkeletonTopology new leftLeg: (postureDiagram leftLeg)
    "PostureDiagram example2"
``` exampleIconCreation
```
    | postureDiagram newCol |
    postureDiagram ← PostureDiagram createAPostureDiagramOfDeityNamed: 'Milarepa'
FromTheseLinesResidingOnFileNamed: '[]<ThangkaImages>Milarepa.postureDiagram'.
    postureDiagram normalizeCoordinates.
```

```
    newCol ← postureDiagram scaleBy: 0.1 @ 0.1.
    postureDiagram
        displaySpline: newCol
        at: 200 @ 200
        withForm: (Form new extent: 2@2) black
        On: Display
    "PostureDiagram exampleIconCreation"
``` exampleLatching
```
    | postureDiagram f |
    postureDiagram ← PostureDiagram createAPostureDiagramOfDeityNamed: 'GreenTara'
FromTheseLinesResidingOnFileNamed: '[]<ThangkaImages>GreenTara.postureDiagram'.
    postureDiagram normalizeCoordinates.
     postureDiagram scaleBy: 0.5@0.5.
    f ← Form new extent: postureDiagram lowerRight - postureDiagram upperLeft.
    postureDiagram displayAsLinearFitAt: 0 @ 0 + postureDiagram center - postureDiagram upperLeft
On: f.
    f edit
    "PostureDiagram exampleLatching"
```

Object subclass: #DiagramInformation
  instanceVariableNames: 'currentSelection hitPoint latchPoint selectedPoint pointIndex collectionIndex selectedCollection slapPoint collectionOfLinearFits '
  classVariableNames: 'YellowButtonMenu '
  poolDictionaries: ''
  category: 'Thangka-Digitizing'

*Copyright (c) Xerox Corporation, 1987, 1988*

DiagramInformation methodsFor: hit & latch points cursorPoint: cursorPoint isCloseToPoint1: point1 OrPoint2: point2
    | distance2 distance1 |
    distance1 ← cursorPoint dist: point1.
    distance2 ← cursorPoint dist: point2.
    distance1 <= distance2
        ifTrue: [↑point1]
        ifFalse: [↑point2]

determineLatchPointFor2PointCollection
    pointIndex = 1 ifTrue: [↑latchPoint ← OrderedCollection with: (selectedCollection at: 2)].
    pointIndex = 2 ifTrue: [↑latchPoint ← OrderedCollection with: (selectedCollection at: 1)]

determineLatchPointFor3PointCollection
    pointIndex = 1 ifTrue: [↑latchPoint ← OrderedCollection with: (selectedCollection at: 2)].
    pointIndex = 3 ifTrue: [↑latchPoint ← OrderedCollection with: (selectedCollection at: 2)].
    pointIndex = 2 ifTrue: [↑latchPoint ← OrderedCollection with: (selectedCollection at: 1)
            with: (selectedCollection at: 3)]

determineLatchPointFor4PointCollection
    pointIndex = 1 ifTrue: [↑latchPoint ← OrderedCollection with: (selectedCollection at: 2)].
    pointIndex = selectedCollection size ifTrue: [↑latchPoint ← OrderedCollection with: (selectedCollection at: 3)].
    pointIndex = 2 ifTrue: [↑latchPoint ← OrderedCollection with: (selectedCollection at: 1)
            with: (selectedCollection at: 3)].
    pointIndex = 3 ifTrue: [↑latchPoint ← OrderedCollection with: (selectedCollection at: 2)
            with: (selectedCollection at: 4)]

determineLatchPointForHeadToNavel pointIndex = 1 ifTrue: [↑latchPoint ← OrderedCollection with: (selectedCollection at: 2)].
    pointIndex = 2 ifTrue: [↑latchPoint ← OrderedCollection
            with: (selectedCollection at: 1)
            with: (selectedCollection at: 3)
            with: ((collectionOfLinearFits at: 2)
                at: 2)
            with: ((collectionOfLinearFits at: 4)
                at: 2)].
    "left arm"
    "right arm"
    pointIndex = 3 ifTrue: [pointIndex = selectedCollection size
            ifTrue: [↑latchPoint ← OrderedCollection
                with: (selectedCollection at: selectedCollection size - 1)
                with: ((collectionOfLinearFits at: 6)
                    at: 2)

```
                    with: ((collectionOfLinearFits at: 8)
                            at: 2)
            "left leg"
            "right leg"]
        ifFalse: [↑latchPoint ← OrderedCollection with: (selectedCollection at: 2)
                        with: (selectedCollection at: 4)]].
    pointIndex = 4 & (pointIndex = selectedCollection size) ifTrue: [↑latchPoint ← OrderedCollection
                with: (selectedCollection at: selectedCollection size - 1)
                with: ((collectionOfLinearFits at: 6)
                        at: 2)
                with: ((collectionOfLinearFits at: 8)
                        at: 2)]
``` determineLatchPointForLeftArm

```
    pointIndex = 1
        ifTrue:
            [self correctInstanceVariables: 'leftArm'.
            ↑self determineLatchPointForHeadToNavel].
    pointIndex = 2 ifTrue: [↑latchPoint ← OrderedCollection with: (selectedCollection at: 1)
                                with: (selectedCollection at: 3)].
    pointIndex = 3 ifTrue: [↑latchPoint ← OrderedCollection with: (selectedCollection at: 2)
                                with: (selectedCollection at: 4)].
    pointIndex = 4 ifTrue: [↑latchPoint ← OrderedCollection with: (selectedCollection at: 3)
                                with: ((collectionOfLinearFits at: 3)
                                        at: 2)]
``` determineLatchPointForLeftFoot

```
    pointIndex = 1
        ifTrue:
            [self correctInstanceVariables: 'leftFoot'.
            ↑self determineLatchPointForLeftLeg].
    pointIndex = 2 ifTrue: [↑latchPoint ← OrderedCollection with: (selectedCollection at: 1)]
``` determineLatchPointForLeftGesture

```
    pointIndex = 1
        ifTrue:
            [self correctInstanceVariables: 'leftGesture'.
            ↑self determineLatchPointForLeftArm].
    pointIndex = 2 ifTrue: [↑latchPoint ← OrderedCollection with: (selectedCollection at: 1)]
``` determineLatchPointForLeftLeg

```
    pointIndex = 1
        ifTrue:
            [self correctInstanceVariables: 'leftLeg'.
            ↑self determineLatchPointForHeadToNavel].
    pointIndex = 2 ifTrue: [↑latchPoint ← OrderedCollection with: (selectedCollection at: 1)
                                with: (selectedCollection at: 3)].
    pointIndex = 3 ifTrue: [↑latchPoint ← OrderedCollection with: (selectedCollection at: 2)
                                with: ((collectionOfLinearFits at: 7)
                                        at: 2)]
``` determineLatchPointForRightArm

```
    pointIndex = 1
        ifTrue:
            [self correctInstanceVariables: 'rightArm'.
            ↑self determineLatchPointForHeadToNavel].
```

```
pointIndex = 2 ifTrue: [↑latchPoint ← OrderedCollection with: (selectedCollection at: 1)
            with: (selectedCollection at: 3)].
pointIndex = 3 ifTrue: [↑latchPoint ← OrderedCollection with: (selectedCollection at: 2)
            with: (selectedCollection at: 4)].
pointIndex = 4 ifTrue: [↑latchPoint ← OrderedCollection with: (selectedCollection at: 3)
            with: ((collectionOfLinearFits at: 5)
                at: 2)]
``` determineLatchPointForRightFoot

```
pointIndex = 1
    ifTrue:
        [self correctInstanceVariables: 'rightFoot'.
        ↑self determineLatchPointForRightLeg].
pointIndex = 2 ifTrue: [↑latchPoint ← OrderedCollection with: (selectedCollection at: 1)]
``` determineLatchPointForRightGesture

```
pointIndex = 1 ifTrue: [self correctInstanceVariables: 'rightGesture'. ↑self
determineLatchPointForRightArm].
pointIndex = 2 ifTrue: [↑latchPoint ← OrderedCollection with: (selectedCollection at: 1)]
``` determineLatchPointForRightLeg

```
pointIndex = 1
    ifTrue:
        [self correctInstanceVariables: 'rightLeg'.
        ↑self determineLatchPointForHeadToNavel].
pointIndex = 2 ifTrue: [↑latchPoint ← OrderedCollection with: (selectedCollection at: 1)
            with: (selectedCollection at: 3)].
pointIndex = 3 ifTrue: [↑latchPoint ← OrderedCollection with: (selectedCollection at: 2)
            with: ((collectionOfLinearFits at: 9)
                at: 2)]
```

DiagramInformation methodsFor: slap points determineSlapPointForHeadToNavel

```
pointIndex = 1 ifTrue: [↑slapPoint ← OrderedCollection with: (selectedCollection at: 2 + 1)].
pointIndex = 2 ifTrue: [↑slapPoint ← OrderedCollection
            with: (selectedCollection at: 1)
            with: (selectedCollection at: 3)
            with: ((collectionOfLinearFits at: 2)
                at: 2 + 1)
            with: ((collectionOfLinearFits at: 4)
                at: 2 + 1)].
"left arm"
"right arm"
pointIndex = 3 ifTrue: [pointIndex = selectedCollection size
        ifTrue: [↑slapPoint ← OrderedCollection
                with: (selectedCollection at: selectedCollection size - 1 - 1)
                with: ((collectionOfLinearFits at: 6)
                    at: 2 + 1)
                with: ((collectionOfLinearFits at: 8)
                    at: 2 + 1)
        "left leg"
        "right leg"]
    ifFalse: [↑slapPoint ← OrderedCollection with: (selectedCollection at: 1)
            with: (selectedCollection at: 4)]].
pointIndex = 4 & (pointIndex = selectedCollection size) ifTrue: [↑slapPoint ← OrderedCollection
```

```
            with: (selectedCollection at: selectedCollection size - 1 - 1)
            with: ((collectionOfLinearFits at: 6)
                    at: 2 + 1)
            with: ((collectionOfLinearFits at: 8)
                    at: 2 + 1)
    "left leg"
    "right leg"]

determineSlapPointForLeftArm
    pointIndex = 1 ifTrue: ["do nothing"
        ].
    pointIndex = 2 ifTrue: [↑slapPoint ← OrderedCollection with: ((collectionOfLinearFits at: 4)
                    at: 2)
            with: (selectedCollection at: 4)].
    pointIndex = 3 ifTrue: [↑slapPoint ← OrderedCollection with: (selectedCollection at: 1)
            with: (selectedCollection at: 4)].
    pointIndex = 4 ifTrue: [↑latchPoint ← OrderedCollection with: (selectedCollection at: 2)
            with: ((collectionOfLinearFits at: 3)
                    at: 2)]

determineSlapPointForLeftFoot
    pointIndex = 2 ifTrue: [↑slapPoint ← OrderedCollection with: ((collectionOfLinearFits at: 6)
                    at: 2)]

determineSlapPointForLeftGesture
    pointIndex = 2 ifTrue: [↑slapPoint ← OrderedCollection with: ((collectionOfLinearFits at: 2)
                    at: 3)]

determineSlapPointForLeftLeg
    pointIndex = 1 ifTrue: ["do nothing"
        ].
    pointIndex = 2 ifTrue: [↑slapPoint ← OrderedCollection with: (selectedCollection at: 1)
            with: (selectedCollection at: 3)].
    pointIndex = 3 ifTrue: [↑slapPoint ← OrderedCollection with: (selectedCollection at: 2)
            with: ((collectionOfLinearFits at: 7)
                    at: 2)]

determineSlapPointForRightArm
    pointIndex = 1 ifTrue: ["do nothing"
        ].
    pointIndex = 2 ifTrue: [↑slapPoint ← OrderedCollection with: ((collectionOfLinearFits at: 2)
                    at: 2)
            with: (selectedCollection at: 4)].
    pointIndex = 3 ifTrue: [↑slapPoint ← OrderedCollection with: (selectedCollection at: 1)
            with: (selectedCollection at: 4)].
    pointIndex = 4 ifTrue: [↑latchPoint ← OrderedCollection with: (selectedCollection at: 2)
            with: ((collectionOfLinearFits at: 5)
                    at: 2)]

determineSlapPointForRightFoot
    pointIndex = 2 ifTrue: [↑slapPoint ← OrderedCollection with: ((collectionOfLinearFits at: 8)
                    at: 2)]

determineSlapPointForRightGesture
    pointIndex = 2 ifTrue: [↑slapPoint ← OrderedCollection with: ((collectionOfLinearFits at: 4)
                    at: 3)]
``` determineSlapPointForRightLeg
    pointIndex = 1 ifTrue: ["do nothing"
    ].
    pointIndex = 2 ifTrue: [↑slapPoint ← OrderedCollection with: (selectedCollection at: 1)
            with: (selectedCollection at: 3)].
    pointIndex = 3 ifTrue: [↑slapPoint ← OrderedCollection with: (selectedCollection at: 2)
            with: ((collectionOfLinearFits at: 9)
                at: 2)]

DiagramInformation methodsFor: Inquiries & assignment collectionIndex

↑collectionIndex correctInstanceVariables: aChar
    aChar = 'leftGesture'
        ifTrue:
            [currentSelection ← 'leftArm'.
            collectionIndex ← 2.
            selectedCollection ← collectionOfLinearFits at: collectionIndex.
            pointIndex ← selectedCollection size].
    aChar = 'rightGesture'
        ifTrue:
            [currentSelection ← 'rightArm'.
            collectionIndex ← 4.
            selectedCollection ← collectionOfLinearFits at: collectionIndex.
            pointIndex ← selectedCollection size].
    aChar = 'leftArm' | (aChar = 'rightArm')
        ifTrue:
            [currentSelection ← 'headToNavel'.
            collectionIndex ← 1.
            selectedCollection ← collectionOfLinearFits at: collectionIndex.
            pointIndex ← 2].
    aChar = 'leftLeg' | (aChar = 'rightLeg')
        ifTrue:
            [currentSelection ← 'headToNavel'.
            collectionIndex ← 1.
            selectedCollection ← collectionOfLinearFits at: collectionIndex.
            pointIndex ← selectedCollection size].
    aChar = 'leftFoot'
        ifTrue:
            [currentSelection ← 'leftLeg'.
            collectionIndex ← 6.
            selectedCollection ← collectionOfLinearFits at: collectionIndex.
            pointIndex ← selectedCollection size].
    aChar = 'rightFoot'
        ifTrue:
            [currentSelection ← 'rightLeg'.
            collectionIndex ← 8.
            selectedCollection ← collectionOfLinearFits at: collectionIndex.
            pointIndex ← selectedCollection size]

currentSelection

↑currentSelection currentSelection: aChar selectedPoint: aPoint pointIndex: anIndexNumber selectedCollection: aCollection collectionIndex: aCounterNumber
" this method with one stroke assigns the following:
   currentSelection, a character string of a deity's posturediagram part;
   selectedPoint, a point; pointIndex, a position in a linear fit collection;
   selectedCollection, a selcted posture diagram of deity part; a collection
   index, the position of the deity part in the overall collection of parts"

currentSelection ← aChar.
selectedPoint ← aPoint.
pointIndex ← anIndexNumber.
selectedCollection ← aCollection.
collectionIndex ← aCounterNumber.

currentSelection: aChar selectedPoint: aPoint pointIndex: anIndexNumber selectedCollection: aCollection collectionIndex: aCounterNumber collectionOfLinearFits: aCollectionOfCollections
" this method with one stroke assigns the following:
   currentSelection, a character string of a deity's posturediagram part;
   selectedPoint, a point; pointIndex, a position in a linear fit collection;
   selectedCollection, a selcted posture diagram of deity part; a collection
   index, the position of the deity part in the overall collection of parts"

currentSelection ← aChar.
selectedPoint ← aPoint.
pointIndex ← anIndexNumber.
selectedCollection ← aCollection.
collectionIndex ← aCounterNumber.
collectionOfLinearFits ← aCollectionOfCollections determineCurrentSelection
collectionIndex = 1 ifTrue: [currentSelection ← 'headToNavel'].
collectionIndex = 2 ifTrue: [currentSelection ← 'leftArm'].
collectionIndex = 3 ifTrue: [currentSelection ← 'leftGesture'].
collectionIndex = 4 ifTrue: [currentSelection ← 'rightArm'].
collectionIndex = 5 ifTrue: [currentSelection ← 'rightGesture'].
collectionIndex = 6 ifTrue: [currentSelection ← 'leftLeg'].
collectionIndex = 7 ifTrue: [currentSelection ← 'leftFoot'].
collectionIndex = 8 ifTrue: [currentSelection ← 'rightLeg'].
collectionIndex = 9 ifTrue: [currentSelection ← 'rightFoot'].
↑Transcript show: currentSelection printString; cr determineLatchPoints
| |
currentSelection = 'headToNavel' ifTrue: [↑self determineLatchPointForHeadToNavel].
currentSelection = 'leftArm' ifTrue: [↑self determineLatchPointForLeftArm].
currentSelection = 'leftGesture' ifTrue: [↑self determineLatchPointForLeftGesture].
currentSelection = 'rightArm' ifTrue: [↑self determineLatchPointForRightArm].
currentSelection = 'rightGesture' ifTrue: [↑self determineLatchPointForRightGesture].
currentSelection = 'leftLeg' ifTrue: [↑self determineLatchPointForLeftLeg].
currentSelection = 'leftFoot' ifTrue: [↑self determineLatchPointForLeftFoot].
currentSelection = 'rightLeg' ifTrue: [↑self determineLatchPointForRightLeg].
currentSelection = 'rightFoot' ifTrue: [↑self determineLatchPointForRightFoot].

determineSlapPoints currentSelection = 'headToNavel' ifTrue: [↑self determineSlapPointForHeadToNavel].
currentSelection = 'leftArm' ifTrue: [↑self determineSlapPointForLeftArm].
currentSelection = 'leftGesture' ifTrue: [↑self determineSlapPointForLeftGesture].
currentSelection = 'rightArm' ifTrue: [↑self determineSlapPointForRightArm].
currentSelection = 'rightGesture' ifTrue: [↑self determineSlapPointForRightGesture].
currentSelection = 'leftLeg' ifTrue: [↑self determineSlapPointForLeftLeg].
currentSelection = 'leftFoot' ifTrue: [↑self determineSlapPointForLeftFoot].
currentSelection = 'rightLeg' ifTrue: [↑self determineSlapPointForRightLeg].
currentSelection = 'rightFoot' ifTrue: [↑self determineSlapPointForRightFoot].

hitPoint
↑hitPoint ← selectedPoint latchPoint

↑latchPoint pointIndex

↑pointIndex reEstablishHitPoint
hitPoint ← selectedPoint.

selectedCollection

↑selectedCollection selectedCollectionCheckForDependencies
↑selectedCollection selectedPoint

↑selectedPoint

```smalltalk
Object variableSubclass: #SkeletonTopology
    instanceVariableNames: 'posture headToNavel leftArm rightArm leftLeg
rightLeg leftGesture rightGesture leftFoot rightFoot '
    classVariableNames: ''
    poolDictionaries: ''
    category: 'Thangka-Digitizing'

SkeletonTopology methodsFor: parsing checkForDHYANAasana
    | |
    leftArm = ('verticalyDown' @ 'toLap')
        ifTrue: [leftGesture ← 'meditativeEquipoise']
        ifFalse: [↑nil].
    rightArm = ('verticalyDown' @ 'toLap')
        ifTrue: [rightGesture ← 'meditativeEquipoise']
        ifFalse: [↑nil].
    posture ← 'dhyanaAsana' checkForLALITasana leftLeg = ('squatting' @ 'steppingDown') & (rightLeg = ('squatting' @ 'squatting')) ifFalse: [↑nil].
    leftArm = ('verticalyDown' @ 'toKnee')
        ifTrue: [leftGesture ← 'grantingTheBest']
        ifFalse: [↑nil].
    rightArm = ('verticalyDown' @ 'toHeart')
        ifTrue: [rightGesture ← 'bestowingFearlessness']
        ifFalse: [↑nil].

posture ← 'lalitAsana' checkForVAJRAasana
    | |
    leftArm = ('verticalyDown' @ 'toKnee')
        ifTrue: [leftGesture ← 'earthTouching']
        ifFalse: [↑nil].
    rightArm = ('verticalyDown' @ 'toLap')
        ifTrue: [rightGesture ← 'meditativeEquipoise']
        ifFalse: [↑nil].
    posture ← 'vajraAsana' newParseSkeletonPart: aCollection
    "this method accepts a collection, and returns a new collection of
        directional topologies"

| col direction convertedDirection delta angleOfDeflection |
    col ← OrderedCollection new.
    direction ← OrderedCollection new.
    convertedDirection ← OrderedCollection new.
    1 to: aCollection size do: [:index | col add: (aCollection at: index)
                - (aCollection at: 1)].
    "col is the colection of differences in directions"
    1 to: col size - 1 do:
```

```
[:counter |
delta ← (col at: counter + 1)
        - (col at: counter).
angleOfDeflection ← delta theta radiansToDegrees truncated.
angleOfDeflection < 0 ifTrue: [angleOfDeflection ← angleOfDeflection + 360].
direction add: angleOfDeflection].
↑direction
``` parseSkeletonPart: aCollection

"this method accepts a collection, and returns a new collection of
   directional topologies"

```
| col direction convertedDirection delta angleOfDeflection |
col ← OrderedCollection new.
direction ← OrderedCollection new.
convertedDirection ← OrderedCollection new.
1 to: aCollection size do: [:index | col add: (aCollection at: index)
          - (aCollection at: 1)].
"col is the colection of differences in directions"
1 to: col size - 1 do:
    [:counter |
    delta ← (col at: counter + 1)
            - (col at: counter).
    (angleOfDeflection ← delta theta radiansToDegrees truncated ) .
    angleOfDeflection < 0 ifTrue: [angleOfDeflection ← angleOfDeflection+ 360].
    angleOfDeflection >= 15 & (angleOfDeflection < 45) ifTrue: [direction add: 'SEE'].
    angleOfDeflection >= 45 & (angleOfDeflection < 75) ifTrue: [direction add: 'SSE'].
    angleOfDeflection >= 75 & (angleOfDeflection < 105) ifTrue: [direction add: 'SOUTH'].
    angleOfDeflection >= 105 & (angleOfDeflection < 135) ifTrue: [direction add: 'SSW'].
    angleOfDeflection >= 135 & (angleOfDeflection < 165) ifTrue: [direction add: 'SWW'].
    angleOfDeflection >= 165 & (angleOfDeflection < 195) ifTrue: [direction add: 'WEST'].
    angleOfDeflection >= 195 & (angleOfDeflection < 225) ifTrue: [direction add: 'NWW'].
    angleOfDeflection >= 225 & (angleOfDeflection < 255) ifTrue: [direction add: 'NNW'].
    angleOfDeflection >= 255 & (angleOfDeflection < 285) ifTrue: [direction add: 'NORTH'].
    angleOfDeflection >= 285 & (angleOfDeflection < 315) ifTrue: [direction add: 'NNE'].
    angleOfDeflection >= 315 & (angleOfDeflection < 345) ifTrue: [direction add: 'NEE'].
    angleOfDeflection >= 345 & (angleOfDeflection <= 360) | (angleOfDeflection > 0 &
(angleOfDeflection < 15)) ifTrue: [direction add: 'EAST']].
    ↑direction
``` recognizePostureAndGesture

```
self checkForVAJRAasana.
self checkForDHYANAasana.
self checkForLALITasana.

↑posture
```

SkeletonTopology methodsFor: inquiries & assignments headToNavel
   ↑headToNavel headToNavel: aCollectionOfPoints

" head to nave consists of two sticks. In this method, the first stick is
determined, and based on this, the other stick can be figure out, such
as: if the first stick is titling to the left, then the second stick will counter balance to the right, or vice versa......"

| newCol firstSegment |
newCol ← self newParseSkeletonPart: aCollectionOfPoints.
Transcript show: 'headToNavel--->' , ' ' , newCol printString; cr.
(newCol at: 1)
    >= 86 & ((newCol at: 1)
        <= 94) ifTrue: [firstSegment ← 'vertical'].
(newCol at: 1)
    < 86 & ((newCol at: 1)
        >= 0) ifTrue: [firstSegment ← 'leaningToTheLeft'].
(newCol at: 1)
    > 94 & ((newCol at: 1)
        < 180) ifTrue: [firstSegment ← 'leaningToTheRight'].
headToNavel ← firstSegment.
headToNavel isNil ifTrue: [self halt]

leftArm
    ↑leftArm leftArm: aCollectionOfKnotPoints
    | newCol upperArm lowerArm angle |
    newCol ← self newParseSkeletonPart: aCollectionOfKnotPoints.
    "the first stick in the collection is the shoulder blade.... it might be
    redundant... presently the message will compare just upper
    and lower arm"
Transcript show: 'leftArm--->' , ' ' , newCol printString; cr.
(newCol at: 2)
    > 85 & ((newCol at: 2)
        <= 120) ifTrue: [upperArm ← 'verticalyDown'].
(newCol at: 2)
    > 120 & ((newCol at: 2)
        <= 199) ifTrue: [upperArm ← 'horizontallyRaised'].
(newCol at: 2)
    > 199 & ((newCol at: 2)
        < 270) ifTrue: [upperArm ← 'verticallyRaised'].
(newCol at: 3)
    < 70 | ((newCol at: 3)
        >= 10) ifTrue: [lowerArm ← 'toLap'].
(newCol at: 3)
    <= 150 & ((newCol at: 3)
        > 80) ifTrue: [lowerArm ← 'toKnee'].
(newCol at: 3)
    <= 350 & ((newCol at: 3)
        > 295) ifTrue: [lowerArm ← 'toHeart'].
(newCol at: 3)
    > 350 & ((newCol at: 3)
        <= 360) | ((newCol at: 3)
        >= 0 & ((newCol at: 3)
            < 10)) ifTrue: [lowerArm ← 'toBelly'].
(newCol at: 3)
    >= 160 & ((newCol at: 3)
        < 190) ifTrue: [lowerArm ← 'horizontallyStretched'].
(newCol at: 3)
    <= 270 & ((newCol at: 3)
        > 190) ifTrue: [lowerArm ← 'verticallyStretched'].

```
"(newCol at: 2)
   = 'SSW' | ((newCol at: 2)
   = 'SOUTH') | ((newCol at: 2)
   = 'SSE') ifTrue: [upperArm ← 'verticalyDown'].
(newCol at: 2).
   = 'SWW' ifTrue: [upperArm ← 'halfRaised'].
(newCol at: 2)
   = 'WEST' ifTrue: [upperArm ← 'raised'].
((newCol at: 3))
   = 'SEE' | (((newCol at: 3))
   = 'EAST') ifTrue: [lowerArm ← 'toLap'].
((newCol at: 3))
   = 'NNE' | (((newCol at: 3))
   = 'NEE') ifTrue: [lowerArm ← 'toHeart'].
((newCol at: 3))
   = 'SSW' | (((newCol at: 3))
   = 'SOUTH') ifTrue: [lowerArm ← 'toKnee'].
((newCol at: 3))
   = 'NNW' | (((newCol at: 3))
   = 'NORTH') ifTrue: [lowerArm ← 'upwards'].
((newCol at: 3))
   = 'SWW' ifTrue: [lowerArm ← 'outwards'].
((newCol at: 3))
   = 'NWW' ifTrue: [lowerArm ← 'stretched']."
leftArm ← upperArm @ lowerArm.
angle ← 180 - (newCol at: 2) + (newCol at: 3).
angle > 360 ifTrue: [angle ← angle - 360].
Transcript show: angle printString; cr.
upperArm = nil | (lowerArm = nil) ifTrue: [self halt]
``` leftFoot
   ↑leftFoot.

leftFoot: aCollectionOfKnotPoints
   leftFoot ← aCollectionOfKnotPoints leftGesture
   ↑leftGesture leftGesture: aCollectionOfKnotPoints
   leftGesture ← aCollectionOfKnotPoints leftLeg
   ↑leftLeg leftLeg: aCollectionOfKnotPoints
   " newCol ← self parseSkeletonPart: aCollectionOfKnotPoints. "

| newCol upperLeg lowerLeg |
   newCol ← self newParseSkeletonPart: aCollectionOfKnotPoints.
   (newCol at: 1)
      > 150 & ((newCol at: 1)
         < 180) ifTrue: [upperLeg ← 'squatting'
      "GreenTara, GenericBuddha forms, Sukhasiddhi"].
   (newCol at: 1)
      > 180 ifTrue: [upperLeg ← 'verticallyRaised'

```
        "Sarasaswati"].
(newCol at: 2)
    > 350 & ((newCol at: 2)
        <= 360) | ((newCol at: 2)
        >= 0 & ((newCol at: 2)
            <= 15)) ifTrue: [lowerLeg ← 'squatting'
    "Sukhasiddhi, Generic Buddha forms"].
(newCol at: 2)
    >= 16 & ((newCol at: 2)
        < 90) ifTrue: [lowerLeg ← 'steppingDown'
    "GreenTara"].
leftLeg ← upperLeg @ lowerLeg.

"   (newCol at: 1)
    = 'SWW' | ((newCol at: 1)
    = 'WEST') ifTrue: [upperLeg ← 'squatting'].
(newCol at: 2)
    = 'EAST' ifTrue: [lowerLeg ← 'squatting'].
(newCol at: 2)
    = 'SEE' | ((newCol at: 2)
    = 'SSE') ifTrue: [lowerLeg ← 'steppingDown'].
leftLeg ← upperLeg @ lowerLeg"
``` rightArm

```
    ↑rightArm
``` rightArm: aCollectionOfKnotPoints

```
    | newCol upperArm lowerArm |
    newCol ← self newParseSkeletonPart: aCollectionOfKnotPoints.
    "the first stick in the collection is the shoulder blade.... it might be
    redundant... presently the message will compare just upper and lower
        arm"
    Transcript show: 'rightArm--->', ' ', newCol printString; cr.
(newCol at: 2)
    < 95 & ((newCol at: 2)
        >= 50) ifTrue: [upperArm ← 'verticalyDown'].
(newCol at: 2)
    < 60 | ((newCol at: 2)
        >= 346 & ((newCol at: 2)
            <= 360)) ifTrue: [upperArm ← 'horizontallyRaised'].
(newCol at: 2)
    < 346 & ((newCol at: 2)
        >= 270) ifTrue: [upperArm ← 'verticallyRaised'].
(newCol at: 3)
    <= 175 & ((newCol at: 3)
        > 110) ifTrue: [lowerArm ← 'toLap'].
(newCol at: 3)
    >= 175 & ((newCol at: 3)
        < 255) ifTrue: [lowerArm ← 'toHeart'].
(newCol at: 3)
    >= 40 & ((newCol at: 3)
        <= 110) ifTrue: [lowerArm ← 'toKnee'].
(newCol at: 3)
    >= 340 & ((newCol at: 3)
        <= 360) | ((newCol at: 3)
        < 20) ifTrue: [lowerArm ← 'horizontallyStretched'].
```

```
(newCol at: 3)
    >= 270 & ((newCol at: 3)
        < 350) ifTrue: [lowerArm <- 'verticallyStretched'].
"(newCol at: 2)
 = 'SSE' | ((newCol at: 2)
 = 'SOUTH') | ((newCol at: 2)
 = 'SSW') ifTrue: [upperArm <- 'verticalyDown'].
(newCol at: 2)
 = 'SEE' ifTrue: [upperArm <- 'halfRaised'].
(newCol at: 2)
 = 'EAST' ifTrue: [upperArm <- 'raised'].
(newCol at: 3)
 = 'SWW' | ((newCol at: 3)
 = 'WEST') ifTrue: [lowerArm <- 'toLap'].
(newCol at: 3)
 = 'NNW' | ((newCol at: 3)
 = 'NWW') ifTrue: [lowerArm <- 'toHeart'].
(newCol at: 3)
 = 'SEE' ifTrue: [lowerArm <- 'toKnee'].
(newCol at: 3)
 = 'NNE' | ((newCol at: 3)
 = 'NORTH') ifTrue: [lowerArm <- 'upwards'].
(newCol at: 3)
 = 'NEE' ifTrue: [lowerArm <- 'stretched']."
rightArm <- upperArm @ lowerArm.
upperArm = nil | (lowerArm = nil) ifTrue: [self halt]
``` rightFoot
    ↑rightFoot rightFoot: aCollectionOfKnotPoints
    rightFoot <- aCollectionOfKnotPoints rightGesture
    ↑rightGesture rightGesture: aCollectionOfKnotPoints
    rightGesture <- aCollectionOfKnotPoints rightLeg
    ↑rightLeg rightLeg: aCollectionOfKnotPoints
"   newCol <- self parseSkeletonPart: aCollectionOfKnotPoints. "

```
| newCol upperLeg lowerLeg |
newCol <- self newParseSkeletonPart: aCollectionOfKnotPoints.
(newCol at: 1)
    > 0 & ((newCol at: 1)
        < 30) ifTrue: [upperLeg <- 'squatting'
    "Milarepa, Generic Buddha, Green Tara, Sukhasidhi"].
(newCol at: 1)
    >= 30 & ((newCol at: 1)
        < 60) ifTrue: [upperLeg <- 'standing'
    "Mahakala, Vajrvarahi"].
(newCol at: 1)
```

```
      >= 270 & ((newCol at: 1)
          < 345) ifTrue: [upperLeg <- 'verticallyRaised'
      "Saraswati"].
(newCol at: 2)
      > 170 & ((newCol at: 2)
          <= 200) ifTrue: [lowerLeg <- 'squatting'
      "Generic Buddha forms, Green Tara, Milarepa, Sukhasiddhi"].

(newCol at: 2)
      >= 90 & ((newCol at: 2)
          <= 170) ifTrue: [lowerLeg <- 'steppingDown'
      "Vajravarahi"].
(newCol at: 2)
      < 90 ifTrue: [lowerLeg <- 'leaningToRight'
      "Mahakala1"].
rightLeg <- upperLeg @ lowerLeg.

"     ((newCol at: 1 ) )
    = 'SWW' | (((newCol at: 1 ) )
    = 'WEST') ifTrue: [upperLeg <- 'squatting'].
    ((newCol at: 2) )
    = 'EAST' ifTrue: [lowerLeg <- 'squatting'].
    ((newCol at: 2) )
    = 'SEE' | (((newCol at: 2) )
    = 'SSE') ifTrue: [lowerLeg <- 'steppingDown'].
    leftLeg <- upperLeg @ lowerLeg"
```

SkeletonTopology methodsFor: parsing confirmation confirmRightArm: aCollection firstGuess: aGuess
"aCollection ---> aCollection of angular displacements. This method will firrther compare the difference between lower arm and upper arm against acceptable pre-defined differernces. aGuess is what the sender method thinks that the right arm is"

SkeletonTopology class
instanceVariableNames: "

SkeletonTopology class methodsFor: instance creation frame: aPoint
    (OSJob fork: 'videoDisc -n PA-1 search ' , aPoint x printString) wait.
    Sensor waitButton.
    (OSJob fork: 'videoDisc -n PA-1 search ' , aPoint y printString) wait
    "SkeletonTopology frame: 289@293"

headToNavel: aHeadToNavel leftArm: aLeftArm rightArm: aRightArm leftLeg: aLeftLeg rightLeg: aRightLeg
    | skeletonTopology |
    skeletonTopology <- self new.
    skeletonTopology headToNavel: aHeadToNavel.
    skeletonTopology leftArm: aLeftArm.
    skeletonTopology rightArm: aRightArm.
    skeletonTopology leftLeg: aLeftLeg.

```
skeletonTopology rightLeg: aRightLeg.
skeletonTopology recognizePostureAndGesture.
↑skeletonTopology
```

FormEditor subclass: #DeityOutlineFormEditor
  instanceVariableNames: 'deityName canvas postureDiagramVisible postureDiagramForm postureDiagramFormOffset '
  classVariableNames: ''
  poolDictionaries: ''
  category: 'Thangka-VideoScenes'

*Copyright (c) Xerox Corporation, 1988*

DeityOutlineFormEditor methodsFor: inquiries & assignment deityName: aName

```
deityName ← aName
``` postureDiagramVisible: aBoolean
```
    | formInfo |
    postureDiagramVisible ← aBoolean.
    postureDiagramVisible
        ifTrue:
            [formInfo ← DictionaryOfPostureDiagramForms supplyFormAndOffsetOf: deityName.
            postureDiagramForm ← formInfo at: 1.
            postureDiagramFormOffset ← formInfo at: 2]
```

DeityOutlineFormEditor methodsFor: control defaults controlActivity
```
    self viewHasCursor
        ifTrue:
            [postureDiagramVisible ifTrue: [self displayPostureDiagramUntil: [sensor anyButtonPressed]].
            sensor redButtonPressed ifTrue: [↑self redButtonActivity].
            sensor yellowButtonPressed ifTrue: [↑self yellowButtonActivity].
            sensor blueButtonPressed ifTrue: [↑self blueButtonActivity]]
``` displayPostureDiagramUntil: aBlock
```
    | displayPoint |
    displayPoint ← postureDiagramFormOffset + view displayBox origin.
    postureDiagramForm
        displayOn: Display
        at: displayPoint
        rule: Form reverse.
    [aBlock value]
        whileFalse: ["postureDiagramForm
                displayOn: Display
                at: displayPoint
                rule: Form reverse"].
    postureDiagramForm
        displayOn: Display
        at: displayPoint
        rule: Form reverse
```

DeityOutlineFormEditor class
  instanceVariableNames: ''

DeityOutlineFormEditor class methodsFor: instance creation createForDeity: aDeityName
"Creates a StandardSystemView for a FormEditor on aDeityName's outline bitmap."

| formView topView extent aForm deityOutlineFormEditor |
formView ← FormHolderView new model: (aForm ← Form readFrom: 'thangka:', aDeityName , '.form').
   deityOutlineFormEditor ← self new.
   deityOutlineFormEditor deityName: aDeityName.
   deityOutlineFormEditor postureDiagramVisible: true.
   formView controller: deityOutlineFormEditor.
   topView ← StandardSystemView new.
   topView model: aForm.
   topView addSubView: formView.
   topView label: aDeityName.
   topView borderWidth: 2.
   extent ← topView viewport extent.
   topView minimumSize: extent.
   topView maximumSize: extent.
   ↑topView controller open
   "DeityOutlineFormEditor createForDeity: 'Sukhasiddhi'"

Object subclass: #VideoDiskPlayer
 instanceVariableNames: 'playerID '
 classVariableNames: ''
 poolDictionaries: ''
 category: 'Thangka-Devices'

*Copyright (c) Xerox Corporation, 1988*

VideoDiskPlayer methodsFor: commands channel1off self outputString: 'G' channel1on self outputString: 'F' channel2off self outputString: 'I' channel2on self outputString: 'H' ffast self outputString: ';' fplay self outputString: ':' fscan self outputString: '>' fslow self outputString: '<' fstep self outputString: '=' index self outputString: 'f' indexOn self outputString: 'P' motorOff self outputString: 'c' motorOn self outputString: 'b' repeat: finishFrame count: aNum

| f n |
    f ← finishFrame printString.
    n ← aNum printString.
    self outputString: 'D' , f , '@' , n , '@' reset self outputString: 'V' rfast self outputString: 'K' rplay self outputString: 'J' rscan self outputString: 'N' rslow self outputString: 'L' rstep self outputString: 'M' search: aFrame

| f |
    f ← aFrame printString.
    self outputString: 'C' , f , '@' still self outputString: 'O' stop self outputString: '?'

VideoDiskPlayer methodsFor: inquiries & assignment playerID

↑playerID playerID: aNumber playerID ← aNumber

VideoDiskPlayer methodsFor: private outputString: aString
    | port p commandComplete |
    Multiplexer openPort: playerID.
    port ← RS232Port open: 1.
    "port setSpeed: 1200."
    port sendBuffer: aString.
    port receiveBuffer.
    "Transcript show: 'Bytes read(1) = ', (port readStatus: 20)
    printString; cr."
    aString size > 1
        ifTrue:
            [(Delay forMilliseconds: 250) wait.
            commandComplete ← false.
            [commandComplete]
                whileFalse:
                    [1 to: (port readStatus: 20)
                      do:
                          [:index |
                          p ← port checkBuffer at: index.
                          p = 1 ifTrue: [commandComplete ← true]].
                commandComplete ifFalse: [port receiveBuffer]]].
    port close.
    port release parseCommand: aString
    | r s | r ← ReadStream on: aString.
    [r atEnd] whileFalse:[
        s ← r upTo: $ .
        self perform: s asSymbol].

VideoDiskPlayer class
    instanceVariableNames: ''

VideoDiskPlayer class methodsFor: instance creation createForPlayer: anID
    | vdp | vdp ← VideoDiskPlayer new.
    vdp playerID: anID

```
Object subclass: #Multiplexer
    instanceVariableNames: ''
    classVariableNames: ''
    poolDictionaries: ''
    category: 'Thangka-Devices'
```

*Copyright (c) Xerox Corporation, 1988*

Multiplexer class
    instanceVariableNames: ''

Multiplexer class methodsFor: commands openPort: aPortNumber
    "Multiplexer openPort: 6"

```
| port stringID |
port ← RS232Port open: 1.
"port setSpeed: 1200."
port setParityMode.
aPortNumber == 1 ifTrue: [stringID ← '@'].
aPortNumber == 2 ifTrue: [stringID ← 'A'].
aPortNumber == 3 ifTrue: [stringID ← 'B'].
aPortNumber == 4 ifTrue: [stringID ← 'C'].
aPortNumber == 5 ifTrue: [stringID ← 'D'].
aPortNumber == 6 ifTrue: [stringID ← 'E'].
aPortNumber == 7 ifTrue: [stringID ← 'F'].
aPortNumber == 8 ifTrue: [stringID ← 'G'].
aPortNumber == 9 ifTrue: [stringID ← 'H'].
aPortNumber == 10 ifTrue: [stringID ← 'I'].
aPortNumber == 11 ifTrue: [stringID ← 'J'].
aPortNumber == 12 ifTrue: [stringID ← 'K'].
aPortNumber == 13 ifTrue: [stringID ← 'L'].
aPortNumber == 14 ifTrue: [stringID ← 'M'].
aPortNumber == 15 ifTrue: [stringID ← 'N'].
aPortNumber == 16 ifTrue: [stringID ← 'O'].
port sendBuffer: '}}' , stringID.
Transcript show: '@' printString , ' ****'.
port close.
port release.
``` testPorts
    "Multiplexer testPorts"

```
| o testPort |
o ← OrderedCollection new.
o add: '@'; add: 'A'; add: 'B'; add: 'C'; add: 'D'; add: 'E'; add: 'F'; add: 'G'; add: 'H'; add: 'I'; add: 'J';
add: 'K'; add: 'L'; add: 'M'; add: 'N'; add: 'O'.
o do:
    [:char |
    testPort ← RS232Port open: 1.
    testPort setSpeed: 1200.
```

```
testPort setParityMode.
testPort sendBuffer: ')}' , char.
Transcript show: char printString ,"  ****".
testPort close.
testPort release.
(Delay forSeconds: 30) wait]
```

What is claimed:

1. An information retrieval system comprising:

presenting means for providing presentations to a user, the presenting means comprising display means for providing visual presentations to the user;

selection input means for providing signals indicating user selections within visual presentations provided by the display means;

gesture input means for providing data basaed on gestures of the user;

memory for storing a plurality of interactive items, the display means being capable of providing a respective interactive presentation based on each of the interactive items; the respective interactive presentations of a first one of the interactive items including a first image, the first image including a plurality of parts including a first part; the memory further being for storing, for each of the parts of the first image, a respective set of related information items based on each of which the presenting means can provide a respective presentation for providing information to the user; the respective set of related information items of the first part including a first information item; the first image further including, for each of the parts, a respective selectable bounded area that is selectable by the user with the selection input means in requesting presentations based on information items from the respective set of related information items;

first means for using visual feature data from the gesture input means to determine whether the first image includes features resembling a desired set of visual features and, if so, for causing the display means to provide the first interactive item's respective interactive presentation that includes the first image; the visual feature data being based on a gesture indicating the desired set of visual features; the visual feature data indicating the gesture's path of motion; and second means for receiving a request signal requesting the first information item's respective presentation and for responding to the request signal by causing the presenting means to provide the first information item's respective presentation for providing information to the user; the request signal including a selection signal from the selection input means, the selection signal indicating user selection of the first part's respective selectable bounded area.

2. The system of claim 1 in which the first means is further for using the visual feature data to obtain an identifier of the desired set of visual features, the system further comprising a data structure for providing data indicating the first interactive item when accessed with the identifier of the desired set of visual features; the first means further being for accessing the data structure with the identifier of the desired set of visual features to obtain the data indicating the first interactive item.

3. The system of claim 1 in which the first informwtion item is a video item.

4. The system of claim 3 in which the display means comprises first and second display screens, the first display screen being a workstation screen for providing the first interactive item's respective interactive presentation and the second display screen being a video screen for providing the first information item's respective presentation.

5. The system of claim 3 in which memory includes a video storage medium storing the first information item, the second means comprising a video player connected for accessing the video storage medium, the video player being for accessing the first information item on the video storage medium in response to the request signal requesting the first information item's respective presentation.

6. The system of claim 1 in which the gesture input means comprises a mouse with which the user can perform the gesture indicating the desired set of visual features, the mouse providing the visual feature data to the first means.

7. A system comprising:

presenting means for providing presentations to a user, the presenting means comprising display means for providing visual presentations to the user;

selection input means for providing signals indicating user selections within visual presentations provided by the display means;

gesture input means for providing data based on gestures of the user;

memory for storing a plurality of interactive items, the display means being capable of providing a respective interactive presentation based on each of the interactive items; the respective interactive presentation of a first one of the interactive items including a first image, the first image including a plurality of parts including a first part; the memory further being for storing, for each of the parts of the first image, a respective set of related information items based on each of which the presenting means can provide a respective presentation; the respective set of related information items of the first part including a first information item; the first image further including, for each of the parts, a respective selectable bounded area that is selectable by the user with the selection input means in requesting presentations based on information items from the respective set of related information items;

first means for using diagram data from the gesture input means to determine whether the first image resembles a diagram and, if so, for causing the display means to provide the first interactive item's respective interactive presentation that includes the first image; the diagram data being based on a gesture indicating the diagram; the diagram data indicating the gesture' path of motion; and second means for receiving a request signal requesting the first information item's respective presentation and for responding to the request signal by causing the presenting means to provide the first information item's respective presentation; the request signal including a selection signal from the selection input means, the selection signal indicating user selection of the first part's respective selectable bounded area.

8. The system of claim 7 in which the first means is further for using the diagram data to obtain an identifier of the diagram, the system further comprising a data structure for providing data indicating the first interactive item when accessed with the diagram's identifier; the first means further being for accessing the data structure with the diagram's identifier to obtain the data indicating the first interactive item.

9. The system of claim 7 in which the first information item is a video item.

10. The system of claim 9 in which the display means comprises first and second display screens, the first display screen being a workstation screen for providing the first interactive item's respective interactive presentation and the second display screen being a video screen for providing the first information item's respective presentation.

11. The system of claim 9 in which memory includes a video storage medium storing the first information item, the second means comprising a video player connected for accessing the video storage medium, the video player being for accessing the first information item on the video storage medium in response to the request signal requesting the first information item's respective presentation.

12. The system of claim 7 in which the gesture input means comprises a mouse with which the user can perform the gesture indicating the diagram, the mouse providing the visual feature data to the first means.

13. A method of operating an information retrieval system that includes:

presenting means for providing presentations to a user, the presenting means including display means for providing visual presentations to a user;

selection input means for providing signals indicating user selections within visual presentations provided by the display means;

gesture input means for providing data based on gestures of the user;

memory for storing a plurality of interactive items, the display means being capable of providing a respective interactive presentation based on each of the interactive items; the respective interactive presentations of a first one of the interactive items including a first image, the first image including a plurality of parts including a first part; the memory further being for storing, for each of the parts of the first image, a respective set of related information items based on each of which the presenting means can provide a respective presentation for providing information to the user; the respective set of related information items of the first part including a first information item; the first image further including, for each of the parts, a respective selectable bounded area that is selectable by the user with the selection input means in requesting presentations based on information items from the respective set of related information items;

the method comprising steps of: receiving visual feature data from the gesture input means, the visual feature data being based on a gesture indicating a desired set of visual features, the visual feature data indicating the gesture's path of motion;

using the visual feature data to determine whether the first image includes features resembling the desired set of visual features and, if so, causing the display means to provide the first interactive item's respective interactive presentation that includes the first image;

receiving a request signal requesting the first information item's respective presentation; the request signal including a selection signal from the selection input means, the selection signal indicating user selection of the first part's respective selectable bounded area; and in response to the request signal, causing the presenting means to provide the first information item's respective presentation for providing information to the user.

14. The method of claim 13 in which the step of receiving the visual feature data further comprises a substep of causing the display means to present a preliminary set of visual features; the gesture indicating a change in the preliminary set of visual features that would produce the desired set of visual features.

15. The method of claim 14 in which the preliminary set of visual features is a preliminary diagram and the desired set of visual features is a modified diagram.

16. The method of claim 13 in which the step of causing the presenting means to provide the first information item's respective presentation further comprises substeps of:

in response to the selection signal indicating user selection of the first part's respective selectable bounded area, presenting a selectable menu item, the selectable menu item including a description of the first information item's respective presentation;

receiving a menu item selection signal from the selection input means, the menu item selection signal indicating user selection of the selectable menu item; and in response to the menu item selection signal, causing the presenting means to provide the first information item's respective presentation.

17. A method of operating a system that includes:

presenting means for providing presentations to a user, the presenting means including display means for providing visual presentations to the user;

selection input means for providing signals indicating user selections within visual presentations provided by the display means;

gesture input means for providing data based on gestures of the user;

memory for storing a plurality of interactive items, the display means being capable of providing a respective interactive presentation based on each of the interactive items; the respective interactive presentation of a first one of the interactive items including a first image, the first image including a plurality of parts including a first part; the memory further being for storing, for each of the parts of the first image, a respective set of related information items based on each of which the presenting means can provide a respective presentation; the respective set of related information items of the first part including a first information item; the first image further including, for each of the parts, a respective selectable bounded area that is selectable by the user with the selection input mens in requesting presentations based on information items from the respective set of related information items;

the method comprising steps of: receiving diagram data from the gesture input means, the diagram data being based on a gesture indicating a diagram, the diagram data indicating the gesture's path of motion;

using the diagram data to determine whether the first image resembles the diagram and, if so, causing the display means to provide the first interactive item's respective interactive presentation that includes the first image;

receiving a request signal requesting the first information item's respective presentation; the request signal including a selection signal from the selection input means, the selection signal indicating user selection of the first part's respective selectable bounded area; and in response to the request signal, causing the presenting means to provide the first information item's respective presentation.

18. The method of claim 17 in which the step of receiving the diagram data further comprises a substep of causing the display means to present a preliminary diagram; the gesture indicating a change in the preliminary diagram that would produce a modified diagram.

19. The method of claim 17 in which the step of causing the user output means to provide the first information item's respective presentation further comprises substeps of:

in response to the selection signal indicating user selection of the first part's respective selectable bounded area, presenting a selectable menu item, the selectable menu item including a description of the first information item's respective presentation;

receiving a menu item selection signal from the selection input means, the menu item selection signal indicating user selection of the selectable menu item; and in response to the menu item selection signal, causing the user output means to provide the first information item's respective presentation.

20. A method of operating a system that includes:
display means for providing visual presentations to a user;
memory for storing a plurality of visual items, the display means being capable of providing a respective visual presentation based on each of the visual items; the visual items including a first visual item; and
gesture input means for providing data based on gestures of the user;
the method comprising steps of:
causing the display means to provide a preliminary diagram presentation that includes a preliminary diagram;
receiving diagram change data from the gesture input means, the diagram change data being based on a gesture of the user indicating a change in the preliminary diagram that would produce a modified diagram, the diagram change data indicating the gesture's path of motion; and
using the diagram change data to determine whether the first visual item's respective visual presentation includes an image resembling the modified diagram and, if so, causing the display means to provide the first visual item's respective visual presentation.

21. The method of claim 20 in which the system further includes a data structure for providing, when accessed with an identifier of the modified diagram, data indicating the first visual item; the step of using the diagram change data comprising substeps of:
obtaining the identifier of the modified diagram based on the diagram change data; and
accessing the data structure with the modified diagram's identifier to obtain the data indicating the first visual item.

22. The method of claim 20 in which the system further includes selection input means for providing signals indicating user selections within visual presentations provided by the display means; the first visual item's respective visual presentation including a selectable bounded area, the memory further being for storing a first information item related to the first visual item; the system further including presenting means for providing a presentation based on the first information item; the method further comprising steps of:
receiving a selection signal from the selection input means indicating user election of the selectable bounded area; and
in response to the selection signal, presenting a selectable menu item to the user, the selectable menu item being selectable to request the first information item's respective presentation by the presenting means.

23. The method of claim 22 in which the first information item is a video item.

24. The method of claim 20, further comprising a step of responding to the diagram change data by causing the display means to provide a modified diagram presentation that includes the modified diagram.

* * * * *

UNITED STATES PATENT AND TRADEMARK OFFICE
CERTIFICATE OF CORRECTION

PATENT NO. : 5,010,500
DATED : April 23, 1991
INVENTOR(S) : Ranjit Makkuni et al.

It is certified that error appears in the above--identified patent and that said Letters Patent is hereby corrected as shown below:

On the title page of the patent, in the title, ITEM 54 change "WITH PARTS SELECTABLE FOR" to --WITH IMAGE PARTS SELECTABLE FOR--, so that the title now reads: GESTURE-MODIFIED DIAGRAM FOR RETRIEVAL OF IMAGE RESEMBLING DIAGRAM, WITH IMAGE PARTS SELECTABLE FOR FURTHER INTERACTIVE RETRIEVAL.

Column 1, line 3, "WITH PARTS SELECTABLE FOR" should be changed to --WITH IMAGE PARTS SELECTABLE FOR--

Signed and Sealed this

Twenty-ninth Day of December, 1992

*Attest:*

DOUGLAS B. COMER

*Attesting Officer*  Acting Commissioner of Patents and Trademarks